United States Patent [19]

Copella et al.

[11] Patent Number: 4,852,165
[45] Date of Patent: Jul. 25, 1989

[54] SECURE SYSTEM AND METHOD FOR PROVIDING PERSONAL IDENTIFIER

[75] Inventors: Robert A. Copella, Northbrook; Ann M. Flannery, Chicago, both of Ill.; David R. Garrelts, Independence, Iowa; Sandra I. Krigers, Northbrook, Ill.

[73] Assignee: National Computer Print, Inc., Birmingham, Ala.

[21] Appl. No.: 62,241

[22] Filed: Jun. 12, 1987

[51] Int. Cl.[4] .............................................. H04L 9/04
[52] U.S. Cl. ...................................... 380/24; 380/25; 380/29; 380/51
[58] Field of Search ................................... 380/23–25, 380/29, 51, 52; 340/825.34

[56] References Cited

U.S. PATENT DOCUMENTS

| | | | |
|---|---|---|---|
| 4,328,414 | 5/1982 | Atalla | 380/23 |
| 4,630,201 | 12/1986 | White | 380/24 |
| 4,650,975 | 3/1987 | Kitchener | 380/24 |
| 4,697,243 | 9/1987 | Moore et al. | 380/25 |

OTHER PUBLICATIONS

Atalla Personal PIN Selector, (1987), pp. 1–3.

Primary Examiner—Salvatore Cangialosi
Attorney, Agent, or Firm—Dressler, Goldsmith, Shore, Sutker & Milnamow, Ltd.

[57] ABSTRACT

The invention pertains to apparatus and methods for securely transmitting a personal identifier between an originator thereof and a preselected data base. Especially, pertaining to a computer terminal and a method and acquiring a personal identifier used in connection with an account number of an institution, such as a bank, and securely transmitting an encrypted version of the identifier along with a representation of the account number to the institution's data base.

29 Claims, 7 Drawing Sheets

SECURE SYSTEM AND METHOD FOR PROVIDING PERSONAL IDENTIFIER

FIELD OF THE INVENTION

The invention pertains to apparatus and methods for securely transmitting a personal identifier between an originator thereof and a preselected data base. More particularly, the invention pertains to a computer terminal and a method of acquiring a personal identifier used in connection with an account number of an institution, such as a bank, and securely transmitting an encrypted version of the identifier along with a representation of the account number to the institution's data base.

BACKGROUND OF THE INVENTION

Financial institutions have during the last several years made substantial efforts to promote the use of automated teller machines by their customers. The financial institutions view such machines as cost effective ways to provide services to individual customers.

However, such machines have experienced a number of drawbacks which have limited their acceptance with respect to the general public. One drawback is that a human teller is no longer present to carry out the transaction. Many customers, it has turned out, prefer human tellers over automated teller machines.

Another drawback that has been encountered with the use of such machines is a need to assure that the use of such machines is limited to authorized individuals and their respective accounts. In addition to utilizing an account number to identify a customer, a system has been developed which requires the customer to enter a personal identifier prior to carrying out a transaction. Provision is made for verification of not only the account number but also the personal identifier entered by the customer. The personal identifier, if kept in confidence, provides a level of security beyond the account number.

Obviously, if a personal identifier is not maintained in confidence, it has little or no value from the point of view of providing security to the system. Hence, not only should each personal identifier be unique at a given institution but in addition the personal identifier should not be publicly known.

In order to provide personal identifiers, institutions in the past have generated such identifiers and assigned them to customers in an arbitrary fashion. Much to the chagrin of the institutions, which are attempting to promote the popularity of automated teller machines, such arbitrarily assigned personal identifiers are often ignored or forgotten by the customers. Hence, there has been an attempt made to develop systems whereby the customer can freely specify his or her own personal identifier.

One way in which such specification can be securely carried out is to have the customer come into the institution, enter the relevant account number and then also enter the selected identifier. In such an arrangement, the identifier can be associated with the account number and stored in the institution's data base without any intervening human involvement which would permit connecting the customer's account number with the customer's personal identifier. Absent the availability of the customer to come into the institution, this is not a viable solution.

In another known system, a customer is mailed a document which explains the purpose for selecting a personal identifier. In addition, a translation table is provided in hard copy form with the same explanatory document. In this system, a customer selects an arbitrary personal identifier and then encrypts that identifier using the provided translation table.

The encrypted identifier along with the relevant account number, which may be preprinted, is recorded on a tear off return sheet which is to be returned to the institution by mail. Unfortunately, instead of returning only the tear off portion, from time-to-time, customers return the entire document including the translation table to the institution. This can provide access by personnel at the institution to both the account number and the unencrypted personal identifier. Such knowledge by one or more institution personnel provides an undesirable breach in the security of the system.

Further, not every customer is comfortable with or capable of making the necessary table translation to produce the encrypted personal identifier. In addition, the institution must maintain a decoding table for each customer so that the encrypted personal identifier can be decoded on receipt for storage in the institution's data base.

The above noted systems while workable can at times be inconvenient. The self-encrypting system can result in disclosure of an unencrypted personal identifier in combination with an unencrypted copy of the account number or the name of the associated customer. Hence, there continues to be a need for a convenient, inexpensive and very secure way in which a customer, remotely located from an institution and its data base, can specify in an arbitrary fashion a personal identifier. There is also a continuing need to be able to transmit that identifier to the institution for entry into the data base while at the same time maintaining an appropriate level of security.

SUMMARY OF THE INVENTION

In accordance with the invention, an apparatus and a method are provided for receiving a previously unspecified and unencrypted personal identifier along with an encrypted account number and for securely transmitting that information to a data base. A document is provided to an account holder which includes, in preprinted form, an encrypted representation of the corresponding account number. The account holder enters an arbitrarily selected personal identifier onto the document.

The document is then returned to the issuing institution. A terminal can be located at the issuing institution for the purpose of entering, from the document, the preprinted, encrypted, account number and the arbitrarily selected identifier.

The terminal includes a keyboard or keypad for entry of the arbitrarily selected identifier. A second source of input, a bar code reader, is provided so that the preprinted account number can be accurately and quickly entered into the terminal. As an alternate, the keyboard or keypad could be used for entry of the encrypted account number.

Once the account number has been entered into the terminal it is decoded and checked for authenticity. Prior to having been imprinted on the returnable document, the customer account number could be encrypted in a variety of different ways. Any form of encryption can be used with the account number provided the terminal can readily carry out the decryption process.

A display is also provided on the terminal so that the entered representation of the encrypted account number and the entered representation of the identifier can be visually checked for accuracy by the operator. Subsequent to the account number having been checked for authenticity, assuming it is authentic, the decoded account number provides one of the inputs to a DES encryption circuit located in the terminal. Another input to the encryption circuit corresponds to a preassigned institution key which had previously been entered into the terminal. The arbitrarily selected and nonencrypted personal identifier is then combined with the output from the encryption circuit.

An encrypted output is then generated based on these three inputs. The encrypted representation of the personal identifier can then be transmitted, along with the corresponding account number, to the instution's data base for storage and for subsequent use in verification of transactions.

It is a particular advantage of the present invention that the return document, from which the encrypted account number and unencrypted personal identifier are obtained cannot be connected to the name of the account holder nor the account number itself. In the former instance, the name does not appear on the return document. In the latter instance, the account number only appears on the document in encrypted form for use within the terminal. Hence, the return document may be returned by the customer through the mail to a blind post office box number. Even if that document is intercepted, there is inadequate information on it to be of use in improperly obtaining funds or services in connection with the respective account.

The terminal in addition to the input devices noted previously includes a programmable processor and a control program prestored in read-only memory. The DES encryption circuit is electrically coupled to the programmable processor. Further, the terminal includes buffer drivers for driving the keypad and the liquid crystal display output device.

A keyswitch is provided which has an enabled state and a disabled state. In the enabled state the institution's DES encryption key can be entered into the terminal and stored in volatile memory in the DES encryption circuit. Any attempt to disconnect the terminal once the institution's DES key has been entered results in a loss of the previously entered key from the volatile memory once power is removed. Hence, it will be necessary to reenter the key any time the terminal is disconnected or in any other fashion experiences an interruption of power. The terminal also includes an RS232-C serial interface. This interface provides an input/output port through which the terminal can be coupled to a remote data base by either hard wiring, via an interface device, or by telecommunications.

Assuming that the institution's DES key has been previously entered, in accordance with the method of the present invention, the account number on the returned document is first entered into the terminal. The account number can be scanned using a barcode reader or can be entered through keypad. The account number is then checked for authenticity to determine whether or not it comes within the class of acceptable account numbers. Assuming the account number is one of the class of acceptable account numbers, the personal identifier is then entered off of the returned document via the keyboard. The identifier can be displayed while being entered so as to provide a visual check thereof. In addition, it can be verified by requiring re-entry by the operator.

Subsequent to entry of the personal identifier, that identifier is encrypted. A variety of encryption schemes could be used for this process. In a preferred embodiment, the DES encryption system described in Federal Information Processing Standard Publication No. 46, Jan. 15, 1977 is utilized. Inputs to the encryption process include the unencrypted, arbitrarily selected personal identifier; the instution's DES key; and the unencrypted account number to be associated with the personal identifier. Output from the DES encryption process is used to create an encrypted offset value.

In subsequent steps, the unencrypted account number and the offset, corresponding to the encrypted personal identifier, are transmitted to the institution's data base. If desired, the account number can be again encrypted prior to transmission.

A further advantage of the present apparatus and method is realized in that the unencrypted personal identifier is never transmitted out of the terminal. Only the encrypted offset value is transmitted to the data base.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
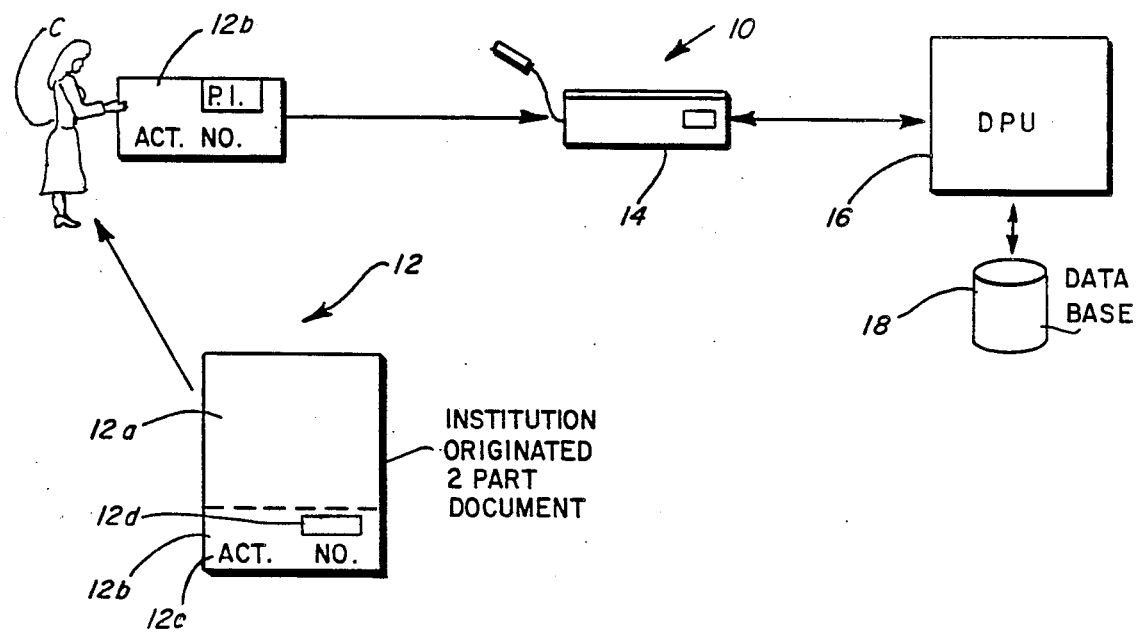
FIG. 1 is an overall diagram of a system and method in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

With respect to the figures, FIG. 1 illustrates a system and method in accordance with the present invention. An institution such as a bank or savings and loan can originate a two part document 12. Document 12 can include a descriptive and instructional portion 12a which could be in the form of a letter to the institution's customer. Removably attached to the informational portion 12a of the document 12 is a return portion 12b. The return portion 12b can include, preferably in encrypted form, the customer's account number in a region 12c. The portion 12b can also include a section 12d wherein the customer is requested to record an arbitrarily selected personal identifier.

The personal identifier recorded in the region 12d can be numeric or it can be alphanumeric. The customer then detaches the return portion 12b and in some fashion returns it to the institution either by mail or personal delivery. The portion 12b contains no identification of the customer except for the encrypted account number in the region 12c. In addition to maintain security the portion 12b need not contain a return address to the institution. Hence, if the return portion 12b is intercepted during delivery, an individual attempting to obtain improper access to the customer's account could learn what the personal identifier selected by the customer was as that is recorded on the return portion 12B in unencrypted form. However, the customer's account number only appears in the region 12c in encrypted form.

When the return document 12b arrives at the institution, a terminal 14 can be used to enter the personal identifier and the encrypted account number. The terminal 14 can be linked either by hardwiring, via an interface device, or telecommunications to the institution's data processing unit 16. Coupled to the institution's data processing unit 16 will be a data base usually resident on one or more disk drives 18.

The data base can be used to store a representation of the personal identifier in combination with a representation of the account number for subsequent transaction verification. Such verification is required when the customer attempts to carry out a transaction using an automated teller machine. In connection with that transaction both the account number and the personal identifier would be entered by the customer at the teller machine's keyboard. A representation of the personal identifier and the account number would then be transmitted to the institution's data processing unit 16. The representation of the personal identifier received from the teller machine can then be compared with the prerecorded representation of the personal identifier stored in the data base 18. If the entered personal identifier is the same as the previously stored personal identifier, the transaction can be permitted to proceed.

Figure 2:
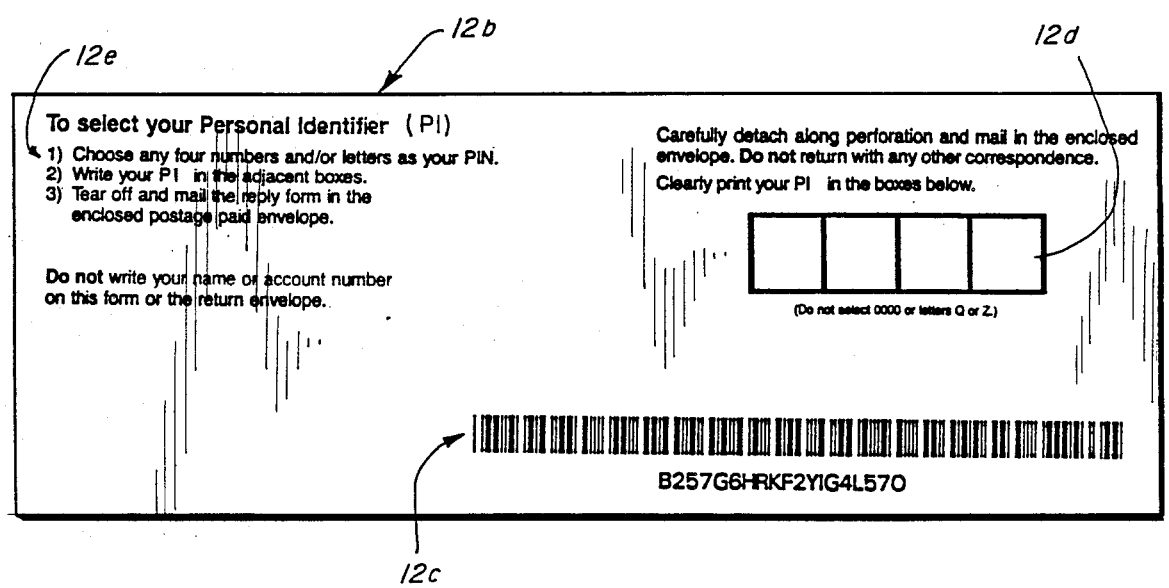
FIG. 2 is a top planar view of an exemplary personal identifier return document in accordance with the present invention.

FIG. 2 illustrates the details of the return portion 12b of the document 12. The return portion 12b can include a region 12e which contains further instructions to the customer. In the region 12c a bar code representation of the encoded account number can been preprinted. Immediately below the bar code representation is an alphanumeric representation of the encrypted account number.

In the region 12d a plurality of squares has been provided into which the personal identifier is to be entered or recorded by the customer. In the exemplary region 12d provision has been made for entry of a four element personal identifier. It will be understood that the number of the elements of the personal identifier is not a limitation of the present invention.

Figure 3A:
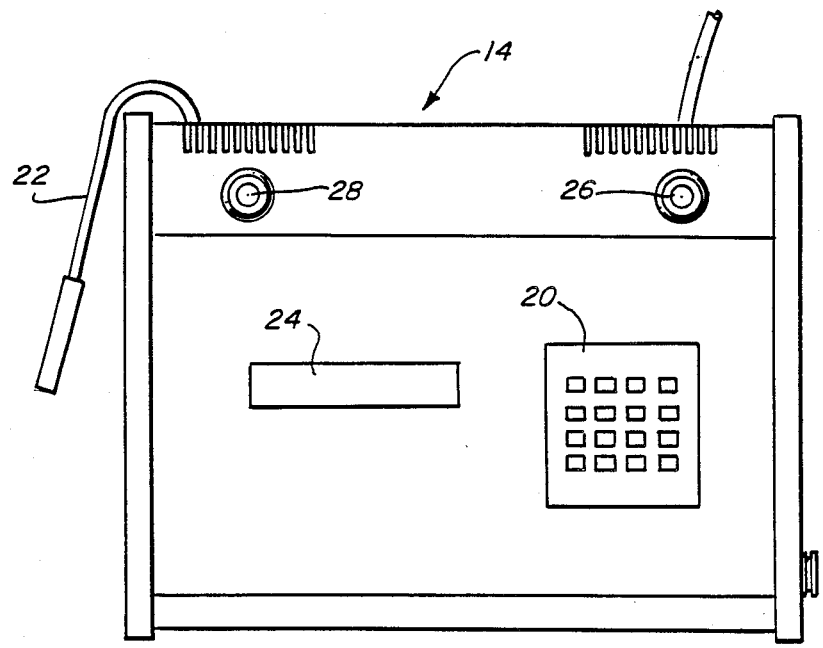
FIG. 3A is a top plan view of a terminal in accordance with the present invention.

FIG. 3A is a top plan view of the data entry terminal 14. Terminal 14 includes a keypad or keyboard 20 for control and for operator entry of the unencrypted personal identifier. A second input device, a bar code reader 22 is also provided with the terminal 14. The bar code reader 22 can be used to detect the preprinted bar code in the region 12c of the return document 12b. The bar code reader 22 could be a Hewlett Packard HBCS-4300 reader.

The terminal 14 also includes a visual display 24. The display 24 could be, for example, a 20 character per line, two line liquid crystal display.

The terminal 14 also includes an on-off key switch 26 and a key switch 28. The key switch 28 is for the purpose of enabling the terminal 14 to receive an institutional encryption key. Financial institutions commonly use an encryption scheme known as the DES encryption system. This system is described in Federal Information Processing Standard Publication No. 46, Jan. 15, 1977. It requires the entry of an institution's specific multi-element key for the purpose of properly decrypting information, or the encrypting of information by the institution. The terminal 14, as discussed subsequently, can provide DES encryption of the unencrypted personal identifier provided by the customer on the return document 12b.

Figure 3B:
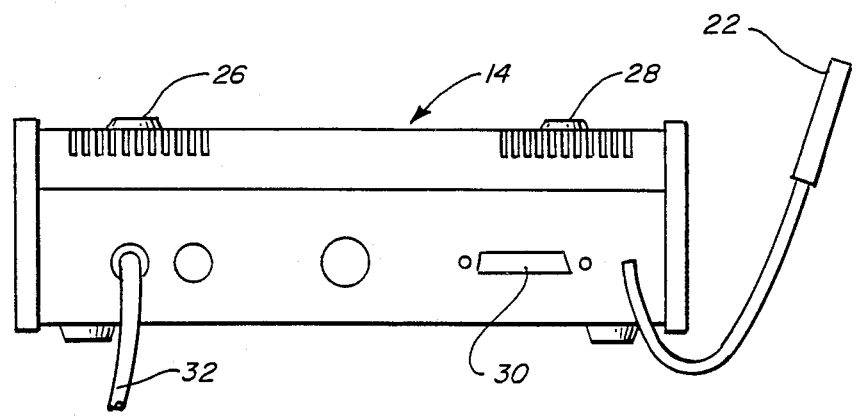
FIG. 3B is a rear plan view of the terminal of FIG. 3A.

FIG. 3B is a rear plan view of the terminal 14. The terminal 14 also includes a serial input/output port 30. The input/output port 30 is an RS232-C serial port through which the terminal 14 can be coupled to the data processing unit 60. The coupling can either be by hardwiring, via an interface device or by telecommunications. Power is provided to the terminal 14 by means of an AC line cord 32.

Figure 4A:
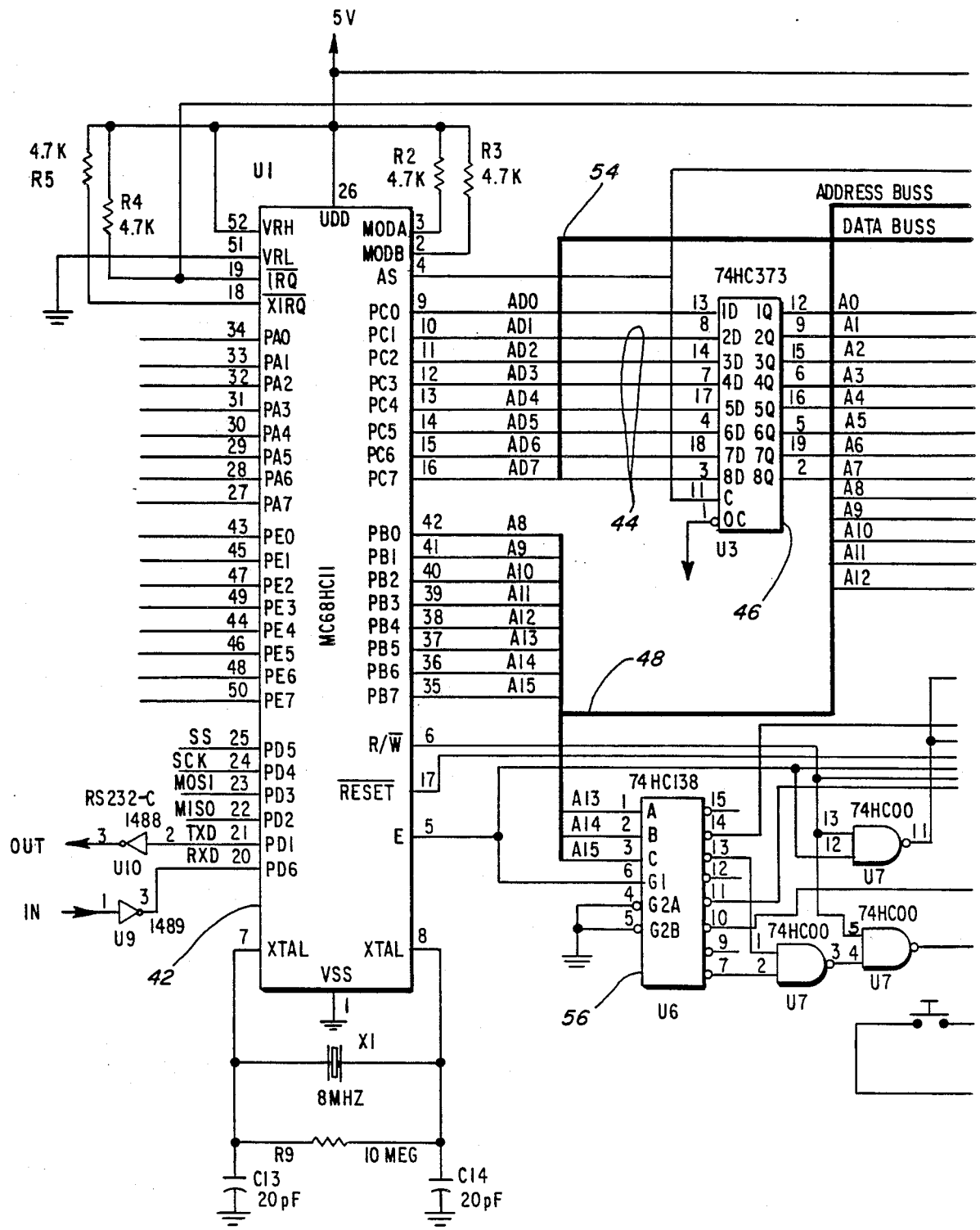
FIGS. 4A and B taken together are a schematic diagram of the circuitry of the present invention.
Figure 4A:
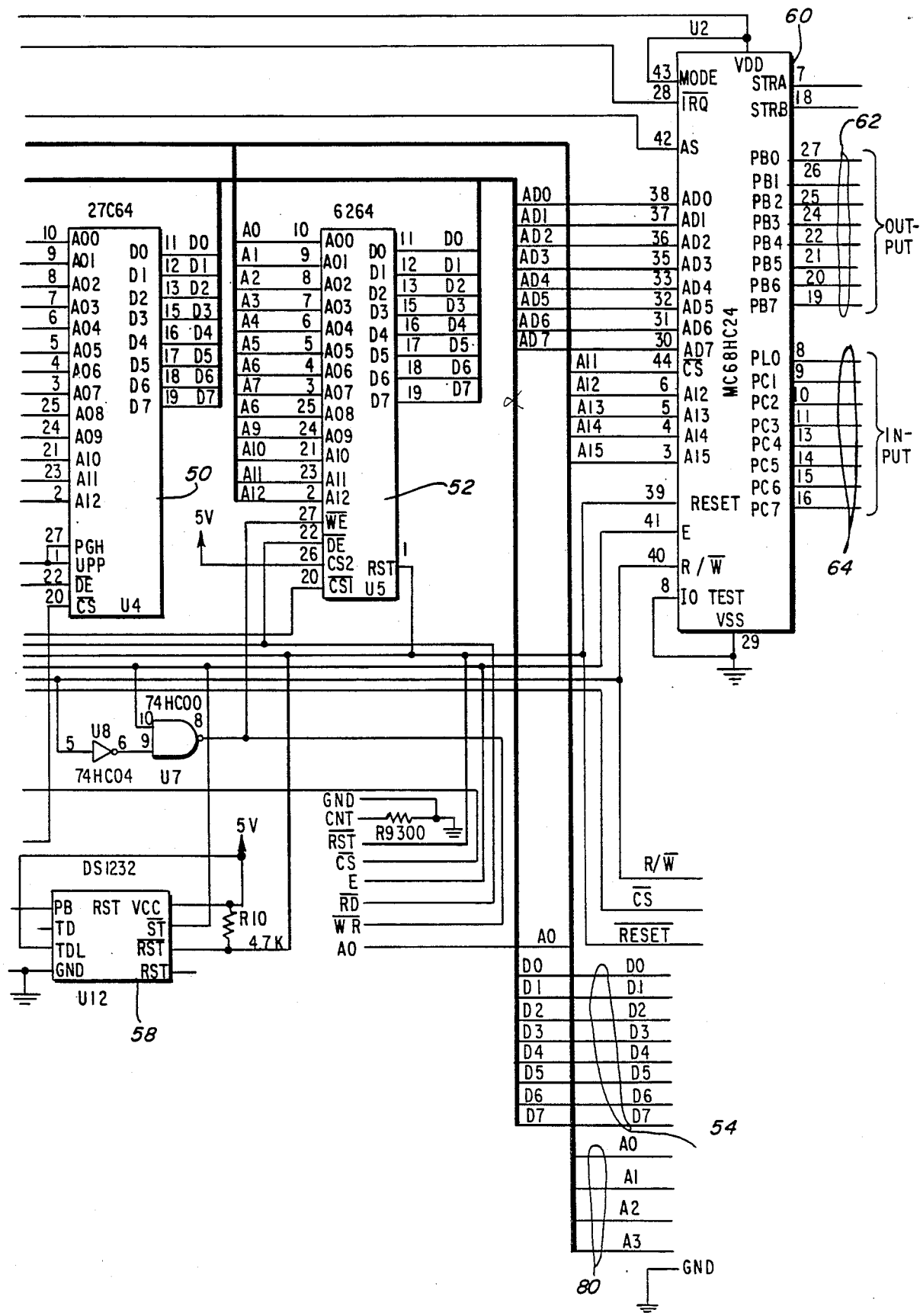
Figure 4B:
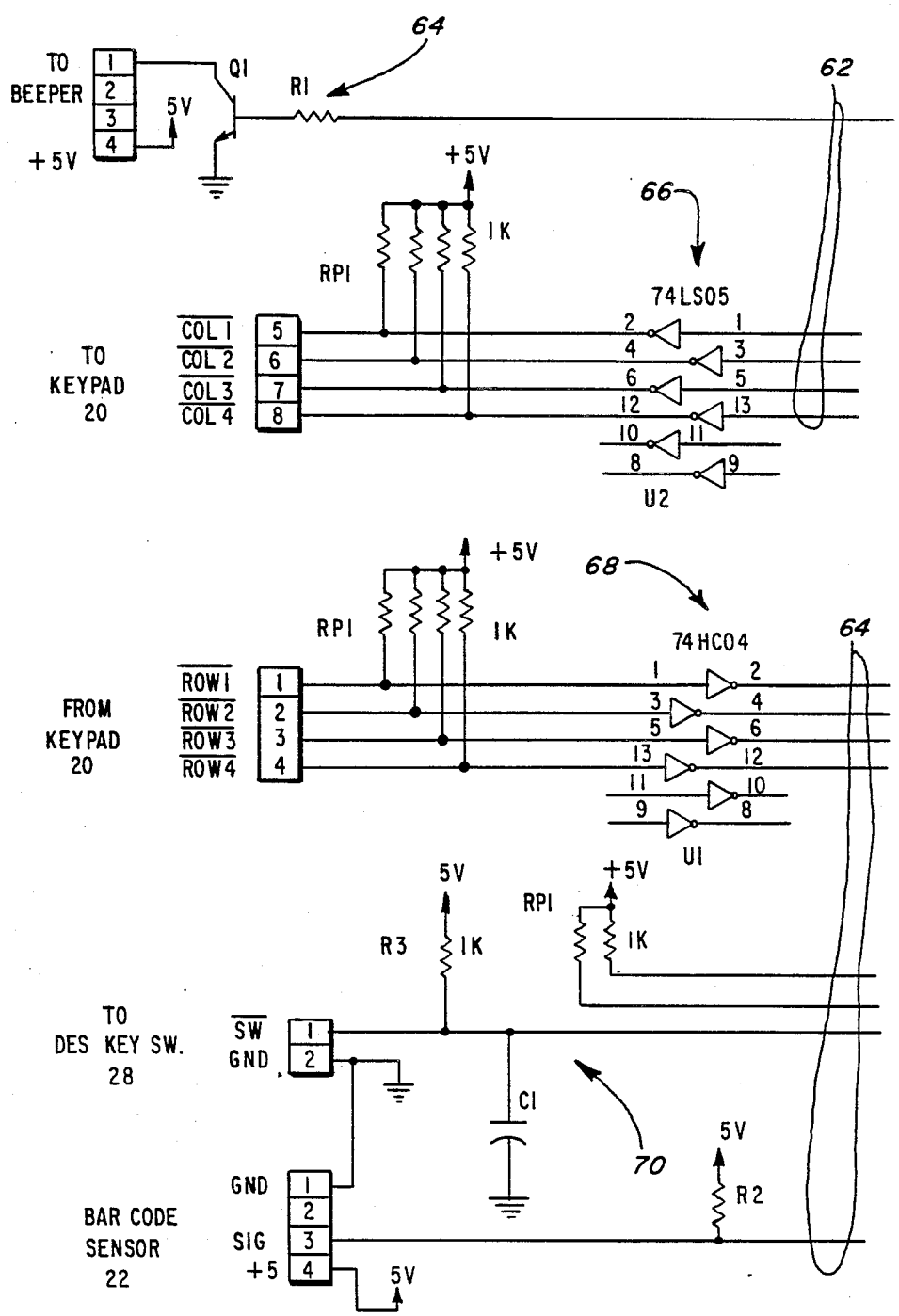
Figure 4B:
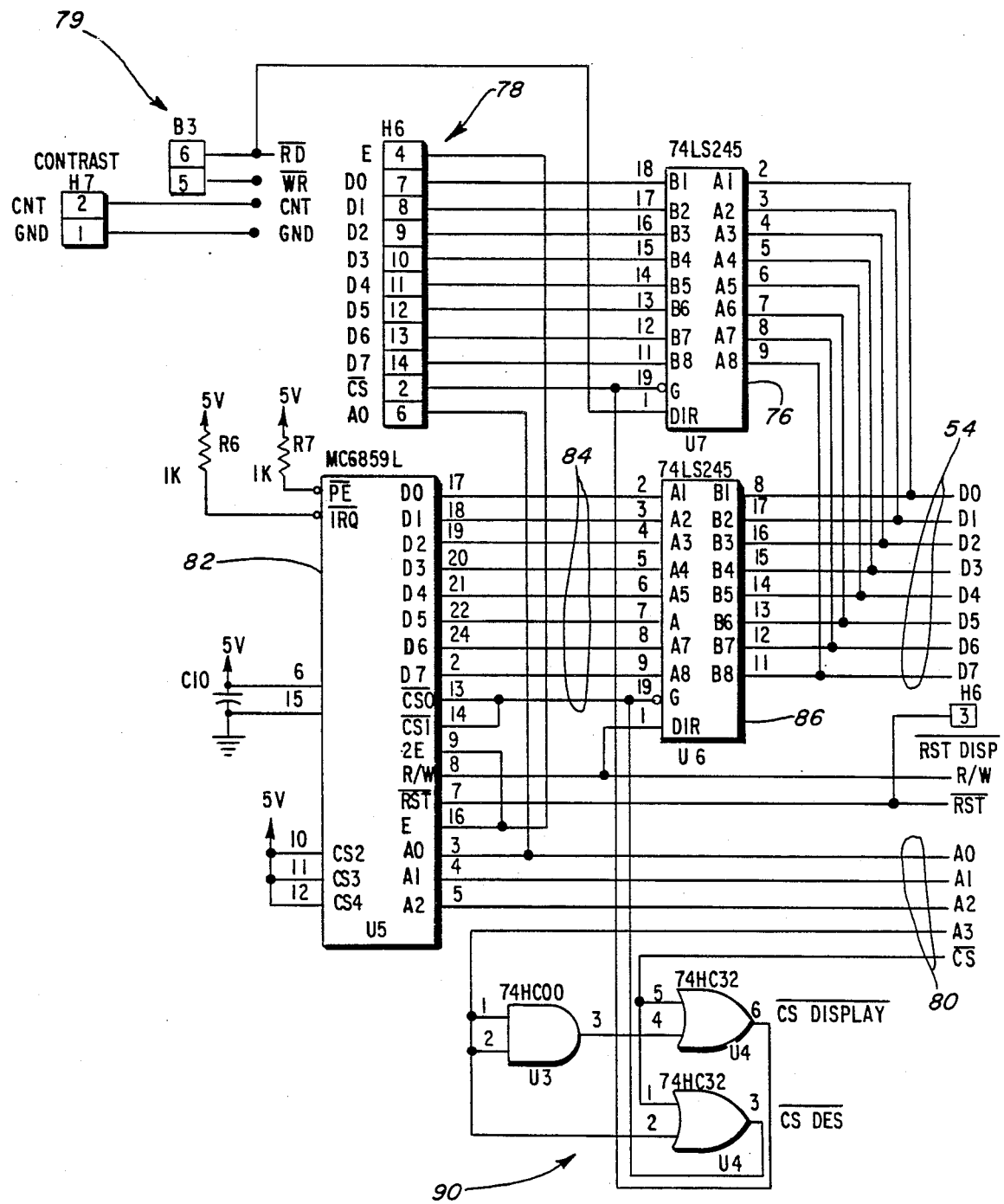

FIGS. 4A and 4B together are a schematic diagram of the programmable electronic control system incorporated into the terminal 14. The control system 40 includes a programmable processor 42 implementable as an MC68HC11 integrated circuit.

The processor 42 includes electrically erasable programmable read only memory. The description table can be loaded therein via the RS232-C port 30.

Addresses bits 0–7 on a plurality of lines 44 provide inputs to an address latch 46. The address latch 46 can be implemented as 74HC373 integrated circuit. Output from the address latch 46 along with additional address lines form an address bus 48.

The address bus 48 provides address input signals to a programmable read only memory 50. The programmable read only memory 50 is an 8K by 8 bit storage unit which can be implemented as a 27C64 integrated circuit. The memory 50 can be used for nonvolatile storage of a control program.

Also coupled to the address bus 48 is an 8K by 8 bit random access memory 52. The random access memory 52 can be implemented as a 6264 integrated circuit. Data inputs and outputs are provided on an 8 bit data bus 54.

Memory chips 50 and 52 are controlled by address decoder 56 and associated gating circuitry. The address decoder 56 can be implemented as a 78HC138 integrated circuit. Reset and initialization signals are provided by a reset conditioner 58. The reset conditioner can be implemented as DS1232 integrated circuit.

The address bus 48 along with the data bus 54 are coupled to an input/output expander circuit 60. The circuit 60 can be implemented as a MC68HC24 integrated circuit. The circuit 60 provides interfacing between the processor 42 and input/output devices associated with the terminal 14.

Device data outputs from the expander circuit 60 are provided on a plurality of output lines 62. With respect to FIG. 4B, outputs from the expander 60 on one of the lines 62 provide an input to beeper drive circuitry 64, and column drive circuitry 66 for the keypad 20. Beeper circuitry 64 can be used to generate an audio feedback tone to the operator.

Device input signals are provided to the expander circuit 60 on a plurality of input lines 64. Signals are received on several of the lines 64 from row sensors 68 which are coupled to the rows of the keypad 20, key switch 28 which is coupled to members of the plurality of lines 64 utilizing circuitry 70 and input from the bar code sensor 22 using another member of the plurality of lines 64.

The data bus 54 also provides data inputs to a display buffer 76. The display buffer 76 can be implemented as a 74 LS245 buffer. Outputs from the display buffer 76, on a plurality of lines 78, and a plurality of lines 79 provide drive signals to the 40 character liquid crystal display 24. The liquid crystal display 24 can be type EPSON EA-X20027AZ.

A plurality of lines 80 which includes four lines from the address bus 48 provides address inputs to an encryption circuit 82. The circuit 82 can be, for example, a DES encryption circuit type MC6859L. Output from the encryption circuit 82, on a plurality of lines 84, and via buffer 86 is coupled to the data bus 54.

There is thus a bidirectional data communications path between the processor 42 and the encryption chip 82 along the bus 54. Address decoders 90 determine which of the buffers 76 or 86 is active at any one time.

Figure 5A:
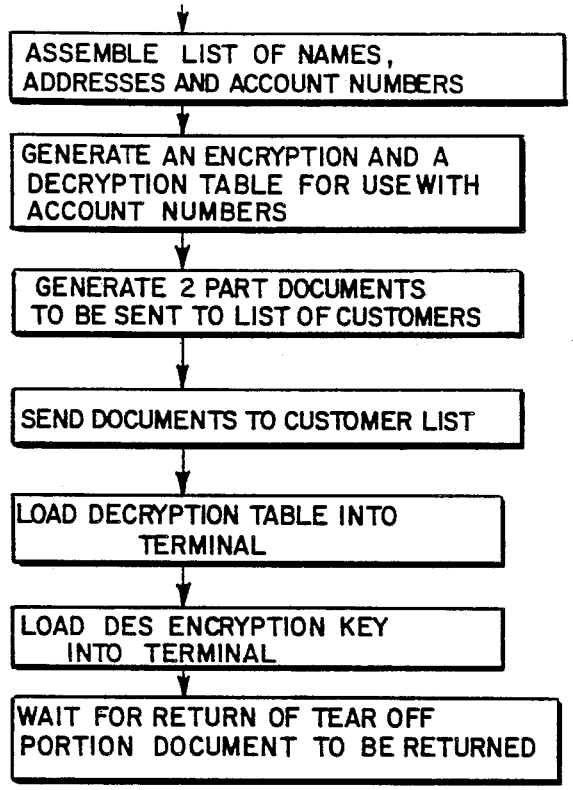
FIGS. 5A and 5B together are a flow diagram of a method in accordance with the present invention.
Figure 5B:
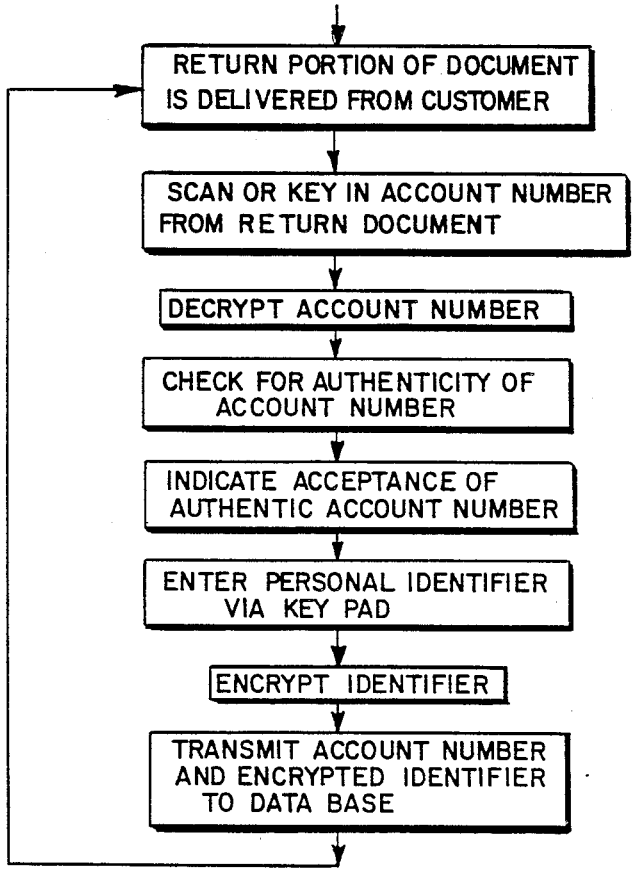

FIGS. 5A and 5B together are a flow diagram illustrating the steps of a method in accordance with the present invention. In an initial step, an institution would assemble a list of names, addresses and corresponding account numbers. An encryption and a decryption table would be generated for use in encrypting and decrypting the account numbers. It will be understood with respect to the present invention that, the form of encryption or decryption of the account numbers is not a limitation of the present invention. Encryption tables represent only one form of encryption that can be used. Alternately, an encryption algorithm and corresponding decryption algonithm could be used.

The two part documents are then generated from the list of names, addresses. The corresponding encrypted account number is entered onto the separable, return, portion of the two part document as was previously discussed with respect to FIG. 2. The documents are then sent to the customers on the list. They can be sent via the mail or they can be personally delivered.

Subsequently, the corresponding decryption table is loaded into the computer terminal. The institution's DES encryption key is also loaded into the terminal, assuming it is an institution with an assigned DES encryption key. Then it is necessary to wait for the return of the tear off portions of the documents.

Upon receipt of the return portion of the document including the preprinted, encrypted account number as well as the unencrypted personal identifier recorded thereon the account number is scanned or keyed into the terminal from the document. Within the terminal the account number is decrypted and is checked for authenticity. Authenticity checking can include use of mod 10 check digits as is well known in the financial industry and described by the Luhn Formula in ISO 7812-1985E.

The terminal can by generation of a tone on its internal beeper indicate acceptance of an authentic account number. The operator can then enter the unencrypted personal identifier, which has been written on the return portion of the document, via the keypad. The identifier can then be encrypted taking into account the account number and the previously entered encryption key. The account number and the encrypted identifier can then be transmitted to the institution's data base. If desired, the account number could be again encrypted prior to transmission. At that time the operator can then go on to the next document.

Attached hereto as an Addendum is a listing of a control program usable with the electronic system 40.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

Copyright 1987, Rand McNally & Company

ADDENDUM

```
0001      ***********************************************************
0002      *
0003      *
0004      *
0005      *
0006      *                                                           -
0007      *
0008      *
0009      *
0010      ***********************************************************
0011      *
0012      *         SYSTEM EQUATES
0013      *
0014 1000 BASE      EQU    $1000      BASE ADDRESS FOR REGISTERS
0015 D000 CHIP      EQU    $D000
0016 1004 PORTB     EQU    $0004+BASE PORT B DATA REGISTER
0017 1003 PORTC     EQU    $0003+BASE PORT C DATA REGISTER
0018 1008 DDRC      EQU    $0008+BASE PORT C DATA DIRECTION REGIST
0019 1008 PORTD     EQU    $1008      *PORT D DATA REGISTER
0020 1009 PDDDR     EQU    $1009      *PORT D DATA DIRECTION REGIST
0021 1039 OPTION    EQU    $039+BASE  OPTION CONTROL REGISTER
0022 102B SCBR      EQU    $02B+BASE  BAUD RATE REGISTER
0023 102C SCCR1     EQU    $02C+BASE  SERIAL CONTROL REGISTER 1
0024 102D SCCR2     EQU    $02D+BASE  SERIAL CONTROL REGISTER 2
0025 102E SCSR      EQU    $02E+BASE  SERIAL STATUS REGISTER
0026 102F SCDR      EQU    $02F+BASE  SERIAL DATA REGISTER
0027 1026 PACTL     EQU    $026+BASE  DDR7 FOR PORTA DD7
```

```
0028 1024          TIMR2      EQU       $024+BASE  TIMER INTERRUPT REGISTER 2
0029 1025          TFLG2      EQU       $025+BASE  RTI FLAG REGISTER
0030 3FFF          STACK      EQU       $3FFF      SYSTEM STACK
   1 6000          DISCTRL    EQU       $6000      DISPLAY CONTROL
0032 6001          DISDATA    EQU       $6001      DISPLAY DATA STATUS
0033 103B          PPROG      EQU       $103B
0034               *
0035               *
0036               * RESERVED PORT DEFINITONS
0037               *
0038               * PORTB   0 OUT KEYBOARD COL 1
0039               *         1 OUT           COL 2
0040               *         2 OUT           COL 3
0041               *         3 OUT           COL 4
0042               *         4 OUT BEEPER
0043               *
0044               * PORTC   0 IN  KEYBOARD ROW 1
0045               *         1 IN            ROW 2
0046               *         2 IN            ROW 3
0047               *         3 IN            ROW 4
0048               *         4 IN  BAR CODE READER
0049               *         5 IN  DES KEY SWITCH
0050               *
0051               *SYSTEM EEPROM
0052               *
0053               * THE EEPROM IS USED TO STORE THE BOX MASTER PASSWORD AND
0054               * DECRYPTION DATA TABLES.  ALL TABLES ARE CHECKSUMMED WITH
0055               * A MOD 256 SUM.
0056               *
0057 B600                     ORG       $B600
0058               *
0059 B600          EEPROM     RMB       246
0060 B6F6          USPW       RMB       10
0061               *RMB256DATA TABLE
0062               *
0063               *         SYSTEM DATA STORAGE
0064               *
0065               *
0066 2000                     ORG       $2000      ORG FOR TEST DATA
0067               *
0068 2000          DESKY1     RMB       17
0069 2011          DESFLG     RMB       1
0070 2012          COMTIM     RMB       1
0071 2013          CHOUT      RMB       1
0072 2014          DMARK      RMB       1
0073 2015          CNTLOC     RMB       1
0074 2016          CNTLOC1    RMB       1
0075 2017          ACTFLG     RMB       1
0076 2018          ACTCNT     RMB       1
0077 2019          CSUM       RMB       2
0078 201B          CSUM1      RMB       2
0079 201D          STRTLOC    RMB       1
0080 201E          NCODE      RMB       1
0081 201F          NMESS      RMB       1
0082 2020          KFLAG      RMB       1
0083 2021          TMOFLG     RMB       1
0084 2022          ECHO       RMB       1
0085 2023          TEMP9      RMB       1
0086 2024          BEEPFLG    RMB       1
0087 2025          TEMPSUM    RMB       1
0088 2026          STORAGE    RMB       1
0089 2027          OUTPTR     RMB       2
0090 2029          WRAP       RMB       1
0091 202A          OFFSET     RMB       1
0092 202B          COUNT      RMB       2
0093 202D          OFFSET1    RMB       1
0094 202E          PIN1BUF    RMB       5
0095 2033          PIN2BUF    RMB       5
0096 2038          ARFLG      RMB       1
0097 2039          CHARCNT    RMB       1
0098 203A          ACCTCOD    RMB       20
0099 204E          DACCTCD    RMB       20
0100 2062          EACCTCD    RMB       20
0101 2076          PW1        RMB       10
0102 2080          PW2        RMB       10
0103 208A          MPW        RMB       10
0104 2094          PW1PTR     RMB       2
```

```
0105 2096              PW2PTR   RMB      2
0106 2098              ACCTP    RMB      2
0107 209A              PINCOD   RMB      25
0108 20B3              CLRHLD   RMB      2
0109 20B5              TIMZ     RMB      2
0110 20B7              CURMES   RMB      1
0111 20B8              TOUT     RMB      1
0112 20B9              PWPTR    RMB      2
0113 20BB              COMBUF   RMB      1024
0114 24BB              COMPTR   RMB      2
 '5  24BD              DDATA    RMB      256
 16  25BD              BUF1     RMB      512
0117 27BD              WORK1    RMB      1
0118 27BE              LENGTH   RMB      1
0119 27BF              MID      RMB      1
(  0 27C0              MSGBUF   RMB      25
 . 1 27D9              MSGEND   RMB      2
0122 27DB              TABLOC   RMB      1
0123 27DC              TABPIC   RMB      1
0124 27DD              BUFPOS   RMB      2
0125 27DF              MULT     RMB      1
0126 27E0              TEMP     RMB      1
0127 27E1              TEMP1    RMB      1
0128 27E2              DISPAS1  RMB      2
0129 27E4              DISPAS2  RMB      2
0130 27E6              DISROW   RMB      1
0131 27E7              DISCOL   RMB      1
0132 27E8              POINTER  RMB      2
0133 27EA              PININC   RMB      1
0134 27EB              CRCBYTE  RMB      1
0135                   *
0136                   *
0137 E000                       ORG      $E000           PROGRAM START ADDRESS
0138                   *
0139 E000 7EF5A2       COLD     JMP      INITROM
0140                   *
0141 E003 37           DELAYQ   PSHB
0142 E004 18CE1003              LDY      #PORTC
0143 E008 C60C                  LDAB     #$0C            DATA SAMPLE RATE
0144 E00A 4F                    CLRA
0145 E00B 181E001001   DELAYW   BRSET    0,Y,$10,DLAYW1
0146 E010 4C                    INCA
(  7 E011 5A           DLAYW1   DECB
  8  F 12 26F7                  BNE      DELAYW
0149 1  4 33                    PULB
0150 E015 39                    RTS
0151 E016 8602         DELAYD   LDAA     #$02
0152 E018 4A           DLAYED   DECA                     LESS 1
0153 E019 26FD                  BNE      DLAYED
0154 E01B 39                    RTS
0155                   *
0156                   * SECTION LOOKS FOR BAR TRANSITIONS
0157                   *
0158 E01C BDE165       TRANSI   JSR      BUFCLR
0159 E01F 5F                    CLRB                     RESET B TO 00
0160 E020 B61003       WAITWH   LDAA     PORTC           GET PORT DATA
0161 E023 8410                  ANDA     #$10            ISOLATE PEN BIT
0162 E025 270D                  BEQ      WAITWH1         NOT ON WHITE THEN LOOP
0163 E027 BDF2D3                JSR      KYBD
0164 E02A 4D                    TSTA
0165 E02B 2707                  BEQ      WAITWH1
0166 E02D B72020                STAA     KFLAG
0167 E030 7F201E                CLR      NCODE
0168 E033 39                    RTS
0169 E034 BDE016       WAITWH1  JSR      DELAYD          DEBOUNCE
0170 E037 B61003                LDAA     PORTC
0171 E03A 8410                  ANDA     #$10
0172 E03C 26E2                  BNE      WAITWH
(  3 E03E B61003       WAITBL   LDAA     PORTC           GET PORT DATA
   4 E041 8410                  ANDA     #$10            ISOLATE PEN BIT
0175 E043 260D                  BNE      WAITBLB         WAIT FOR BLACK
0176 E045 BDF2D3                JSR      KYBD
0177 E048 4D                    TSTA
(  8 E049 27F3                  BEQ      WAITBL
   9 E04B B72020                STAA     KFLAG
0180 E04E 7F201E                CLR      NCODE
0181 E051 39                    RTS
```

```
0182 E052 BDE016    WAITBLB  JSR    DELAYD    DEBOUNCE
0183 E055 B61003             LDAA   PORTC
0184 E058 8410               ANDA   #$10
0185 E05A 27E2               BEQ    WAITBL
0186 E05C CE25BD             LDX    #BUF1
0187 E05F 2020               BRA    PENOF1
0188 E061 5C       PENBEG    INCB
0189 E062 2603               BNE    PENNER
0190 E064 7EE125             JMP    MAIN1
0191 E067 BDE003   PENNER    JSR    DELAYQ
0192 E06A 8102               CMPA   #$02
0193 E06C 23F3               BLS    PENBEG
0194 E06E E700     PENON     STAB   0,X
0195 E070 08                 INX
0196 E071 8C27BD             CPX    #BUF1+512
0197 E074 2EA6               BGT    TRANSI
0198 E076 5F                 CLRB
0199 E077 18FE27BE           LDY    LENGTH    * GET OLD LENGTH
0200 E07B 1808               INY              * ONE MORE BIT IS IN THE BAG
0201 E07D 18FF27BE           STY    LENGTH    * SAVE NEW LENGTH
0202 E081 5C       PENOF1    INCB
0203 E082 2603               BNE    PENOF2
0204 E084 7EE125             JMP    MAIN1
0205 E087 BDE003   PENOF2    JSR    DELAYQ
0206 E08A 8105               CMPA   #$05
0207 E08C 24F3               BHS    PENOF1
0208 E08E E700     PENOFF    STAB   0,X
0209 E090 5F                 CLRB
0210 E091 08                 INX              * BUMP THE TABLE POINTER
0211 E092 8C27BD             CPX    #BUF1+512
0212 E095 2E85               BGT    TRANSI
0213 E097 18FE27BE           LDY    LENGTH    * GET OLD LENGTH
0214 E09B 1808               INY              * JUST A BIT LONGER
0215 E09D 18FF27BE           STY    LENGTH    * SAVE LENGTH
0216 E0A1 20BE               BRA    PENBEG    * CONTINUE TO SCAN
0217                *
0218                * THIS ROUTINE IS THE MAIN WAIT LOOP. THE RSTART PORTION W
0219                * FOR THE DES KEY OR A FUNCTION KEY TO BE PRESSED ON BOOT
0220                * THE RUNNER LABEL IS THE STANDARD JUMP LOCATION FOR A RET
0221                * FROM A SUBROUTINE. THE STACK IS RESTORED UPON ENTRY.
0222                *
0223 E0A3 8E3FFF   RSTART    LDS    #STACK    * GET STACK ADDRESS
0224 E0A6 BDEA5D             JSR    INISPW
0225 E0A9 8601               LDAA   #$01
0226 E0AB B71004             STAA   PORTB
0227 E0AE B61003             LDAA   PORTC
0228 E0B1 84FF               ANDA   #$FF
0229 E0B3 2716               BEQ    RSTART9
0230 E0B5 B61003             LDAA   PORTC
0231 E0B8 8401               ANDA   #$01
0232 E0BA 2705               BEQ    RSTART2
0233 E0BC BDF0D4             JSR    VERSION
0234 E0BF 200A               BRA    RSTART9
0235 E0C1 B61003   RSTART2   LDAA   PORTC
0236 E0C4 8402               ANDA   #$02
0237 E0C6 2703               BEQ    RSTART9
0238 E0C8 BDE3C4             JSR    SLFTST
0239 E0CB 7F1004   RSTART9   CLR    PORTB
0240 E0CE BDE698             JSR    INIPW
0241 E0D1 BDE61A             JSR    INIDAT
0242 E0D4 BDF39F             JSR    DISCLR    * CLEAR DISPLAY
0243 E0D7 BDF459             JSR    STRTMES   * DISPLAY START MESSAGE
0244 E0DA BDEDBC             JSR    DKEY      * GO LOOKING FOR DES KEY
0245 E0DD 86FF               LDAA   #$FF
0246 E0DF B72024             STAA   BEEPFLG
0247 E0E2 8E3FFF   RUNNER    LDS    #STACK    * RELOAD TOP OF STACK
0248 E0E5 86FF               LDAA   #$FF      * SET FOR NO CODE
0249 E0E7 B7201E             STAA   NCODE     * STORE AWAY IF CLEAR NO CODE
0250 E0EA 7F2020             CLR    KFLAG     * INSURE KEY FLAG IS CLEAR
0251 E0ED CE203A             LDX    #ACCTCOD  * GET ACCOUNT ADDRESS
0252 E0F0 FF2098             STX    ACCTP     * STORE ADDRESS AWAY
0253 E0F3 BDF39F             JSR    DISCLR    * CLEAR THE DISPLAY
0254 E0F6 CEF9B5             LDX    #PERN     * DISPLAY FIRST MESSAGE
0255 E0F9 BDF3CE             JSR    MESSD
0256 E0FC 7F201F             CLR    NMESS     * DELAY FOR THAT MESSAGE
0257 E0FF BDF0E6   RUNNER1   JSR    GACT      * GO BAR AND KEY HUNTING
0258 E102 BDF39F             JSR    DISCLR    * CLEAR DISPLAY
0259 E105 CEFB3A             LDX    #ACTMSG
```

```
0260 E108 BDF3BE                JSR     MESSDA
0261 E10B CE204D                LDX     #ACCTCOD+19
0262 E10E BC2098                CPX     ACCTP
0263 E111 26CF                  BNE     RUNNER
0264 E113 BDEF74                JSR     SBEEP
0265 E116 7F2038                CLR     ARFLG
0266 E119 BDF482                JSR     DECPRT
0267 E11C BDF50D                JSR     CRCSUM
0268 E11F BDEFB6                JSR     PININ
0269 E122 7EE0E2     CODEIN1    JMP     RUNNER      * GO BACK
0270                 *
0271                 * PROCESS SECTION DETERMINES CODE SCAN DIRECTION
0272                 * WILL JUMP TO EITHER FORWARD OR REVERSE ROUTINES
0273                 * IT CHECKS FOR A INTIAL CODE LENGHT i.e. AT LEAST 9 BARS
0274                 *
0275 E125 FE27BE     MAIN1      LDX     LENGTH      * GET LENGTH OF BUFFER
0276 E128 8C0012                CPX     #$0012      * COMPARE FOR AT LEAST START
0277 E12B 2404                  BHS     BAR39       * NO CODE IF LESS THAN
0278 E12D 7F201E                CLR     NCODE       * WE DONT HAVE A CODE
0279 E130 39                    RTS                 * SO RETURN ELSE GOTO BAR39
0280 E131 CE25BE     BAR39      LDX     #BUF1+1     * GET BAR BUFFER + 1
0281 E134 BDE1B5                JSR     BLD39       * BUILD A CODE
0282 E137 2529                  BCS     NGOOD       * IF CARRY SET NOT A START OR
0283 E139 CEF65D                LDX     #TABLEA     * LOAD X WITH TABLE A
0284 E13C 3A                    ABX                 * GET ADDRESS INTO TABLE
0285 E13D A600                  LDAA    0,X         * GET VALUE FROM TABLE
0286 E13F 812A                  CMPA    #$2A        * IS VALUE A START CODE
0287 E141 2609                  BNE     REV         * NO TRY FOR STOP
0288 E143 CE27C0                LDX     #MSGBUF     * GET ADDRESS OF MESSAGE BUFF
0289 E146 FF27D9                STX     MSGEND      * STORE ADDRESS AWAY
0290 E149 7EE1EC                JMP     FORWARD     * CODE IS GOING FORWARD
0291                 *
0292                 *
0293 E14C BDE178     REV        JSR     REVERS      * REVERSE THE BITS IN CARRY A
0294 E14F CEF65D                LDX     #TABLEA     * GET TABLE A ADDRESS
0295 E152 3A                    ABX                 * GET ADDRESS INTO TABLE
0296 E153 A600                  LDAA    0,X         * GET VALUE FROM TABLE
0297 E155 812A                  CMPA    #$2A        * IS VALUE A STOP CODE
0298 E157 2609                  BNE     NGOOD       * NOT A STOP THEN ERROR MESSA
0299 E159 CE27C0                LDX     #MSGBUF     * GET ADDRESS OF MESSAGE BUFF
0300 E15C FF27D9                STX     MSGEND      * STORE ADDRESS AWAY
0301 E15F 7EE230                JMP     REVERSE     * CODE IS GOING REVERSE
0302                 *
0303                 *
0304 E162 7EE262     NGOOD      JMP     ERROR       * JUMP TO ERROR DISPLAY
0305                 *
0306                 * ROUTINE CLEARS BUFFER AND MEMORY AREAS FOLLOWING UP TO
0307                 * STACK POSITION AND STOPS BEFORE DESTROYING RETURN
0308                 * ADDRESS
0309                 *
0310 E165 CE25BD     BUFCLR     LDX     #BUF1       * LOAD START CLEAR ADDRESS
0311 E168 BF20B3                STS     CLRHLD      * STORE STACK POINTER AWAY
0312 E16B 8600                  LDAA    #$00        * CLEAR A OUT
0313 E16D BC20B3     BUFCLR1    CPX     CLRHLD      * COMPARE X TO STORE STACK PO
0314 E170 2705                  BEQ     CLRDONE     * IF ITS EQUAL THEN STOP
0315 E172 A700                  STAA    X           * CLEAR MEMORY LOCATION
0316 E174 08                    INX                 * NEXT MEMORY LOCATION TO CLE
0317 E175 20F6                  BRA     BUFCLR1     * MAKE ANOTHER PASS
0318 E177 39         CLRDONE    RTS                 * ALL DONE RETURN
0319                 *
0320                 * THIS ROUTINE REVERSES THE BARCODE BITS FOR A REVERSE SCA
0321                 * THE X REGISTER IS SAVED
0322                 * THE ROUTINE SHOULD BE ENTERED WITH B CONTAINING THE CODE
0323                 * THE CARRY BIT CONTAINING BIT 9 OF THAT CODE
0324                 * THE ROUTINE WILL RETURN TABSECT IN CARRY AND TABADDR IN
0325                 *
0326 E178 3C         REVERS     PSHX
0327 E179 CE0009                LDX     #$0009      * SHIFT COUNTER
0328 E17C 56         NROTATE    RORB                * PUT CARRY IN B AND BIT 0 IN
0329 E17D 49                    ROLA                * GET CARRY INTO A
0330 E17E 09                    DEX
0331 E17F 26FB                  BNE     NROTATE     * DONE ROTATING THE REGISTERS
0332 E181 B727DB                STAA    TABLOC      * STORE TABLE ADDRESS AWAY
0333 E184 16                    TAB                 * PUT TABLE ADDRESS IN B
0334 E185 07                    TPA                 * MOVE CCR TO A
0335 E186 B727DC                STAA    TABPIC      * STORE A IN TABLE SECLET
0336 E189 38                    PULX                * GET X BACK
0337 E18A 39                    RTS
```

```
0338                    *
0339                    *
0340                    * THIS ROUTINE CALCUALTES THE MID POINT OF THE BAR LENGTHS
0341                    * IT STORES THIS VALUE IN MEMORY LOCATION MID
0342                    * A COMPANSATION FACTOR OF 25% IS BUILT IN OF BAR LENTH ER
0343                    *
0344 E18B 3C      MID39    PSHX                * PUT X ON STACK
0345 E18C C609             LDAB     #$09       * NUMBER OF BARS TO SUM
0346 E18E F727BD           STAB     WORK1      * MOVE TO MEMORY LOCATION
0347 E191 4F               CLRA                * CLEAN UP A
0348 E192 5F               CLRB                * CLEAN UP B
0349 E193 18CE0000         LDY      #$0000     * CLEAN UP Y FOR SUMMATION
0350 E197 E600   MID39A    LDAB     0,X        * PUT BAR X IS POINTING TO IN
0351 E199 183A             ABY                 * ADD B TO Y
0352 E19B 08               INX                 * NEXT BAR LOCATION
0353 E19C 7A27BD           DEC      WORK1      * DECREMENT ONE MORE BAR DONE
0354 E19F 26F6             BNE      MID39A     * NOT DONE DO ONE MORE SUM
0355 E1A1 188F             XGDY                * EXCHANGE D AND Y
0356 E1A3 CE0009           LDX      #$0009     * PUT DIVISOR IN X
0357 E1A6 02               IDIV                * DIVIDE Y BY X
0358 E1A7 8F               XGDX                * EXCHANGE X AND D
0359 E1A8 F727BF           STAB     MID        * STORE AWAY THE TRUE MID
0360 E1AB 54               LSRB                * DIVIDE B BY 2
0361 E1AC 54               LSRB                * DIVIDE B BY 2
0362 E1AD FB27BF           ADDB     MID        * ADD B AND MID  FUDGE FACTOR
0363 E1B0 F727BF           STAB     MID        * STORE COMPANSATED MID
0364 E1B3 38               PULX                * GET X BACK
0365 E1B4 39               RTS
0366                    *
0367                    * BUILD 3 OF 9 CODE
0368                    * ROUTINE WILL TAKE CURRENT X AS POINTER INTO TABLE TO BUI
0369                    * ROUTINE RETURNS 8 BITS IN B AND 9 th BIT IN CARRY
0370                    * THIS INFORMATION MAY NEED ROTATION IF CODE WAS SCANNED I
0371                    * X REGISTER WILL CONTAIN THE NEXT AVAILABLE BAR IT IS ALS
0372                    * IN BUFPOS
0373                    *
0374 E1B5 BDE18B   BLD39    JSR      MID39      * GET THE MID POINT
0375 E1B8 8609             LDAA     #$09       * SET LENGTH OF CODE
0376 E1BA B727BD           STAA     WORK1      * STORE COUNT AWAY
0377 E1BD 4F               CLRA                * CLEAN A
0378 E1BE 5F               CLRB                * CLEAN B
0379 E1BF A600    CNTBLD   LDAA     X          * GET BAR INTO A
0380 E1C1 B127BF           CMPA     MID        * COMPARE WITH MIDPOINT
0381 E1C4 2504             BLO      BAR0       * IS BAR LESS THAN MID
0382 E1C6 0D               SEC                 * SET CARRY BIT
0383 E1C7 59               ROLB                * GET 1 BIT IN B
0384 E1C8 2001             BRA      NXTBAR     * GO FOR NEXT BAR
0385 E1CA 58      BAR0     LSLB                * SHIFT B OVER A BIT
0386 E1CB 08      NXTBAR   INX                 * NEXT BAR LOCATION
0387 E1CC 7A27BD           DEC      WORK1      * ONE MORE BAR DONE
0388 E1CF 26EE             BNE      CNTBLD     * DONE YET
0389 E1D1 07               TPA                 * GET CARRY IN A
0390 E1D2 8401             ANDA     #$01       * MASK ALL EXCEPT CARRY
0391 E1D4 270B             BEQ      BLDDONE    * IF ZERO THEN DONE
0392 E1D6 0D               SEC                 * INSURE CARRY SET
0393 E1D7 F727DB           STAB     TABLOC     * STORE TABLE ADDR AWAY
0394 E1DA B727DC           STAA     TABPIC     * STORE TABLE SELECT AWAY
0395 E1DD FF27DD           STX      BUFPOS     * STORE X NEXT DECODE LOCATIO
0396 E1E0 39               RTS                 * RETURN FROM ROUTINE
0397 E1E1 0C      BLDDONE  CLC                 * INSURE CARRY CLEAR TABLEA
0398 E1E2 F727DB           STAB     TABLOC     * STORE TABLE ADDR AWAY
0399 E1E5 7F27DC           CLR      TABPIC     * CLEAR TABLE SECLECT
0400 E1E8 FF27DD           STX      BUFPOS     * STORE X NEXT DECODE LOCATIO
0401 E1EB 39               RTS                 * RETURN FROM ROUTINE
0402                    *
0403                    * THIS ROUTINE WILL DECODE THE BARCODE AFTER FINDING
0404                    * 1) BARCODE GOING FORWARD
0405                    * 2) AND STOP AFTER FINDING THE STOP CODE
0406                    * 3) IF NO STOP IS FOUND OR NONE VALID CODE WILL TERMINATE
0407                    *
0408 E1EC FE27DD   FORWARD  LDX      BUFPOS     * GET BAR BUFFER LOCATION
0409 E1EF 08               INX                 * SKIP THE INTER CHAR GAP
0410 E1F0 BDE1B5           JSR      BLD39      * GO BUILD THE BAR
0411 E1F3 2505             BCS      FORTABB    * CHECK THE CARRY BIT
0412 E1F5 CEF65D           LDX      #TABLEA    * LOAD X WITH TABLE B ADDRESS
0413 E1F8 2003             BRA      FORWRD1    * WERE GOING FORWARD AGAIN
0414 E1FA CEF75D   FORTABB  LDX      #TABLEB    * LOAD X WITH TABLE B ADDRESS
```

```
0415 E1FD 3A       FORWRD1  ABX                  * ADD B TO X FOR ACTUAL ADDRE
0416 E1FE A600              LDAA    0,X          * GET THE VALUE FROM LOCATION
0417 E200 8100              CMPA    #$00         * CHECK FOR VALID CODE
0418 E202 2603              BNE     FORDONE      * CODE OK
0419 E204 7EE262            JMP     ERROR        * ERROR CODE
0420 E207 FE27D9   FORDONE  LDX     MSGEND       * GET ADDRESS OF MESSAGE BUFF
0421 E20A A700              STAA    0,X          * STORE A AWAY IN LOCATION
0422 E20C 08                INX                  * NEXT MESSAGE LOCATION PLEAS
0423 E20D FF27D9            STX     MSGEND       * STORE MESSAGE BUFF POINTER
0424 E210 812A              CMPA    #$2A         * CHECK FOR STOP CODE
0425 E212 2703              BEQ     DONER        * ARE WE DONE YET
0426 E214 7EE1EC            JMP     FORWARD      * NOT DONE YET NEXT CHARACTER
0427 E217 BDE21B   DONER    JSR     MSGOUTF      * PUT MESSAGE OUT FORWARD
0428 E21A 39                RTS                  * RETURN TO RUNNER
0429                *
0430                * OUTPUT OF MESSAGE ROUTINE FOR FORWARD GOING CODES
0431                *
0432 E21B CE27C0   MSGOUTF  LDX     #MSGBUF      * GET MESSAGE BUFF ADDRESS
0433 E21E A600     MSGOUT1  LDAA    0,X          * LOAD THE VALUE AT ADDRESS X
0434 E220 812A              CMPA    #$2A         * CHECK FOR STOP CODE
0435 E222 2706              BEQ     MSGDONE      * STOP CODE FINISH UP
0436 E224 BDE29B            JSR     ACCTC        * PUT IN HOLD BUFFER
0437 E227 08                INX                  * NEXT MESSAGE BUFF LOCATION
0438 E228 20F4              BRA     MSGOUT1      * GO GET NEXT LOCATION
0439 E22A 860A     MSGDONE  LDAA    #$0A         * GIVE MESSAGE A LINE FEED
0440 E22C BDE29B            JSR     ACCTC        * PUT IN HOLD AND DISPLAY
0441 E22F 39                RTS                  * RETURN BACK
0442                *
0443                * THIS ROUTINE WILL DECODE THE BARCODE SCANNED IN REVERSE
0444                * 1) IT WILL STOP AFTER FINDING THE START CODE
0445                * 3) IF NO START OR NONE VALID CODE WILL TERMINATE
0446                *
0447 E230 FE27DD   REVERSE  LDX     BUFPOS       * GET NEXT BAR LOCATION
0448 E233 08                INX                  * SKIP INTER CHARACTER SPACE
0449 E234 BDE1B5            JSR     BLD39        * GO BUILD THE CODE
0450 E237 BDE178            JSR     REVERS       * REVERSE THE CODE
0451 E23A 2505              BCS     REVERB       * SELECT TABLE
0452 E23C CEF65D            LDX     #TABLEA      * PUT ADDRESS OF TABLE A IN X
0453 E23F 2003              BRA     REVER1       * WERE GOING REVERSE AGAIN
0454 E241 CEF75D   REVERB   LDX     #TABLEB      * PUT ADDRESS OF TABLE B IN X
0455 E244 3A       REVER1   ABX                  * ADD OFFSET IN B TO X
0456 E245 A600              LDAA    0,X          * GET TABLE VALUE
0457 E247 8100              CMPA    #$00         * CHECK FOR VALID CODE
0458 E249 2603              BNE     REVDONE      * VALID CODE CONTINUE
0459 E24B 7EE262            JMP     ERROR        * ERROR CODE
0460 E24E FE27D9   REVDONE  LDX     MSGEND       * GET MESSAGE BUFFER ADDRESS
0461 E251 A700              STAA    0,X          * STORE CHARACTER IN LOCATION
0462 E253 08                INX                  * NEXT MESSAGE LOCATION PLEAS
0463 E254 FF27D9            STX     MSGEND       * STORE MESSAGE END AWAY
0464 E257 812A              CMPA    #$2A         * CHECK FOR START CODE
0465 E259 2703              BEQ     REVSTP       * DISPLAY CODE IF DONE
0466 E25B 7EE230            JMP     REVERSE      * BUILD NEXT CHARACTER
0467 E25E BDE284   REVSTP   JSR     MSGOUTR      * PUT MESSAGE OUT REVERSE
0468 E261 39                RTS                  * RETURN TO RUNNER
0469                *
0470                * ERROR CODE DISPLAY
0471                *
0472 E262 7D201F   ERROR    TST     NMESS
0473 E265 2619              BNE     ERR2A
0474 E267 CEF8D6            LDX     #ERRMSG      * GET ADDRESS OF MESSAGE IN X
0475 E26A A600     ERROR1   LDAA    0,X          * LOAD ERROR MESSAGE IN A
0476 E26C 8104              CMPA    #$04         * CHECK FOR END OF MESSAGE
0477 E26E 2706              BEQ     ERRDON       * END OF MESSAGE ENDDON
0478 E270 BDF3F3            JSR     DISDAT1      * PUT CHARACTER TO DISPLAY
0479 E273 08                INX                  * GET NEXT MESSAGE ADDRESS
0480 E274 20F4              BRA     ERROR1       * DO ONE MORE TIME
0481 E276 BDEF5D   ERRDON   JSR     RTID         * DELAY FOR A WHILE
0482 E279 CE203A            LDX     #ACCTCOD
0483 E27C 8604              LDAA    #$04
0484 E27E A700              STAA    0,X
0485 E280 7F201E   ERR2A    CLR     NCODE
0486 E283 39                RTS                  * GO FOR ANOTHER SCAN
0487                *
0488                * ROUTINE REVERSES THE ORDER OF THE CHARACTERS DISPLAYED
0489                *
0490 E284 FE27D9   MSGOUTR  LDX     MSGEND       * LOAD END ADDRESS OF MESSAGE
0491 E287 09                DEX                  * GET PAST EMPTY LOCATION
```

```
0492 E288 09          MSGR1     DEX                          * GET PAST START CODE
0493 E289 8C27C0                CPX       #MSGBUF            * CHECK ADDRESS FOR VALIDITY
0494 E28C 2507                  BLO       MSGDONR            * INVALID WE ARE DONE
0495 E28E A600                  LDAA      0,X                * LOAD MESSAGE BYTE
0496 E290 BDE29B                JSR       ACCTC              * PUT IN HOLD BUFFER
0497 E293 20F3                  BRA       MSGR1              * GO FOR ANOTHER
0498 E295 860A      MSGDONR     LDAA      #$0A               * LOAD A WITH LINE FEED
0499 E297 BDE29B                JSR       ACCTC              * PUT IN HOLD BUFFER AND CUT
0500 E29A 39                    RTS                          * GO BACK
0501                *
0502                * ACCOUNT CODE MEMORY STORAGE ROUTINE
0503                *
0504 E29B 3C        ACCTC       PSHX
0505 E29C FE2098                LDX       ACCTP
0506 E29F 810A                  CMPA      #$0A
0507 E2A1 2708                  BEQ       ACCTCD
0508 E2A3 A700                  STAA      0,X
0509 E2A5 08                    INX
0510 E2A6 FF2098                STX       ACCTP
0511 E2A9 38                    PULX
0512 E2AA 39                    RTS
0513 E2AB 8604      ACCTCD      LDAA      #$04
0514 E2AD A700                  STAA      0,X
0515 E2AF 38                    PULX
0516 E2B0 39                    RTS
0517                *
0518                * WAIT FOR REPLY FROM MAINFRAME ON THE COMPLETION OF A SUB
0519                * THIS WILL DISPLAY A PLEASE WAIT MESSAGE UNTIL A CHARACTE
0520                * RECIEVED. IT WILL THE DISPLAY ANY VALID CHARACTER RECIEV
0521                * THE LCD.  THE ROUTINE WILL TIME OUT ON WAITING AND RETUR
0522                *
0523 E2B1 86FF      ACTWAI      LDAA      #$FF
0524 E2B3 B72017                STAA      ACTFLG
0525 E2B6 7F2018                CLR       ACTCNT
0526 E2B9 2006                  BRA       COMWAA
0527 E2BB 7F2017    COMWAI      CLR       ACTFLG
0528 E2BE 7F2018                CLR       ACTFLG+1
0529 E2C1 BDF39F    COMWAA      JSR       DISCLR             * PRINT WAIT MSG
0530 E2C4 CEF9DF                LDX       #LOGMSG
0531 E2C7 BDF3CE                JSR       MESSD
0532 E2CA 7F27BD                CLR       WORK1
0533 E2CD 7F2039                CLR       CHARCNT
0534 E2D0 B6102F                LDAA      SCDR               * FLUSH BUFFER
0535 E2D3 B6102F                LDAA      SCDR
0536 E2D6 8603      COMWA0      LDAA      #$03               * SET UP WAIT
0537 E2D8 B72015                STAA      CNTLOC
0538 E2DB CEFFFF    COMWA1      LDX       #$FFFF
0539 E2DE F6102E    COMWA2      LDAB      SCSR
0540 E2E1 C420                  ANDB      #$20
0541 E2E3 2609                  BNE       COMWA3
0542 E2E5 09                    DEX
0543 E2E6 26F6                  BNE       COMWA2
0544 E2E8 7A2015                DEC       CNTLOC
0545 E2EB 26EE                  BNE       COMWA1
0546 E2ED 39                    RTS
0547 E2EE 7D2017    COMWA3      TST       ACTFLG
0548 E2F1 271C                  BEQ       ANSWAI
0549 E2F3 B6102F                LDAA      SCDR
0550 E2F6 812A                  CMPA      #'*'
0551 E2F8 2610                  BNE       COMWA7
0552 E2FA 7D2018                TST       ACTCNT
0553 E2FD 2706                  BEQ       COMWA8
0554 E2FF 7F2017                CLR       ACTFLG
0555 E302 7EE2D6                JMP       COMWA0
0556 E305 7C2018    COMWA8      INC       ACTCNT
0557 E308 20CC                  BRA       COMWA0
0558 E30A 7F2018    COMWA7      CLR       ACTCNT
0559 E30D 20C7                  BRA       COMWA0
0560 E30F B6102F    ANSWAI      LDAA      SCDR               * GET CHARACTER
0561 E312 811B                  CMPA      #$1B               * ANSI ESCAPE
0562 E314 262D                  BNE       COMWA5
0563 E316 8603      ANSWA2      LDAA      #$03
0564 E318 B72015                STAA      CNTLOC
0565 E31B CEFFFF    ANSWA3      LDX       #$FFFF
0566 E31E F6102E    ANSWA4      LDAB      SCSR
0567 E321 C420                  ANDB      #$20
0568 E323 2609                  BNE       ANSWA5
0569 E325 09                    DEX
```

```
0570 E326 26F6                      BNE      ANSWA4
0571 E328 7A2015                    DEC      CNTLOC
0572 E32B 26EE                      BNE      ANSWA3
0573 E32D 39                        RTS
0574 E32E B6102F         ANSWA5     LDAA     SCDR
0575 E331 18CEFBFE                  LDY      #ANSITAB
0576 E335 18A100         ANSWA1     CMPA     ,Y
0577 E338 272F                      BEQ      ANSWA6      * DONE WITH ANSI
0578 E33A 186D00                    TST      ,Y
0579 E33D 27D7                      BEQ      ANSWA2
0580 E33F 1808                      INY
0581 E341 20F2                      BRA      ANSWA1
0582 E343 7D27BD         COMWA5     TST      WORK1       * CLEAR SCREEN IF FIRST
0583 E346 260A                      BNE      COMWA4
0584 E348 36                        PSHA
0585 E349 86FF                      LDAA     #$FF
0586 E34B B727BD                    STAA     WORK1
0587 E34E BDF39F                    JSR      DISCLR
0588 E351 32                        PULA
0589 E352 36              COMWA4    PSHA
0590 E353 B62039                    LDAA     CHARCNT
0591 E356 8113                      CMPA     #19
0592 E358 2E0B                      BGT      COMWA11
0593 E35A 4C                        INCA
0594 E35B B72039                    STAA     CHARCNT
0595 E35E 32                        PULA
0596 E35F BDF3EC                    JSR      DISDAT      * PRINT CHARACTER
0597 E362 7EE2D6                    JMP      COMWA0
0598 E365 32              COMWA11   PULA
0599 E366 7EE2D6                    JMP      COMWA0
0600 E369 814B            ANSWA6    CMPA     #'K'
0601 E36B 2707                      BEQ      ANSWA7
0602 E36D 814A                      CMPA     #'J'
0603 E36F 2703                      BEQ      ANSWA7
0604 E371 7EE2D6                    JMP      COMWA0
0605 E374 01              ANSWA7    NOP                  JSR       DISCLR
0606 E375 7EE2D6                    JMP      COMWA0
0607                      *
0608                      * TURN INTERRUPT DRIVEN COM ON. THIS ROUTINE WILL INITIALI
0609                      * POINTER TO THE COM BUFFER AND TURN ON ALL INTERRUPTS.
0610                      *
0611 E378 0F              COM1UP    SEI                  * INTERRUPTS OFF
0612 E379 B6102E          COM1UP1   LDAA     SCSR        * FLUSH SCI
0613 E37C 8420                      ANDA     #$20
0614 E37E 27F9                      BEQ      COM1UP1
0615 E380 B6102F                    LDAA     SCDR
0616 E383 20F4                      BRA      COM1UP1
0617 E385 B6102D          COM1UP2   LDAA     SCCR2       * ENABLE RXD INT
0618 E388 8A20                      ORAA     #$20
0619 E38A B7102D                    STAA     SCCR2
0620 E38D CE20BB                    LDX      #COMBUF     * RESET POINTER
0621 E390 FF24BB                    STX      COMPTR
0622 E393 0E                        CLI                  * INTERRUPTS ON
0623 E394 39                        RTS
0624                      *
0625                      * TURN THE INTERRUPT DRIVEN COM OFF
0626                      *
0627 E395 0F              COM1DN    SEI                  * INTERRUPTS OFF
0628 E396 B6102D                    LDAA     SCCR2       * DISABLE RXD INT
0629 E399 84DF                      ANDA     #$DF
0630 E39B B7102D                    STAA     SCCR2
0631 E39E 0E                        CLI                  * INTERRUPTS ON
0632 E39F 39                        RTS
0633                      *
0634                      * GET A CHARACTER FROM THE SCI ON AN INTERRUPT
0635                      *
0636 E3A0 B6102E          COM1GET   LDAA     SCSR        * CHECK FOR ERROR
0637 E3A3 840E                      ANDA     #$0E
0638 E3A5 2705                      BEQ      COM1GT1
0639 E3A7 B6102F                    LDAA     SCDR
0640 E3AA 2017                      BRA      COM1GT9
0641 E3AC B6102F          COM1GT1   LDAA     SCDR        * GET CHARACTER
0642 E3AF 8120                      CMPA     #' '
0643 E3B1 2D10                      BLT      COM1GT9
0644 E3B3 817A                      CMPA     #'z'
0645 E3B5 2E0C                      BGT      COM1GT9
0646 E3B7 FE24BB                    LDX      COMPTR
```

```
0647 E3BA A700                    STAA      ,X
0648 E3BC 08                      INX
0649 E3BD FF24BB                  STX       COMPTR
0650 E3C0 BDF3EC                  JSR       DISDAT
0651 E3C3 39         COM1GT9      RTS
0652              *
0653              * DES SELF TEST ROUTINE. THIS ROUTINE IS ENTERED ON BOOT U
0654              * HOLDING DOWN THE B KEY AND IS EXIT BY STRIKING ANY OTHER
0655              * USE THIS WITH THE PC PROGRAM DESTST
0656              *
0657 E3C4 BDF39F   SLFTST          JSR      DISCLR
0658 E3C7 CEF938                   LDX      #SLFMSG
0659 E3CA BDF3CE                   JSR      MESSD
0660 E3CD BDEF7D                   JSR      LBEEP
0661 E3D0 7F2022                   CLR      ECHO
0662 E3D3 B61003   SLFTST0         LDAA     PORTC     * LET GO OF BUTTON
0663 E3D6 840F                     ANDA     #$0F
0664 E3D8 26F9                     BNE      SLFTST0
0665 E3DA 7F1004                   CLR      PORTB
0666 E3DD CE20BB   SLFTST01        LDX      #COMBUF   * RESET COM BUFFER
0667 E3E0 860D                     LDAA     #$0D
0668 E3E2 A700                     STAA     ,X
0669 E3E4 B6102F                   LDAA     SCDR
0670 E3E7 BDF39F   SLFTST11        JSR      DISCLR
0671 E3EA BDEA48                   JSR      CURSON
0672 E3ED F6102E   SLFTST1         LDAB     SCSR      * WAIT FOR COM
0673 E3F0 C420                     ANDB     #$20
0674 E3F2 2716                     BEQ      SLFTST2
0675 E3F4 B6102F                   LDAA     SCDR
0676 E3F7 810D                     CMPA     #$0D
0677 E3F9 2754                     BEQ      SLFTST3
0678 E3FB 8108                     CMPA     #$08
0679 E3FD 2605                     BNE      SLFTST12
0680 E3FF BDE469                   JSR      SLFBAC
0681 E402 20E9                     BRA      SLFTST1
0682 E404 8130     SLFTST12        CMPA     #'0'
0683 E406 2DDF                     BLT      SLFTST11
0684 E408 2045                     BRA      SLFTST3
0685 E40A 86FF     SLFTST2         LDAA     #$FF
0686 E40C B72024                   STAA     BEEPFLG
0687 E40F 3C                       PSHX
0688 E410 BDF2D3                   JSR      KYBD
0689 E413 38                       PULX
0690 E414 4D                       TSTA
0691 E415 27D6                     BEQ      SLFTST1
0692 E417 8140                     CMPA     #'@'
0693 E419 26D2                     BNE      SLFTST1
0694 E41B BDEF74                   JSR      SBEEP
0695 E41E 39                       RTS
0696              *
0697 E41F CE20BB   SLFTST7         LDX      #COMBUF
0698 E422 A600     SLFTST5         LDAA     ,X        * PARSE NEXT FIELD
0699 E424 810D                     CMPA     #$0D
0700 E426 2603                     BNE      SLFTST9
0701 E428 7EE3DD                   JMP      SLFTST01
0702 E42B 814B     SLFTST9         CMPA     #'K'      * KEY FIELD
0703 E42D 2605                     BNE      SLFTST6
0704 E42F BDE47B                   JSR      COMKEY
0705 E432 20EE                     BRA      SLFTST5
0706 E434 8150     SLFTST6         CMPA     #'P'      * ENCRYPT FIELD
0707 E436 2605                     BNE      SLFTST4
0708 E438 BDE499                   JSR      COMENC
0709 E43B 20E5                     BRA      SLFTST5
0710 E43D 8153     SLFTST4         CMPA     #'S'      * DECRYPT FIELD
0711 E43F 2605                     BNE      SLFTST8
0712 E441 BDE4CC                   JSR      COMDEC
0713 E444 20DC                     BRA      SLFTST5   * GET NEXT FIELD
0714 E446 08       SLFTST8         INX
0715 E447 8C24BB                   CPX      #COMBUF+1024
0716 E44A 2DD6                     BLT      SLFTST5
0717 E44C 7EE3DD                   JMP      SLFTST01  * INPUT OVERFLOW
0718 E44F A700     SLFTST3         STAA     ,X
0719 E451 BDF619                   JSR      TXCHAR
0720 E454 08                       INX
0721 E455 810D                     CMPA     #$0D
0722 E457 27C6                     BEQ      SLFTST7
0723 E459 3C                       PSHX
0724 E45A BDF3EC                   JSR      DISDAT
```

```
0725 E45D 38                         PULX
0726 E45E 8C24BB                     CPX      #COMBUF+1024
0727 E461 2603                       BNE      SLFTSTA
0728 E463 7EE3DD                     JMP      SLFTST01
0729 E466 7EE3ED       SLFTSTA       JMP      SLFTST1
0730                   *
0731 E469 8C20BB       SLFBAC        CPX      #COMBUF
0732 E46C 270C                       BEQ      SLFBAC1
0733 E46E 09                         DEX
0734 E46F BDF619                     JSR      TXCHAR
0735 E472 8607                       LDAA     #$07
0736 E474 BDF396                     JSR      DISSET
0737 E477 7A27E7                     DEC      DISCOL
0738 E47A 39           SLFBAC1       RTS
0739                   *
0740                   * GET KEY FROM COM BUFFER AFTER A K WAS FOUND
0741                   *
0742 E47B 08           COMKEY        INX
0743 E47C 18CE2000                   LDY      #DESKY1
0744 E480 C610                       LDAB     #16
0745 E482 A600         COMKEY1       LDAA     ,X
0746 E484 18A700                     STAA     ,Y
0747 E487 08                         INX
0748 E488 1808                       INY
0749 E48A 5A                         DECB
0750 E48B 26F5                       BNE      COMKEY1
0751 E48D 8604                       LDAA     #$04
0752 E48F 18A700                     STAA     ,Y
0753 E492 3C                         PSHX
0754 E493 BDEB08                     JSR      CKDES
0755 E496 38                         PULX
0756 E497 09                         DEX
0757 E498 39                         RTS
0758                   *
0759                   * DES ENCRPYT POINTED TO BY X AFTER A P WAS FOUND IN THE
0760                   *
0761 E499 08           COMENC        INX
0762 E49A 18CE2062                   LDY      #EACCTCD
0763 E49E C610                       LDAB     #16
0764 E4A0 A600         COMENC1       LDAA     ,X
0765 E4A2 18A700                     STAA     ,Y
0766 E4A5 08                         INX
0767 E4A6 1808                       INY
0768 E4A8 5A                         DECB
0769 E4A9 26F5                       BNE      COMENC1
0770 E4AB 8604                       LDAA     #$04
0771 E4AD 18A700                     STAA     ,Y
0772 E4B0 3C                         PSHX
0773 E4B1 86FF                       LDAA     #$FF
0774 E4B3 B72011                     STAA     DESFLG
0775 E4B6 BDEC5A                     JSR      ENDES
0776 E4B9 8604                       LDAA     #$04
0777 E4BB B72072                     STAA     EACCTCD+16
0778 E4BE CE2062                     LDX      #EACCTCD
0779 E4C1 BDF60C                     JSR      MSG
0780 E4C4 860D                       LDAA     #$0D
0781 E4C6 BDF619                     JSR      TXCHAR
0782 E4C9 38                         PULX
0783 E4CA 09                         DEX
0784 E4CB 39                         RTS
0785                   *
0786                   * DES DECRPYT A NUMBER AFTER A S WAS FOUND IN THE COM BUFF
0787                   *
0788 E4CC 08           COMDEC        INX
0789 E4CD 18CE2062                   LDY      #EACCTCD
0790 E4D1 C610                       LDAB     #16
0791 E4D3 A600         COMDEC1       LDAA     ,X
0792 E4D5 18A700                     STAA     ,Y
0793 E4D8 08                         INX
0794 E4D9 1808                       INY
0795 E4DB 5A                         DECB
0796 E4DC 26F5                       BNE      COMDEC1
0797 E4DE 8604                       LDAA     #$04
0798 E4E0 18A700                     STAA     ,Y
0799 E4E3 3C                         PSHX
0800 E4E4 86FF                       LDAA     #$FF
0801 E4E6 B72011                     STAA     DESFLG
0802 E4E9 BDECE6                     JSR      DEDES
```

```
0803 E4EC 8604                   LDAA    #$04
0804 E4EE B72072                 STAA    EACCTCD+16
0805 E4F1 CE2062                 LDX     #EACCTCD
0806 E4F4 BDF60C                 JSR     MSG
0807 E4F7 860D                   LDAA    #$0D
0808 E4F9 BDF619                 JSR     TXCHAR
0809 E4FC 38                     PULX
0810 E4FD 09                     DEX
0811 E4FE 39                     RTS
0812                      *
0813                      * MOVE DATA TABLE USED FOR RMC DECRYPT INTO RAM BUFFER THE
0814                      * SUM AGREES WITH THE PC SUM SEND A 09 THE STORE THE TABLE
0815                      * EEPROM WITH A CHECKSUM. IF A DATA ERROR OCCURS THEN SEND
0816                      * RETRY THE OPERATION
0817                      *
0818 E4FF B6102F  LTABLE   LDAA    SCDR    * FLUSH BUFFER
0819 E502 01                      NOP
0820 E503 01                      NOP
0821 E504 B6102E                  LDAA    SCSR
0822 E507 840E                    ANDA    #$0E
0823 E509 26F4                    BNE     LTABLE
0824 E50B B6102E                  LDAA    SCSR
0825 E50E 8420                    ANDA    #$20
0826 E510 26ED                    BNE     LTABLE
0827 E512 BDE7A3                  JSR     GETPW   * GET PASSWORD
0828 E515 BDF39F                  JSR     DISCLR
0829 E518 CEFA33                  LDX     #LDMSG
0830 E51B BDF3CE                  JSR     MESSD
0831 E51E BDF2D3  LTABLE0  JSR     KYBD    * KEY TO EXIT
0832 E521 4D                      TSTA
0833 E522 2675                    BNE     LTABDUN
0834 E524 F6102E                  LDAB    SCSR
0835 E527 C420                    ANDB    #$20
0836 E529 27F3                    BEQ     LTABLE0
0837 E52B B6102F                  LDAA    SCDR
0838 E52E 8107                    CMPA    #$07
0839 E530 26EC                    BNE     LTABLE0
0840 E532 8604    LTABLE2  LDAA    #$04
0841 E534 B7102F                  STAA    SCDR
0842 E537 CE24BD                  LDX     #DDATA
0843 E53A 18CE00FF                LDY     #$00FF  * 255 BYTES
0844 E53E 7F27EB                  CLR     CRCBYTE
0845 E541 B6102E  LTABLE1  LDAA    SCSR    * WAIT FOR CHARACTER
0846 E544 8420                    ANDA    #$20
0847 E546 260E                    BNE     LTABLE6
0848 E548 3C                      PSHX
0849 E549 183C                    PSHY
0850 E54B BDF2D3                  JSR     KYBD    * EXIT ON KEY
0851 E54E 1838                    PULY
0852 E550 38                      PULX
0853 E551 4D                      TSTA
0854 E552 2645                    BNE     LTABDUN
0855 E554 20EB                    BRA     LTABLE1
0856 E556 B6102F  LTABLE6  LDAA    SCDR    * GET CHARACTER
0857 E559 8107                    CMPA    #$07
0858 E55B 27D5                    BEQ     LTABLE2
0859 E55D A700                    STAA    ,X
0860 E55F BB27EB                  ADDA    CRCBYTE * UPDATE CHECKSUM
0861 E562 B727EB                  STAA    CRCBYTE
0862 E565 08                      INX
0863 E566 1809                    DEY
0864 E568 26D7                    BNE     LTABLE1
0865 E56A F6102E  LTABLE3  LDAB    SCSR    * GET CHECKSUM
0866 E56D C420                    ANDB    #$20
0867 E56F 27F9                    BEQ     LTABLE3
0868 E571 B6102F                  LDAA    SCDR
0869 E574 B127EB                  CMPA    CRCBYTE * IS IT OK
0870 E577 270F                    BEQ     LTABLE5
0871 E579 B6102E  LTABBAD  LDAA    SCSR    * CHECKSUM ERROR
0872 E57C 2AFB                    BPL     LTABBAD
0873 E57E 8601                    LDAA    #$01
0874 E580 B7102F                  STAA    SCDR
0875 E583 BDEF7D                  JSR     LBEEP
0876 E586 2096                    BRA     LTABLE0
0877 E588 B627EB  LTABLE5  LDAA    CRCBYTE
0878 E58B A700                    STAA    ,X
0879 E58D B6102E                  LDAA    SCSR    * TRANSMISSION OK
```

```
0880 E590 2AF6                       BPL      LTABLE5
0881 E592 8609                       LDAA     #$09
0882 E594 B7102F                     STAA     SCDR
0883 E597 2003                       BRA      MTABLE
0884                        *
0885 E599 7EE0E2    LTABDUN          JMP      RUNNER        * SOMETHING BAD
0886                        *
0887 E59C 18CEB700  MTABLE           LDY      #EEPROM+256 ERASE EEPROM
0888 E5A0 C6FF                       LDAB     #$FF
0889 E5A2 BDE5FB    MTABLE1          JSR      MCLR          * 255 BYTES
0890 E5A5 1808                       INY
0891 E5A7 5A                         DECB
0892 E5A8 26F8                       BNE      MTABLE1
0893 E5AA BDE5FB                     JSR      MCLR          * CHECKSUM
0894                        *
0895 E5AD CE24BD                     LDX      #DDATA        * MOVE TABLE INTO EEPROM
0896 E5B0 18CEB700                   LDY      #EEPROM+256
0897 E5B4 C6FF                       LDAB     #$FF          * 256 BYTES
0898 E5B6 A600      MTABLE2          LDAA     ,X            * GET FROM TABLE
0899 E5B8 BDE5DE                     JSR      MPROG
0900 E5BB 08                         INX
0901 E5BC 1808                       INY
0902 E5BE 5A                         DECB
0903 E5BF 26F5                       BNE      MTABLE2
0904 E5C1 A600                       LDAA     ,X            * STORE CHECKSUM
0905 E5C3 BDE5DE                     JSR      MPROG
0906 E5C6 CE24BD                     LDX      #DDATA        * CLEAR RAM DATA
0907 E5C9 C6FF                       LDAB     #$FF
0908 E5CB 6F00      MCLEAR           CLR      ,X
0909 E5CD 08                         INX
0910 E5CE 5A                         DECB
0911 E5CF 26FA                       BNE      MCLEAR
0912 E5D1 86FF                       LDAA     #$FF          * OLD CHECKSUM
0913 E5D3 A700                       STAA     ,X
0914 E5D5 BDE679                     JSR      INIVER
0915 E5D8 BDEF74                     JSR      SBEEP
0916 E5DB 7EE0E2    MTABDUN          JMP      RUNNER
0917                        *
0918                        * PROGRAM 1 BYTE IN EEPROM POINTED BY Y
0919                        *
0920 E5DE 37        MPROG            PSHB                   * PROGRAM BYTE IN EEPROM
0921 E5DF 3C                         PSHX
0922 E5E0 C602                       LDAB     #$02          * WRITE DATA
0923 E5E2 F7103B                     STAB     PPROG
0924 E5E5 18A700                     STAA     ,Y
0925 E5E8 C603                       LDAB     #$03          * TURN ON PROG
0926 E5EA F7103B                     STAB     PPROG
0927 E5ED CE0400                     LDX      #$0400        * 12 MS DELAY
0928 E5F0 09        MDELAY           DEX
0929 E5F1 26FD                       BNE      MDELAY
0930 E5F3 C600                       LDAB     #$00          * DISABLE EEPROM PROGRAM
0931 E5F5 F7103B                     STAB     PPROG
0932 E5F8 38                         PULX
0933 E5F9 33                         PULB
0934 E5FA 39                         RTS
0935                        *
0936                        * ERASE 1 BYTE IN EEPROM POINTED BY Y
0937                        *
0938 E5FB 37        MCLR             PSHB                   * ERASE 1 BYTE
0939 E5FC 3C                         PSHX
0940 E5FD 86FF                       LDAA     #$FF
0941 E5FF C616                       LDAB     #$16
0942 E601 F7103B                     STAB     PPROG
0943 E604 18A700                     STAA     ,Y
0944 E607 C617                       LDAB     #$17
0945 E609 F7103B                     STAB     PPROG
0946 E60C CE0400                     LDX      #$0400
0947 E60F 09        MCLRDLY          DEX
0948 E610 26FD                       BNE      MCLRDLY
0949 E612 C600                       LDAB     #$00
0950 E614 F7103B                     STAB     PPROG
0951 E617 38                         PULX
0952 E618 33                         PULB
0953 E619 39                         RTS
0954                        *
0955                        *
0956                        * CHECK ENCRYPTION DATA TABLE STORED IN THE EEPROM AND RET
0957                        * IF NO ERROR OR INSTALL DEFAULT TABLE IF AN ERROR
0958                        *
```

```
0959 E61A CEB700    INIDAT    LDY     #EEPROM+256  * CHECK DATA TABLE
0960 E61D C6FF                LDAB    #$FF
0961 E61F 4F                  CLRA
0962 E620 AB00      INIDAT1   ADDA    ,X
0963 E622 08                  INX
0964 E623 5A                  DECB
0965 E624 26FA                BNE     INIDAT1
0966 E626 A100                CMPA    ,X           * VERIFY CHECKSUM
0967 E628 2601                BNE     INIDAT2
0968 E62A 39                  RTS
0969 E62B BDF39F    INIDAT2   JSR     DISCLR       * NOT VALID
0970 E62E CEFA1E              LDX     #TABMSG
0971 E631 BDF3CE              JSR     MESSD
0972 E634 BDEF7D              JSR     LBEEP
0973 E637 18CEB700            LDY     #EEPROM+256  * ERASE OLD TABLE
0974 E63B C6FF                LDAB    #$FF
0975 E63D 86FF                LDAA    #$FF
0976 E63F BDE5FB    INIDAT02  JSR     MCLR
0977 E642 1808                INY
0978 E644 5A                  DECB
0979 E645 26F8                BNE     INIDAT02
0980 E647 BDE5FB              JSR     MCLR
0981 E64A CEFC10              LDX     #CODEMSG     * MOVE DEFAULT TO EEPROM
0982 E64D 18CEB700            LDY     #EEPROM+256
0983 E651 7F27EB              CLR     CRCBYTE
0984 E654 C6FF                LDAB    #$FF
0985 E656 A600      INIDAT3   LDAA    ,X
0986 E658 BDE5DE              JSR     MPROG
0987 E65B A600                LDAA    ,X
0988 E65D BB27EB              ADDA    CRCBYTE
0989 E660 B727EB              STAA    CRCBYTE
0990 E663 08                  INX
0991 E664 1808                INY
0992 E666 5A                  DECB
0993 E667 26ED                BNE     INIDAT3
0994 E669 B627EB              LDAA    CRCBYTE      * UPDATE CHECKSUM
0995 E66C BDE5DE              JSR     MPROG
0996 E66F BDE679              JSR     INIVER
0997 E672 CE0024              LDX     #$0024
0998 E675 BDEF60              JSR     RTIDE2
0999 E678 39                  RTS
1000                          *
1001 E679 CEB700    INIVER    LDX     #EEPROM+256  * VERIFY EEPROM WRITE
1002 E67C C6FF                LDAB    #$FF
1003 E67E 4F                  CLRA
1004 E67F AB00      INIVER1   ADDA    ,X
1005 E681 08                  INX
1006 E682 5A                  DECB
1007 E683 26FA                BNE     INIVER1
1008 E685 A100                CMPA    ,X
1009 E687 270E                BEQ     INIVER3
1010 E689 BDF39F              JSR     DISCLR
1011 E68C CEFBE9              LDX     #SERMSG
1012 E68F BDF3CE              JSR     MESSD
1013 E692 BDEF7D              JSR     LBEEP
1014 E695 20FE      INIVER2   BRA     INIVER2
1015 E697 39        INIVER3   RTS
1016                          *
1017                          *
1018                          * INITIALIZE RMC DATA PASSWORD IN EEPROM AND STORE CHECKSU
1019                          *
1020 E698 CEB6F6    INIPW     LDX     #USPW        * VERIFY CHECKSUM
1021 E69B C609                LDAB    #$09
1022 E69D 4F                  CLRA
1023 E69E AB00      INIPW0    ADDA    ,X
1024 E6A0 08                  INX
1025 E6A1 5A                  DECB
1026 E6A2 26FA                BNE     INIPW0
1027 E6A4 A100                CMPA    ,X
1028 E6A6 2601                BNE     INIPW00
1029 E6A8 39                  RTS
1030 E6A9 BDF39F    INIPW00   JSR     DISCLR
1031 E6AC CEFA62              LDX     #IPWMSG
1032 E6AF BDF3CE              JSR     MESSD
1033 E6B2 BDEF7D              JSR     LBEEP
1034 E6B5 18CEB6F6            LDY     #USPW        * ERASE OLD PASSWORD
1035 E6B9 C60A                LDAB    #10
```

```
1036 E6BB 86FF                 LDAA    #$FF
1037 E6BD BDE5FB     INIPW01   JSR     MCLR
1038 E6C0 1808                 INY
1039 E6C2 5A                   DECB
1040 E6C3 26F8                 BNE     INIPW01
1041 E6C5 18CEB6F6             LDY     #USPW       * PUT DEFAULT PW
1042 E6C9 C609                 LDAB    #$09
1043 E6CB 7F27EB               CLR     CRCBYTE
1044 E6CE 8639      INIPW1     LDAA    #'9'
1045 E6D0 BDE5DE               JSR     MPROG
1046 E6D3 8639                 LDAA    #'9'
1047 E6D5 BB27EB               ADDA    CRCBYTE
1048 E6D8 B727EB               STAA    CRCBYTE
1049 E6DB 1808                 INY
1050 E6DD 5A                   DECB
1051 E6DE 26EE                 BNE     INIPW1
1052 E6E0 B627EB               LDAA    CRCBYTE     * NEW CHECKSUM
1053 E6E3 BDE5DE               JSR     MPROG
1054 E6E6 CE0024               LDX     #$0024
1055 E6E9 BDEF60               JSR     RTIDE2
1056 E6EC 39                   RTS
1057                 *
1058                 * SET NEW RMC DATA PASSWORD IN BOX BY ENTERING OLD PASSWORD
1059                 * THEN NEW PASSWORD AND VERIFYING THE NEW PASSWORD JUMP TO
1060                 * RUNNER ON COMPLETION
1061                 *
1062 E6ED BDE7A3    SETPW      JSR     GETPW       * GET OLD PASSWORD
1063 E6F0 CE0010               LDX     #$0010
1064 E6F3 BDEF60               JSR     RTIDE2
1065 E6F6 BDF39F               JSR     DISCLR      * GET NEW PASSWORD
1066 E6F9 CEFB9E               LDX     #ZPWMSG
1067 E6FC BDF0B8               JSR     PUTACCT
1068 E6FF CEFB74               LDX     #NPWMSG
1069 E702 BDF3CE               JSR     MESSD
1070 E705 BDEA48               JSR     CURSON
1071 E708 BDEF74               JSR     SBEEP
1072 E70B CE27C0               LDX     #MSGBUF
1073 E70E 7F27EB               CLR     CRCBYTE
1074 E711 C609                 LDAB    #$09
1075 E713 3C        SETPW3     PSHX
1076 E714 37                   PSHB
1077 E715 7F2024               CLR     BEEPFLG
1078 E718 BDF2D3               JSR     KYBD
1079 E71B 33                   PULB
1080 E71C 38                   PULX
1081 E71D 4D                   TSTA
1082 E71E 27F3                 BEQ     SETPW3
1083 E720 A700                 STAA    ,X
1084 E722 BB27EB               ADDA    CRCBYTE
1085 E725 B727EB               STAA    CRCBYTE
1086 E728 8658                 LDAA    #'X'
1087 E72A BDF3EC               JSR     DISDAT
1088 E72D 08                   INX
1089 E72E 5A                   DECB
1090 E72F 26E2                 BNE     SETPW3
1091 E731 B627EB               LDAA    CRCBYTE
1092 E734 A700                 STAA    ,X
1093 E736 CE0010               LDX     #$0010
1094 E739 BDEF60               JSR     RTIDE2
1095 E73C BDF39F               JSR     DISCLR      * VERIFY NEW PASSWORD
1096 E73F CEFB9E               LDX     #ZPWMSG
1097 E742 BDF0B8               JSR     PUTACCT
1098 E745 CEFB89               LDX     #VPWMSG
1099 E748 BDF3CE               JSR     MESSD
1100 E74B BDEA48               JSR     CURSON
1101 E74E BDEF74               JSR     SBEEP
1102 E751 CE27C0               LDX     #MSGBUF
1103 E754 C609                 LDAB    #$09
1104 E756 3C        SETPW4     PSHX
1105 E757 37                   PSHB
1106 E758 7F2024               CLR     BEEPFLG
1107 E75B BDF2D3               JSR     KYBD
1108 E75E 33                   PULB
1109 E75F 38                   PULX
1110 E760 4D                   TSTA
1111 E761 27F3                 BEQ     SETPW4
1112 E763 A100                 CMPA    ,X
```

```
1113 E765 2703                BEQ    SETPW5
1114 E767 7EE7FE              JMP    PWERR
1115 E76A 8658    SETPW5      LDAA   #'X'
1116 E76C BDF3EC              JSR    DISDAT
1117 E76F 08                  INX
1118 E770 5A                  DECB
1119 E771 26E3                BNE    SETPW4
1120 E773 BDEF74              JSR    SBEEP
1121 E776 18CEB6F6            LDY    #USPW
1122 E77A C60A                LDAB   #10
1123 E77C 86FF                LDAA   #$FF
1124 E77E BDE5FB   SETPW7     JSR    MCLR     * ERASE OLD PASSWORD
1125 E781 1808                INY
1126 E783 5A                  DECB
1127 E784 26F8                BNE    SETPW7
1128 E786 CE27C0              LDX    #MSGBUF  * INSTALL NEW PASSWORD
1129 E789 18CEB6F6            LDY    #USPW
1130 E78D C60A                LDAB   #10
1131 E78F A600    SETPW6      LDAA   ,X
1132 E791 BDE5DE              JSR    MPROG
1133 E794 08                  INX
1134 E795 1808                INY
1135 E797 5A                  DECB
1136 E798 26F5                BNE    SETPW6
1137 E79A CE0010              LDX    #$0010
1138 E79D BDEF60              JSR    RTIDE2
1139 E7A0 7EE0E2              JMP    RUNNER
1140                  *
1141                  * GET PASSWORD FROM KEYBOARD AND STORE IT IN MSGBUF. CHECK
1142                  * TWO PASSWORDS POINTED TO BY PW1PTR AND PW2PTR. JMP TO P
1143                  * ERROR OR RETURN IF OK
1144                  *
1145 E7A3 BDF39F   GETPW       JSR    DISCLR   * PASSWORD MESSAGES
1146 E7A6 CEFB9E               LDX    #ZPWMSG
1147 E7A9 BDF0B8               JSR    PUTACCT
1148 E7AC CEF9F4               LDX    #PWMSG
1149 E7AF BDF3CE               JSR    MESSD
1150 E7B2 BDEA48   GETPW1      JSR    CURSON
1151 E7B5 CE27C0               LDX    #MSGBUF
1152 E7B8 C609                 LDAB   #$09
1153 E7BA 3C       GETPW2      PSHX            * GET EACH CHARACTER
1154 E7BB 37                   PSHB
1155 E7BC 7F2024               CLR    BEEPFLG
1156 E7BF BDF2D3               JSR    KYBD
1157 E7C2 33                   PULB
1158 E7C3 38                   PULX
1159 E7C4 4D                   TSTA
1160 E7C5 27F3                 BEQ    GETPW2
1161 E7C7 A700                 STAA   ,X
1162 E7C9 8658                 LDAA   #'X'
1163 E7CB BDF3EC               JSR    DISDAT
1164 E7CE 08                   INX
1165 E7CF 5A                   DECB
1166 E7D0 26E8                 BNE    GETPW2
1167 E7D2 CE27C0               LDX    #MSGBUF
1168 E7D5 FF202B               STX    COUNT
1169 E7D8 18FE2094             LDY    PW1PTR   * STANDARD PASSWORD
1170 E7DC FE2096               LDX    PW2PTR   * USER PASSWORD
1171 E7DF C609                 LDAB   #$09
1172 E7E1 3C       GETPW3      PSHX
1173 E7E2 FE202B               LDX    COUNT
1174 E7E5 A600                 LDAA   ,X
1175 E7E7 08                   INX
1176 E7E8 FF202B               STX    COUNT
1177 E7EB 38                   PULX
1178 E7EC A100                 CMPA   ,X
1179 E7EE 2707                 BEQ    GETPW4
1180 E7F0 18A100               CMPA   ,Y
1181 E7F3 2702                 BEQ    GETPW4
1182 E7F5 2007                 BRA    PWERR
1183 E7F7 08       GETPW4      INX
1184 E7F8 1808                 INY
1185 E7FA 5A                   DECB
1186 E7FB 26E4                 BNE    GETPW3
1187 E7FD 39                   RTS
1188                   *
1189                   * PROCESS PASSWORD ENTRY ERROR AND JUPM TO RUNNER
1190                   *
```

```
1191 E7FE BDF39F      PWERR     JSR     DISCLR
1192 E801 CEF709                LDX     #PWERMSG
1193 E804 BDF3CE                JSR     MESSD
1194 E807 BDEF7D                JSR     LBEEP
1195 E80A 7EE0E2                JMP     RUNNER
1196                  *
1197                  * ENTER 2 NEW SUPERVISORS PASSWORD AFTER MASTER PASSWORD W
1198                  * JUMP TO PWERR ON ERROR OR RUNNER IF OK
1199                  *
1200 E80D BDF39F      CHKSPW    JSR     DISCLR      * GET MASTER PASSWORD
1201 E810 CEFB9E                LDX     #ZPWMSG
1202 E813 BDF0B8                JSR     PUTACCT
1203 E816 CEF9F4                LDX     #PWMSG
1204 E819 BDF3CE                JSR     MESSD
1205 E81C CE208A                LDX     #MPW
1206 E81F FF2094                STX     PW1PTR
1207 E822 FF2096                STX     PW2PTR
1208 E825 BDE7B2                JSR     GETPW1
1209 E828 BDF39F                JSR     DISCLR      * FIRST SUPERVISOR
1210 E82B CEFB9E                LDX     #ZPWMSG
1211 E82E BDF0B8                JSR     PUTACCT
1212 E831 CEF8E4                LDX     #PW1MSG
1213 E834 BDF3CE                JSR     MESSD
1214 E837 CE2076                LDX     #PW1
1215 E83A FF2027                STX     OUTPTR
1216 E83D BDE864                JSR     CHKSPW0
1217 E840 BDF39F                JSR     DISCLR      * SECOND SUPERVISOR
1218 E843 CEFB9E                LDX     #ZPWMSG
1219 E846 BDF0B8                JSR     PUTACCT
1220 E849 CEF8F9                LDX     #PW2MSG
1221 E84C BDF3CE                JSR     MESSD
1222 E84F CE2080                LDX     #PW2
1223 E852 FF2027                STX     OUTPTR
1224 E855 BDE864                JSR     CHKSPW0
1225 E858 CE0010                LDX     #$0010
1226 E85B BDEF60                JSR     RTIDE2
1227 E85E BDEF74                JSR     SBEEP
1228 E861 7EE0E2                JMP     RUNNER
1229                  *
1230                  *
1231 E864 C609        CHKSPW0   LDAB    #$09
1232 E866 F72015                STAB    CNTLOC
1233 E869 BDEA48                JSR     CURSON
1234 E86C 7F2024      CHKSPW1   CLR     BEEPFLG
1235 E86F BDF249                JSR     GETKEY
1236 E872 8130                  CMPA    #'0'
1237 E874 2DF6                  BLT     CHKSPW1
1238 E876 8139                  CMPA    #'9'
1239 E878 2F08                  BLE     CHKSPW2
1240 E87A 8141                  CMPA    #'A'
1241 E87C 2DEE                  BLT     CHKSPW1
1242 E87E 815A                  CMPA    #'Z'
1243 E880 2EEA                  BGT     CHKSPW1
1244 E882 BDF469      CHKSPW2   JSR     PUTBUF
1245 E885 8658                  LDAA    #'X'
1246 E887 BDF3EC                JSR     DISDAT
1247 E88A 7A2015                DEC     CNTLOC
1248 E88D 26DD                  BNE     CHKSPW1
1249 E88F 39                    RTS
1250                  *
1251                  * SET MASTER USER PASSWORD BY ENTERING OLD PASSWORD THE NE
1252                  * PASSWORD AND VERIFYING IT. JUMP TO PWERR ON ERROR OR TO
1253                  * RUNNER IF OK
1254                  *
1255 E890 BDF39F      SETSPW    JSR     DISCLR      * GET OLD PASSWORD
1256 E893 CEFB9E                LDX     #ZPWMSG
1257 E896 BDF0B8                JSR     PUTACCT
1258 E899 CEFB5F                LDX     #OPWMSG
1259 E89C BDF3CE                JSR     MESSD
1260 E89F CE208A                LDX     #MPW
1261 E8A2 FF2094                STX     PW1PTR
1262 E8A5 FF2096                STX     PW2PTR
1263 E8A8 BDE7B2                JSR     GETPW1
1264 E8AB BDF39F                JSR     DISCLR      * GET NEW PASSWORD
1265 E8AE CEFB9E                LDX     #ZPWMSG
1266 E8B1 BDF0B8                JSR     PUTACCT
1267 E8B4 CEFB74                LDX     #NPWMSG
1268 E8B7 BDF3CE                JSR     MESSD
```

```
1269 E8BA BDEA48                  JSR      CURSON
1270 E8BD C609                    LDAB     #$09
1271 E8BF F72015                  STAB     CNTLOC
1272 E8C2 CE27C0                  LDX      #MSGBUF
1273 E8C5 FF2027                  STX      OUTPTR
1274 E8C8 7F2024        SETSPW1   CLR      BEEPFLG
1275 E8CB BDF249                  JSR      GETKEY
1276 E8CE BDF469                  JSR      PUTBUF
1277 E8D1 8658                    LDAA     #'X'
1278 E8D3 BDF3EC                  JSR      DISDAT
1279 E8D6 7A2015                  DEC      CNTLOC
1280 E8D9 26ED                    BNE      SETSPW1
1281 E8DB BDF39F                  JSR      DISCLR         * VERIFY NEW PASSWORD
1282 E8DE CEFB9E                  LDX      #ZPWMSG
1283 E8E1 BDF0B8                  JSR      PUTACCT
1284 E8E4 CEFB89                  LDX      #VPWMSG
1285 E8E7 BDF3CE                  JSR      MESSD
1286 E8EA BDEA48                  JSR      CURSON
1287 E8ED C609                    LDAB     #$09
1288 E8EF F72015                  STAB     CNTLOC
1289 E8F2 CE27C0                  LDX      #MSGBUF
1290 E8F5 7F2024        SETSPW2   CLR      BEEPFLG
1291 E8F8 BDF249                  JSR      GETKEY
1292 E8FB A100                    CMPA     ,X
1293 E8FD 2627                    BNE      SETSPW4
1294 E8FF 3C                      PSHX
1295 E900 8658                    LDAA     #'X'
1296 E902 BDF3EC                  JSR      DISDAT
1297 E905 38                      PULX
1298 E906 08                      INX
1299 E907 7A2015                  DEC      CNTLOC
1300 E90A 26E9                    BNE      SETSPW2
1301 E90C CE27C0                  LDX      #MSGBUF
1302 E90F 18CE208A                LDY      #MPW
1303 E913 C609                    LDAB     #$09
1304                   *
1305 E915 A600         SETSPW3   LDAA     ,X              * MOVE NEW PASSWORD IN
1306 E917 18A700                  STAA     ,Y
1307 E91A 08                      INX
1308 E91B 1808                    INY
1309 E91D 5A                      DECB
1310 E91E 26F5                    BNE      SETSPW3
1311 E920 BDEF74                  JSR      SBEEP
1312 E923 7EE0E2                  JMP      RUNNER
1313 E926 7EE7FE        SETSPW4   JMP      PWERR
1314                   *
1315                   * GET ACCOUNT NUMBER FROM WAND OR KEYBOARD. DECRPYT THE NU
1316                   * AND PRINT IT ON THE DISPLAY. PRESS A* TO EXIT ROUTINE AN
1317                   * JUMP BACK TO RUNNER
1318                   *
1319 E929 BDF39F        GETSPW    JSR      DISCLR         * GET PASSWORD CLEARANCE
1320 E92C CEFB9E                  LDX      #ZPWMSG
1321 E92F BDF0B8                  JSR      PUTACCT
1322 E932 CEF8E4                  LDX      #PW1MSG
1323 E935 BDF3CE                  JSR      MESSD
1324 E938 CE2076                  LDX      #PW1
1325 E93B FF2094                  STX      PW1PTR
1326 E93E FF2096                  STX      PW2PTR
1327 E941 BDE7B2                  JSR      GETPW1
1328 E944 BDF39F                  JSR      DISCLR
1329 E947 CEFB9E                  LDX      #ZPWMSG
1330 E94A BDF0B8                  JSR      PUTACCT
1331 E94D CEF8F9                  LDX      #PW2MSG
1332 E950 BDF3CE                  JSR      MESSD
1333 E953 CE2080                  LDX      #PW2
1334 E956 FF2094                  STX      PW1PTR
1335 E959 FF2096                  STX      PW2PTR
1336 E95C BDE7B2                  JSR      GETPW1
1337 E95F BDF39F        GETSPW1   JSR      DISCLR         * PASSWORDS OK
1338 E962 CEFAEE                  LDX      #ACTENT
1339 E965 BDF0B8                  JSR      PUTACCT
1340 E968 BDEA48                  JSR      CURSON
1341 E96B CEF9B5                  LDX      #PERN
1342 E96E BDF3CE                  JSR      MESSD
1343 E971 7F2024                  CLR      BEEPFLG        * SET POINTERS
1344 E974 7F201F                  CLR      NMESS
1345 E977 8613                    LDAA     #19
```

```
1346 E979 B72015            STAA    CNTLOC
1347 E97C CE203A            LDX     #ACCTCOD
1348 E97F FF2027            STX     OUTPTR
1349 E982 FF2098            STX     ACCTP
1350 E985 86FF              LDAA    #$FF
1351 E987 B7201F            STAA    NMESS
1352 E98A B7201E            STAA    NCODE
1353 E98D 7F2020            CLR     KFLAG
1354 E990 BDE01C            JSR     TRANSI   * GET KEY OR BAR CODE
1355 E993 7D201E            TST     NCODE
1356 E996 2607              BNE     GETSPW2  * BAR CODE PRESENT
1357 E998 B62020            LDAA    KFLAG
1358 E99B 27C2              BEQ     GETSPW1  * NO KEY
1359 E99D 2018              BRA     GETSPW4
1360 E99F 7D201E   GETSPW2  TST     NCODE
1361 E9A2 27BB             BEQ     GETSPW1  * NO BAR CODE
1362 E9A4 CE204D            LDX     #ACCTCOD+19
1363 E9A7 BC2098            CPX     ACCTP
1364 E9AA 26B3              BNE     GETSPW1
1365 E9AC BDEF74            JSR     SBEEP    * LENGTH OK
1366 E9AF 2035              BRA     GETSPW5
1367 E9B1 7F2024   GETSPW3  CLR     BEEPFLG  * GET KEYS
1368 E9B4 BDF249            JSR     GETKEY
1369 E9B7 813F    GETSPW4  CMPA    #'?'
1370 E9B9 27F6              BEQ     GETSPW3
1371 E9BB 8140              CMPA    #'@'
1372 E9BD 275C              BEQ     GETSPW9
1373 E9BF 8124    GETSPW41 CMPA    #'$'
1374 E9C1 2603              BNE     GETSPW42
1375 E9C3 7EEA2A            JMP     GETSPWB
1376 E9C6 8130    GETSPW42 CMPA    #'0'
1377 E9C8 2DE7              BLT     GETSPW3
1378 E9CA 8139              CMPA    #'9'
1379 E9CC 2308              BLS     GETSPW40
1380 E9CE 8141              CMPA    #'A'
1381 E9D0 2DDF              BLT     GETSPW3
1382 E9D2 815A              CMPA    #'Z'
1383 E9D4 2EDB              BGT     GETSPW3
1384 E9D6 BDF469   GETSPW40 JSR     PUTBUF
1385 E9D9 BDF3EC            JSR     DISDAT
1386 E9DC 7A2015            DEC     CNTLOC
1387 E9DF 26D0              BNE     GETSPW3
1388 E9E1 8604              LDAA    #$04
1389 E9E3 BDF469            JSR     PUTBUF
1390 E9E6 86FF    GETSPW5  LDAA    #$FF     * DO NOT GO TO RUNNER
1391 E9E8 B72038            STAA    ARFLG
1392 E9EB BDF482            JSR     DECPRT   * DECRYPT
1393 E9EE BDF50D            JSR     CRCSUM   * GET CHECKSUM
1394 E9F1 BDF39F            JSR     DISCLR
1395 E9F4 CE203A            LDX     #ACCTCOD
1396 E9F7 BDF3CE            JSR     MESSD
1397 E9FA 8620              LDAA    #' '
1398 E9FC BDF3EC            JSR     DISDAT
1399 E9FF BDF3EC            JSR     DISDAT
1400 EA02 BDF3EC            JSR     DISDAT
1401 EA05 CE204E            LDX     #DACCTCD
1402 EA08 BDF3CE            JSR     MESSD
1403 EA0B 7F2024            CLR     BEEPFLG
1404 EA0E BDF2D3   GETSPW6  JSR     KYBD
1405 EA11 4D                TSTA
1406 EA12 27FA              BEQ     GETSPW6
1407 EA14 8140              CMPA    #'@'
1408 EA16 2703              BEQ     GETSPW9
1409 EA18 7EE95F            JMP     GETSPW1
1410 EA1B BDEF74   GETSPW9  JSR     SBEEP
1411 EA1E CEFFFF            LDX     #$FFFF
1412 EA21 09      GETSPW7  DEX
1413 EA22 26FD              BNE     GETSPW7
1414 EA24 BDEF74            JSR     SBEEP
1415 EA27 7EE0E2            JMP     RUNNER
1416                *
1417                * DO BACKSPACE IN ACCOUNT NUMBER ENTRY FROM DECPRYT LEVEL
1418                *
1419 EA2A FE2027   GETSPWB  LDX     OUTPTR
1420 EA2D 8C203A            CPX     #ACCTCOD
1421 EA30 2713              BEQ     GETSPWB1
1422 EA32 8604              LDAA    #$04
```

```
   3 EA34 A700                STAA     ,X
1424 EA36 09                  DEX
1425 EA37 FF2027              STX      OUTPTR
1426 EA3A 8607                LDAA     #$07
1427 EA3C BDF396              JSR      DISSET
1428 EA3F 7A27E7              DEC      DISCOL
1429 EA42 7C2015              INC      CNTLOC
1430 EA45 7EE9B1    GETSPWB1  JMP      GETSPW3
1431                *
1432                * TURN CURSOR ON
1433                *
1434 EA48 36        CURSON    PSHA
1435 EA49 860F                LDAA     #$0F
1436 EA4B BDF396              JSR      DISSET
1437 EA4E 8609                LDAA     #$09
1438 EA50 BDF396              JSR      DISSET
1439 EA53 32                  PULA
1440 EA54 39                  RTS
1441                *
1442                * TURN CURSOR OFF
1443                *
1444 EA55 36        CURSOFF   PSHA
1445 EA56 860E                LDAA     #$0E
1446 EA58 BDF396              JSR      DISSET
1447 EA5B 32                  PULA
1448 EA5C 39                  RTS
1449                *
1450                * INITIALIZE VOLATILE PASSWORDS ON POWER UP TO 999999999
1451                *
1452 EA5D CE2076    INISPW    LDX      #PW1        * FIRST SUPERVISOR
1453 EA60 8639                LDAA     #'9'
1454 EA62 C609                LDAB     #9
1455 EA64 A700     INISPW1    STAA     ,X
1456 EA66 08                  INX
1457 EA67 5A                  DECB
1458 EA68 26FA                BNE      INISPW1
1459 EA6A CE2080              LDX      #PW2        * SECOND SUPERVISOR
1460 EA6D C609                LDAB     #9
1461 EA6F A700     INISPW2    STAA     ,X
1462 EA71 08                  INX
1463 EA72 5A                  DECB
1464 EA73 26FA                BNE      INISPW2
1465 EA75 CE208A              LDX      #MPW        * USER MASTER
1466 EA78 C609                LDAB     #9
1467 EA7A A700     INISPW3    STAA     ,X
1468 EA7C 08                  INX
1469 EA7D 5A                  DECB
1470 EA7E 26FA                BNE      INISPW3
1471 EA80 39                  RTS
1472                *
1473                * CLOSE FILE ON THE MAINFRAME IN CICS BY SENDING 99999 MES
1474                * THEN JUMP TO RUNNER
1475                *
1476 EA81 BDF39F    CLOSEF    JSR      DISCLR
1477 EA84 CEF9DF              LDX      #LOGMSG
1478 EA87 BDF3CE              JSR      MESSD
1479 EA8A 86FF                LDAA     #$FF
1480 EA8C B72022              STAA     ECHO
1481 EA8F CEFBBD              LDX      #CLOSEMSG
1482 EA92 BDF60C              JSR      MSG
1483 EA95 7F2022              CLR      ECHO
1484 EA98 BDE2BB              JSR      COMWAI
1485 EA9B BDEF74              JSR      SBEEP
1486 EA9E 7EE0E2              JMP      RUNNER
1487                *
1488                * LOGON TO BLACK BOX BY SENDING A CHARACTER SEQUENCE. THEN
1489                * TO RUNNER
1490                *
1491 EAA1 B6102F    LOGON     LDAA     SCDR
1492 EAA4 BDF39F              JSR      DISCLR
1493 EAA7 CEF9DF              LDX      #LOGMSG
1494 EAAA BDF3CE              JSR      MESSD
1495 EAAD 86FF                LDAA     #$FF
1496 EAAF B72022              STAA     ECHO
1497 EAB2 8631                LDAA     #'1'
1498 EAB4 BDF619              JSR      TXCHAR
1499 EAB7 CE000A              LDX      #0010
```

```
1500 EABA BDEF60             JSR     RTIDE2
1501 EABD 8632                LDAA    #'2'
1502 EABF BDF619             JSR     TXCHAR
1503 EAC2 CE0010             LDX     #$0010
1504 EAC5 BDEF60             JSR     RTIDE2
1505 EAC8 8633                LDAA    #'3'
1506 EACA BDF619             JSR     TXCHAR
1507 EACD CE0030             LDX     #$0030
1508 EAD0 BDEF60             JSR     RTIDE2
1509 EAD3 8634                LDAA    #'4'
1510 EAD5 BDF619             JSR     TXCHAR
1511 EAD8 CE0034             LDX     #$0034
1512 EADB BDEF60             JSR     RTIDE2
1513 EADE 8632                LDAA    #'2'
1514 EAE0 BDF619             JSR     TXCHAR
1515 EAE3 CE0034             LDX     #$0034
1516 EAE6 BDEF60             JSR     RTIDE2
1517 EAE9 8631                LDAA    #'1'
1518 EAEB BDF619             JSR     TXCHAR
1519 EAEE CE0034             LDX     #$0034
1520 EAF1 BDEF60             JSR     RTIDE2
1521 EAF4 8631                LDAA    #'1'
1522 EAF6 BDF619             JSR     TXCHAR
1523 EAF9 CE0034             LDX     #$0034
1524 EAFC BDEF60             JSR     RTIDE2
1525 EAFF BDF674             JSR     SBEEP
1526 EB02 B6102F             LDAA    SCDR
1527 EB05 7EE0E2             JMP     RUNNER
1528                      *
1529                      * CHECK TO SEE IF DES CHIP EXISTS
1530                      * CLR DES FLAG IF NOT THERE AND SHOW NOT DES EQUIPPED MESS
1531                      * RETURN IF ERROR OR NOT
1532                      *
1533 EB08 8601    CKDES    LDAA    #$01          * RESET CHIP
1534 EB0A B7D001           STAA    CHIP+1
1535 EB0D BDED7C           JSR     WAITDES
1536 EB10 86FF             LDAA    #$FF
1537 EB12 C608             LDAB    #8
1538 EB14 B7D002  CKDES1   STAA    CHIP+2        * BAD PARITY KEY
1539 EB17 5A               DECB
1540 EB18 26FA             BNE     CKDES1
1541 EB1A BDED7C           JSR     WAITDES
1542 EB1D B6D002           LDAA    CHIP+2
1543 EB20 8180             CMPA    #$80          * BAD PARITY ON LOAD
1544 EB22 2718             BEQ     CKDES2
1545 EB24 BDF39F           JSR     DISCLR
1546 EB27 CEF976           LDX     #NOIDES
1547 EB2A BDF3CE           JSR     MESSD
1548 EB2D 7F2011           CLR     DESFLG        * NO CHIP
1549 EB30 BDEF74           JSR     SBEEP
1550 EB33 CE0010           LDX     #$0010
1551 EB36 BDEF60           JSR     RTIDE2
1552 EB39 7EE0E2           JMP     RUNNER
1553                      *
1554 EB3C 86FF    CKDES2   LDAA    #$FF          * OK CHIP IS THERE
1555 EB3E B72011           STAA    DESFLG
1556 EB41 8601             LDAA    #$01          * RESET CHIP
1557 EB43 B7D001           STAA    CHIP+1
1558 EB46 BDED7C           JSR     WAITDES
1559 EB49 CE2000           LDX     #DESKY1       * LOAD MAJOR KEY
1560 EB4C C608             LDAB    #8
1561 EB4E A600    CKDES3   LDAA    ,X
1562 EB50 8139             CMPA    #'9'
1563 EB52 2E04             BGT     CKDES5
1564 EB54 8030             SUBA    #'0'
1565 EB56 2002             BRA     CKDES6
1566 EB58 8037    CKDES5   SUBA    #'A'-10
1567 EB5A 48      CKDES6   ASLA
1568 EB5B 48               ASLA
1569 EB5C 48               ASLA
1570 EB5D 48               ASLA
1571 EB5E B727E0           STAA    TEMP
1572 EB61 A601             LDAA    1,X
1573 EB63 8139             CMPA    #'9'
1574 EB65 2E04             BGT     CKDES7
1575 EB67 8030             SUBA    #'0'
1576 EB69 2002             BRA     CKDES8
```

```
1577 EB6B 8037        CKDES7    SUBA    #'A'-10
1578 EB6D BA27E0      CKDES8    ORAA    TEMP
1579 EB70 B7D002                STAA    CHIP+2
1580 EB73 08                    INX
1581 EB74 08                    INX
1582 EB75 5A                    DECB
1583 EB76 26D6                  BNE     CKDES3
1584 EB78 BDED7C                JSR     WAITDES
1585 EB7B B6D002                LDAA    CHIP+2      * CHECK PARITY
1586 EB7E 2B17                  BMI     CKPAR
1587 EB80 CE2000                LDX     #DESKY1     * DESTROY KEY
1588 EB83 18CE27C0              LDY     #MSGBUF
1589 EB87 C610                  LDAB    #16
1590 EB89 86FF                  LDAA    #$FF
1591 EB8B A700       CKDES4     STAA    ,X
1592 EB8D 18A700                STAA    ,Y
1593 EB90 08                    INX
1594 EB91 1808                  INY
1595 EB93 5A                    DECB
1596 EB94 26F5                  BNE     CKDES4
1597 EB96 39                    RTS
1598                 *
1599 EB97 7EEE98     CKPAR      JMP     DKERR       * PARITY ERROR
1600                 *
1601                 * SEND FORMATTED ACCOUNT NUMBER OUT RS232 AND EXPECT ECHO.
1602                 * A RETURN AFTER COMPLETION.
1603                 *
1604 EB9A CE204E     PRACT      LDX     #DACCTCD
1605 EB9D 18CE2062              LDY     #EACCTCD
1606 EBA1 B6102F                LDAA    SCDR
1607 EBA4 8600                  LDAA    #$00
1608 EBA6 B72022                STAA    ECHO
1609 EBA9 C610                  LDAB    #16
1610 EBAB A600       PRACT1     LDAA    ,X
1611 EBAD 18A700                STAA    ,Y
1612 EBB0 08                    INX
1613 EBB1 1808                  INY
1614 EBB3 5A                    DECB
1615 EBB4 26F5                  BNE     PRACT1
1616 EBB6 BDEC5A                JSR     ENDES
1617 EBB9 BDEC1C                JSR     FXDES
1618 EBBC CEFBB0                LDX     #CICSDAT
1619 EBBF BDF60C                JSR     MSG
1620 EBC2 CE204E                LDX     #DACCTCD
1621 EBC5 C610                  LDAB    #16
1622 EBC7 A600       PRACT2     LDAA    ,X
1623 EBC9 BDF619                JSR     TXCHAR
1624 EBCC 08                    INX
1625 EBCD 5A                    DECB
1626 EBCE 26F7                  BNE     PRACT2
1627 EBD0 862A                  LDAA    #'*'
1628 EBD2 BDF619                JSR     TXCHAR
1629 EBD5 8631                  LDAA    #'1'
1630 EBD7 BDF619                JSR     TXCHAR
1631 EBDA 7F2022                CLR     ECHO
1632 EBDD 39                    RTS
1633                 *
1634                 * SEND A DES ENCRYPTED NUMBER OUT RS232. USED FOR DEBUG
1635                 *
1636 EBDE CE204E     PRDES      LDX     #DACCTCD
1637 EBE1 18CE2062              LDY     #EACCTCD
1638 EBE5 B6102F                LDAA    SCDR
1639 EBE8 8600                  LDAA    #$00
1640 EBEA B72022                STAA    ECHO
1641 EBED C610                  LDAB    #16
1642 EBEF A600       PRDES1     LDAA    ,X
1643 EBF1 18A700                STAA    ,Y
1644 EBF4 08                    INX
1645 EBF5 1808                  INY
1646 EBF7 5A                    DECB
1647 EBF8 26F5                  BNE     PRDES1
1648 EBFA BDEC5A                JSR     ENDES
1649 EBFD BDEC1C                JSR     FXDES
1650 EC00 CE2062                LDX     #EACCTCD
1651 EC03 C610                  LDAB    #16
1652 EC05 A600       PRDES2     LDAA    ,X
1653 EC07 BDF619                JSR     TXCHAR
```

```
1654 EC0A 08                        INX
1655 EC0B 5A                        DECB
1656 EC0C 26F7                      BNE     PRDES2
1657 EC0E 860D                      LDAA    #$0D
1658 EC10 BDF619                    JSR     TXCHAR
1659 EC13 860A                      LDAA    #$0A
1660 EC15 BDF619                    JSR     TXCHAR
1661 EC18 7F2022                    CLR     ECHO
1662 EC1B 39                        RTS
1663                    *
1664                    * ADJUST ASCII HEX DES VALUES TO NUMERIC HEX
1665                    *
1666 EC1C CE2062        FXDES       LDX     #EACCTCD
1667 EC1F C610                      LDAB    #16
1668 EC21 A600          FXDES1      LDAA    ,X
1669 EC23 8139                      CMPA    #'9'
1670 EC25 2F02                      BLE     FXDES2
1671 EC27 8011                      SUBA    #'A'-'0'
1672 EC29 A700          FXDES2      STAA    ,X
1673 EC2B 08                        INX
1674 EC2C 5A                        DECB
1675 EC2D 26F2                      BNE     FXDES1
1676 EC2F 39                        RTS
1677                    *
1678                    * MOVE KNOWN DES VALUE INTO DES BUFFER FOR TEST DES OPERAT
1679                    *
1680 EC30 CEFB4F        MVDES       LDX     #ENTDAT
1681 EC33 18CE2062                  LDY     #EACCTCD
1682 EC37 C610                      LDAB    #16
1683 EC39 A600          MVDES1      LDAA    ,X
1684 EC3B 18A700                    STAA    ,Y
1685 EC3E 08                        INX
1686 EC3F 1808                      INY
1687 EC41 5A                        DECB
1688 EC42 26F5                      BNE     MVDES1
1689 EC44 39                        RTS
1690                    *
1691                    * MOVE KNOWN KEY INTO KEY BUFFER FOR SAME
1692                    *
1693 EC45 CEFB3F        KYDES       LDX     #DESDAT
1694 EC48 18CE2000                  LDY     #DESKY1
1695 EC4C C610                      LDAB    #16
1696 EC4E A600          KYDES1      LDAA    ,X
1697 EC50 18A700                    STAA    ,Y
1698 EC53 08                        INX
1699 EC54 1808                      INY
1700 EC56 5A                        DECB
1701 EC57 26F5                      BNE     KYDES1
1702 EC59 39                        RTS
1703                    *
1704                    * DO A DES ENCRYPTION OF A 16 DIGIT HEX NUMBER STORED IN E
1705                    * LEAVE RESULT IN EACCTCD AND DO RETURN
1706                    *
1707 EC5A 7D2011        ENDES       TST     DESFLG
1708 EC5D 2601                      BNE     ENDES0
1709 EC5F 39                        RTS
1710 EC60 8601          ENDES0      LDAA    #$01      * RESET CHIP
1711 EC62 B7D001                    STAA    CHIP+1
1712 EC65 BDED7C                    JSR     WAITDES
1713 EC68 B6D001                    LDAA    CHIP+1    * MOVE MAJOR KEY
1714 EC6B BDED7C                    JSR     WAITDES
1715 EC6E CE2062                    LDX     #EACCTCD  STORE DATA TO CHIP
1716 EC71 C608                      LDAB    #8
1717 EC73 A600          ENDES1      LDAA    ,X        * 7 BYTES INTO REG
1718 EC75 8139                      CMPA    #'9'
1719 EC77 2E04                      BGT     ENDES01
1720 EC79 8030                      SUBA    #'0'
1721 EC7B 2002                      BRA     ENDES02
1722 EC7D 8037          ENDES01     SUBA    #'A'-10
1723 EC7F 48            ENDES02     ASLA
1724 EC80 48                        ASLA
1725 EC81 48                        ASLA
1726 EC82 48                        ASLA
1727 EC83 B727E0                    STAA    TEMP
1728 EC86 A601                      LDAA    1,X       * GET LOW NIBBLE
1729 EC88 8139                      CMPA    #'9'
1730 EC8A 2E04                      BGT     ENDES03
```

```
1731 EC8C 8030                    SUBA    #'0'
1732 EC8E 2002           ENDES04  BRA     ENDES04
1733 EC90 8037   ENDES03          SUBA    #'A'-10
1734 EC92 BA27E0 ENDES04          ORAA    TEMP        * PUT INTO ONE BYTE
1735 EC95 C101                    CMPB    #1
1736 EC97 2705                    BEQ     ENDES05
1737 EC99 B7D000                  STAA    CHIP        * INTO DATA REGISTER
1738 EC9C 2003                    BRA     ENDES06
1739 EC9E B7D005   ENDES05        STAA    CHIP+5      * START CONVERSION.
1740 ECA1 08       ENDES06        INX
1741 ECA2 08                      INX
1742 ECA3 5A                      DECB
1743 ECA4 26CD                    BNE     ENDES1
1744 ECA6 BDED7C                  JSR     WAITDES
1745 ECA9 B6D002                  LDAA    CHIP+2      * CHECK PARITY
1746 ECAC 2B34                    BMI     ENPAR
1747 ECAE CE2062                  LDX     #EACCTCD
1748 ECB1 C608                    LDAB    #8
1749 ECB3 B6D004   ENDES3         LDAA    CHIP+4      * GET DES BYTE
1750 ECB6 B727E0                  STAA    TEMP
1751 ECB9 47                      ASRA
1752 ECBA 47                      ASRA
1753 ECBB 47                      ASRA
1754 ECBC 47                      ASRA
1755 ECBD 840F                    ANDA    #$0F        * HIGH NIBBLE
1756 ECBF 8109                    CMPA    #9
1757 ECC1 2E04                    BGT     ENDES4
1758 ECC3 8B30                    ADDA    #'0'
1759 ECC5 2002                    BRA     ENDES5
1760 ECC7 8B37    ENDES4          ADDA    #'A'-10
1761 ECC9 A700    ENDES5          STAA    ,X          * INTO BUFFER
1762 ECCB B627E0                  LDAA    TEMP        * GET AGAIN
1763 ECCE 840F                    ANDA    #$0F
1764 ECD0 8109                    CMPA    #9
1765 ECD2 2E04                    BGT     ENDES6
1766 ECD4 8B30                    ADDA    #'0'
1767 ECD6 2002                    BRA     ENDES7
1768 ECD8 8B37    ENDES6          ADDA    #'A'-10
1769 ECDA A701    ENDES7          STAA    1,X
1770 ECDC 08                      INX
1771 ECDD 08                      INX
1772 ECDE 5A                      DECB
1773 ECDF 26D2                    BNE     ENDES3
1774 ECE1 39                      RTS
1775 ECE2 BDEF7D  ENPAR           JSR     LBEEP
1776 ECE5 39                      RTS
1777                     *
1778                     * DECRYPT A DES NUMBER STORED IN EACCTCD, LEAVE RESULT IN
1779                     * AND DO A RETURN
1780                     *
1781 ECE6 7D2011  DEDES           TST     DESFLG      * IF CHIP EXISTS
1782 ECE9 2601                    BNE     DEDES0
1783 ECEB 39                      RTS
1784 ECEC 8601    DEDES0          LDAA    #$01        * RESET CHIP
1785 ECEE B7D001                  STAA    CHIP+1
1786 ECF1 BDED7C                  JSR     WAITDES
1787 ECF4 B6D001                  LDAA    CHIP+1      * MOVE MAJOR KEY
1788 ECF7 BDED7C                  JSR     WAITDES
1789 ECFA CE2062                  LDX     #EACCTCD
1790 ECFD C608                    LDAB    #8
1791 ECFF A600    DEDES1          LDAA    ,X          * MOVE DATA IN
1792 ED01 8139                    CMPA    #'9'
1793 ED03 2E04                    BGT     DEDES01
1794 ED05 8030                    SUBA    #'0'
1795 ED07 2002                    BRA     DEDES02
1796 ED09 8037    DEDES01         SUBA    #'A'-10
1797 ED0B 48      DEDES02         ASLA
1798 ED0C 48                      ASLA
1799 ED0D 48                      ASLA
1800 ED0E 48                      ASLA
1801 ED0F B727E0                  STAA    TEMP
1802 ED12 A601                    LDAA    1,X
1803 ED14 8139                    CMPA    #'9'
1804 ED16 2E04                    BGT     DEDES03
1805 ED18 8030                    SUBA    #'0'
1806 ED1A 2002                    BRA     DEDES04
```

```
1807 ED1C 8037       DEDES03   SUBA    #'A'-10
1808 ED1E BA27E0     DEDES04   ORAA    TEMP
1809 ED21 C101                 CMPB    #1
1810 ED23 2705                 BEQ     DEDES05
1811 ED25 B7D000               STAA    CHIP
1812 ED28 2003                 BRA     DEDES06
1813 ED2A B7D004     DEDES05   STAA    CHIP+4
1814 ED2D 08         DEDES06   INX
1815 ED2E 08                   INX
1816 ED2F 5A                   DECB
1817 ED30 26CD                 BNE     DEDES1
1818 ED32 BDED7C               JSR     WAITDES
1819 ED35 B6D002               LDAA    CHIP+2     * CHECK PARITY
1820 ED38 2B3E                 BMI     DEPAR
1821 ED3A CE2062               LDX     #EACCTCD
1822 ED3D C608                 LDAB    #8
1823 ED3F B6D004     DEDES3    LDAA    CHIP+4
1824 ED42 B727E0               STAA    TEMP
1825 ED45 47                   ASRA
1826 ED46 47                   ASRA
1827 ED47 47                   ASRA
1828 ED48 47                   ASRA
1829 ED49 840F                 ANDA    #$0F
1830 ED4B 8109                 CMPA    #9
1831 ED4D 2E04                 BGT     DEDES4
1832 ED4F 8B30                 ADDA    #'0'
1833 ED51 2002                 BRA     DEDES5
1834 ED53 8B37       DEDES4    ADDA    #'A'-10
1835 ED55 A700       DEDES5    STAA    ,X
1836 ED57 B627E0               LDAA    TEMP
1837 ED5A 840F                 ANDA    #$0F
1838 ED5C 8109                 CMPA    #9
1839 ED5E 2E04                 BGT     DEDES6
1840 ED60 8B30                 ADDA    #'0'
1841 ED62 2002                 BRA     DEDES7
1842 ED64 8B37       DEDES6    ADDA    #'A'-10
1843 ED66 A701       DEDES7    STAA    1,X
1844 ED68 08                   INX
1845 ED69 08                   INX
1846 ED6A 5A                   DECB
1847 ED6B 26D2                 BNE     DEDES3
1848 ED6D BDED7C               JSR     WAITDES
1849 ED70 B6D002               LDAA    CHIP+2
1850 ED73 8180                 CMPA    #$80
1851 ED75 2701                 BEQ     DEPAR
1852 ED77 39                   RTS
1853                 *
1854 ED78 BDEF7D     DEPAR     JSR     LBEEP
1855 ED7B 39                   RTS
1856                 *
1857                 * WAIT FOR DES CHIP TO BE READY
1858                 *
1859 ED7C 3C         WAITDES   PSHX
1860 ED7D CE0100               LDX     #$0100
1861 ED80 09         WAIDES2   DEX
1862 ED81 26FD                 BNE     WAIDES2
1863 ED83 38                   PULX
1864 ED84 39                   RTS
1865                 *
1866                 * SEND DECRYPTED ACCOUNT NUMBER OUT RS232
1867                 *
1868 ED85 CE2051     SHDES     LDX     #DACCTCD+3
1869 ED88 C610                 LDAB    #16
1870 ED8A A600       SHDES1    LDAA    ,X
1871 ED8C BDF619               JSR     TXCHAR
1872 ED8F 08                   INX
1873 ED90 5A                   DECB
1874 ED91 26F7                 BNE     SHDES1
1875 ED93 860D                 LDAA    #$0D
1876 ED95 BDF619               JSR     TXCHAR
1877 ED98 39                   RTS
1878                 *
1879                 * SERVICE ROUTINE FOR RTI INTERRUPTS
1880                 * SENDS A FLAG TOUT BACK WITH FF IN WHEN TIME IS OUT
1881                 *
1882 ED99 0F         TIMR      SEI               * LETS HOLD INTERRUPTS DURING
```

```
1883 ED9A FE20B5            LDX     TIMZ        * GET DOWN COUNT TO X
1884 ED9D 09                DEX                 * REDUCE IT ONE TICK
1885 ED9E 270A              BEQ     TIMO        * IS IT ZERO YET
1886 EDA0 FF20B5            STX     TIMZ        * WELL ITS NOT SO STORE IT AW
1887 EDA3 8640              LDAA    #$40        * LDAA WITH RTI CLEAR VALUE
1888 EDA5 B71025            STAA    TFLG2       * CLEAR RTI FLAG
1889 EDA8 0E                CLI                 * TURN INTERRUPTS BACK ON
1890 EDA9 3B                RTI                 * LETS GET BACK TO DISPLAYING
1891 EDAA 86FF      TIMO    LDAA    #$FF        * TIME OUT SET FLAG
1892 EDAC B720B8            STAA    TOUT        * PUT FLAG AWAY
1893 EDAF 8640              LDAA    #$40        * CLEAR RTI FLAG
1894 EDB1 B71025            STAA    TFLG2       * GO CLEAR IT
1895 EDB4 0E                CLI                 * TURN INTERRUPTS BACK ON
1896 EDB5 3B                RTI                 * LETS GET BACK TO HANDLER
1897                *
1898                *
1899                * ROUTINE CLEAR RTI FLAG BIT FOR INTERRUPTS
1900                *
1901 EDB6 8640      CLRFLG  LDAA    #$40        * DATA TO CLEAR RTI FLAG
1902 EDB8 B71025            STAA    TFLG2       * CLEAR IT
1903 EDBB 39                RTS                 * RETURN BACK
1904                *
1905                *
1906                * DES KEY INPUT ROUTINE. KEY IS CHECKED AND JUMP TO RSTART
1907                * OR RETURN IF OK
1908                *
1909 EDBC 7F20B8    DKEY    CLR     TOUT        * MAKE SURE TIME OUT FLAG CLE
1910 EDBF 7F2014            CLR     DMARK
1911 EDC2 BDEDB6            JSR     CLRFLG      * GO CLEAR RTI FLAG
1912 EDC5 CE0020            LDX     #$0020      * LENGTH OF TIME  THIS IS ABO
1913 EDC8 FF20B5            STX     TIMZ        * STORE IT FOR RTI USE
1914 EDCB 7F20B7            CLR     CURMES      * CLEAR CURRENT MESSAGE FLAG
1915 EDCE 0E                CLI                 * TURN INTERRUPTS ON
1916 EDCF B620B8    DKEYA   LDAA    TOUT        * GET TIME OUT FLAG
1917 EDD2 81FF              CMPA    #$FF        * CHECK FOR TIME OUT
1918 EDD4 2628              BNE     DKEYB       * STILL TIME GOTO KEY CHECK
1919 EDD6 0F                SEI                 * SHUT INTERRUPTS OFF
1920 EDD7 BDF39F            JSR     DISCLR      * CLEAR DISPLAY
1921 EDDA B620B7            LDAA    CURMES      * GET MESSAGE TO DISPLAY
1922 EDDD 8100              CMPA    #$00        * DISPLAY COMPAY IF NOT EQUAL
1923 EDDF 2708              BEQ     CMESSR
1924 EDE1 BDF459            JSR     STRTMES     * GO DISPLAY COMPAY NAME
1925 EDE4 7F20B7            CLR     CURMES      * CLEAR CURRENT MESSAGE
1926 EDE7 200B              BRA     DKMESA      * GO RESET TIMER
1927 EDE9 CEFA77    CMESSR  LDX     #DMESS      * GET ADDRESS OF MESSAGE
1928 EDEC 86FF              LDAA    #$FF        * SET UP FOR COMPAY MESSAGE
1929 EDEE B720B7            STAA    CURMES      * STORE IT AWAY
1930 EDF1 BDF3CE    DKMES   JSR     MESSD       * GO DISPLAY IT
1931 EDF4 CE0020    DKMESA  LDX     #$0020      * RESET TIMER
1932 EDF7 FF20B5            STX     TIMZ        * STORE IT AWAY FOR INTERRUPT
1933 EDFA 7F20B8            CLR     TOUT        * CLEAR TIME OUT FLAG
1934 EDFD 0E                CLI                 * ENABLE INTERRUPTS
1935 EDFE B61003    DKEYB   LDAA    PORTC       * GET PORT C
1936 EE01 8420              ANDA    #$20        * CHECK FOR DES SWITCH
1937 EE03 26CA              BNE     DKEYA       * NO SWITCH GO BACK
1938                *
1939 EE05 0F        DKEY4   SEI                 * WE HAVE SWITCH TURN RTI OFF
1940 EE06 CE2000            LDX     #DESKY1     * CLEAR DES KEY
1941 EE09 C610              LDAB    #16
1942 EE0B 8600              LDAA    #0
1943 EE0D A700      DKEY0   STAA    ,X
1944 EE0F 08                INX
1945 EE10 5A                DECB
1946 EE11 26FA              BNE     DKEY0
1947 EE13 8604              LDAA    #$04
1948 EE15 A700              STAA    ,X
1949 EE17 BDF39F            JSR     DISCLR      * DES KEY MESSAGE
1950 EE1A CEFAD9            LDX     #PINENT
1951 EE1D BDF0B8            JSR     PUTACCT
1952 EE20 CEFA77            LDX     #DMESS
1953 EE23 BDF3CE            JSR     MESSD
1954 EE26 CE2000            LDX     #DESKY1
1955 EE29 860F              LDAA    #$0F
1956 EE2B BDF396            JSR     DISSET
1957 EE2E 8609              LDAA    #$09
1958 EE30 BDF396            JSR     DISSET
1959 EE33 C610              LDAB    #16
1960 EE35 37        DKEY1   PSHB                * LOOP FOR KEY OR SWITCH
```

```
1961 EE36 3C                        PSHX
1962 EE37 7F2024                    CLR     BEEPFLG
1963 EE3A BDF2D3                    JSR     KYBD
1964 EE3D 38                        PULX
1965 EE3E 33                        PULB
1966 EE3F 4D                        TSTA
1967 EE40 2613                      BNE     DKEY11      * KEY PRESSED
1968 EE42 B61003                    LDAA    PORTC
1969 EE45 8420                      ANDA    #$20
1970 EE47 27EC                      BEQ     DKEY1       * SWITCH ON
1'   EE49 C110                      CMPB    #16
1972 EE4B 264B                      BNE     DKERR       * FIRST POSITION
1973 EE4D 7D2014                    TST     DMARK
1974 EE50 2746                      BEQ     DKERR
1975 EE52 7EEEAA                    JMP     DDONE
1976 EE55 8139          DKEY11      CMPA    #'9'
1977 EE57 2E04                      BGT     DKEY01
1978 EE59 8030                      SUBA    #'0'
1979 EE5B 2002                      BRA     DKEY3
1980 EE5D 8037          DKEY01      SUBA    #'A'-10     * ADJUST FOR HEX DIGIT
1981 EE5F A800          DKEY3       EORA    0,X
1982 EE61 A700                      STAA    0,X
1983 EE63 08                        INX
1984 EE64 8658                      LDAA    #'X'
1985 EE66 BDF3F3                    JSR     DISDAT1
1986 EE69 5A                        DECB
1987 EE6A 26C9                      BNE     DKEY1
1988 EE6C B61003        DKEY02      LDAA    PORTC
1989 EE6F 8420                      ANDA    #$20
1990 EE71 2637                      BNE     DDONE
1991                   *
1992 EE73 BDF39F        DAGN        JSR     DISCLR
1993 EE76 86FF                      LDAA    #$FF
1994 EE78 B72014                    STAA    DMARK
1995 EE7B CEFA8C                    LDX     #DAGMSG
1996 EE7E BDF3CE                    JSR     MESSD
1997 EE81 BDF39F                    JSR     DISCLR
1998 EE84 CEFAD9                    LDX     #PINENT
1999 EE87 BDF0B8                    JSR     PUTACCT
2000 EE8A CEFA8C                    LDX     #DAGMSG
2001 EE8D BDF3CE                    JSR     MESSD
2002 EE90 C610                      LDAB    #16
2003 EE92 CE2000                    LDX     #DESKY1
2004 EE95 7EEE35                    JMP     DKEY1
2005                   *
2006                   * INVALID DES KEY PROCESSING
2007                   *
2008 EE98 BDF39F        DKERR       JSR     DISCLR      * CLEAR DISPLAY
2009 EE9B CEFAB5                    LDX     #DTOSHRT    * GET ADDR OF MESSAGE
2010 EE9E BDF3CE                    JSR     MESSD       * DISPLAY IT
2011 EEA1 BDEF7D                    JSR     LBEEP
2012 EEA4 BDEF5D                    JSR     RTID        * DELAY
2013 EEA7 7EE0A3                    JMP     RSTART      * GO KEY HUNTING
2014                   *
2015                   * DES KEY HAS BEEN ENTERRED
2016                   *
2017 EEAA CE2000        DDONE       LDX     #DESKY1     * CHECK PARITY ON KEY
2018 EEAD C608                      LDAB    #08
2019 EEAF A600          DDONE1      LDAA    ,X
2020 EEB1 48                        ASLA
2021 EEB2 48                        ASLA
2022 EEB3 48                        ASLA
2023 EEB4 48                        ASLA
2024 EEB5 AA01                      ORAA    1,X
2025 EEB7 B727E0                    STAA    TEMP
2026 EEBA BDF08F                    JSR     PARITY
2027 EEBD B127E0                    CMPA    TEMP
2028 EEC0 26D6                      BNE     DKERR
2029 EEC2 08                        INX
2030 EEC3 08                        INX
2031 EEC4 5A                        DECB
2032 EEC5 26E8                      BNE     DDONE1
2033                   *
2034 EEC7 CE2000                    LDX     #DESKY1     * MAKE OK KEY ASCII
2035 EECA C610                      LDAB    #16
2036 EECC A600          DDONE2      LDAA    ,X
```

```
2037 EECE 8109                CMPA    #9
2038 EED0 2E04                BGT     DDONE3
2039 EED2 8B30                ADDA    #'0'
2040 EED4 2002                BRA     DDONE4
2041 EED6 8B37        DDONE3  ADDA    #'A'-10
2042 EED8 A700        DDONE4  STAA    ,X
2043 EEDA 08                  INX
2044 EEDB 5A                  DECB
2045 EEDC 26EE                BNE     DDONE2
2046                 *
2047 EEDE BDEEEE              JSR     DCHK
2048 EEE1 CE0020      DDONE8  LDX     #$0020
2049 EEE4 BDEF60              JSR     RTIDE2
2050 EEE7 BDEF74              JSR     SBEEP
2051 EEEA BDEF74              JSR     SBEEP
2052 EEED 39                  RTS             * RETURN BACK
2053                 *
2054 EEEE C610        DCHK    LDAB    #16
2055 EEF0 8630                LDAA    #'0'
2056 EEF2 CE2062              LDX     #EACCTCD
2057 EEF5 A700        DCHK1   STAA    ,X
2058 EEF7 08                  INX
2059 EEF8 5A                  DECB
2060 EEF9 26FA                BNE     DCHK1
2061 EEFB 8604                LDAA    #$04
2062 EEFD A700                STAA    ,X
2063 EEFF BDEB08              JSR     CKDES
2064 EF02 BDEC5A              JSR     ENDES
2065 EF05 8604                LDAA    #$04
2066 EF07 B72068              STAA    EACCTCD+6
2067 EF0A BDF39F              JSR     DISCLR
2068 EF0D CEFB03              LDX     #DOKMSG
2069 EF10 BDF3BE              JSR     MESSDA
2070 EF13 CE2062              LDX     #EACCTCD
2071 EF16 BDF3CE              JSR     MESSD
2072 EF19 7F2024              CLR     BEEPFLG
2073 EF1C BDF2D3      DCHK2   JSR     KYBD
2074 EF1F 4D                  TSTA
2075 EF20 27FA                BEQ     DCHK2
2076 EF22 8140                CMPA    #'@'
2077 EF24 270D                BEQ     DCHK3
2078 EF26 BDF39F              JSR     DISCLR
2079 EF29 CEFACA              LDX     #OKMSG
2080 EF2C BDF3CE              JSR     MESSD
2081 EF2F BDEF74              JSR     SBEEP
2082 EF32 39                  RTS
2083 EF33 7EE0A3      DCHK3   JMP     RSTART
2084                 *
2085                 * ADJUST DATA FOR DISPLAY
2086                 *
2087 EF36 86FF        DADJST  LDAA    #$FF
2088 EF38 47                  ASRA
2089 EF39 47                  ASRA
2090 EF3A 47                  ASRA
2091 EF3B 47                  ASRA
2092 EF3C 840F                ANDA    #$0F
2093 EF3E 8109                CMPA    #$09
2094 EF40 2E04                BGT     DADJ1
2095 EF42 8B30                ADDA    #'0'
2096 EF44 2002                BRA     DADJ2
2097 EF46 8B37        DADJ1   ADDA    #'A'-10
2098 EF48 18A700      DADJ2   STAA    ,Y
2099 EF4B 86FF                LDAA    #$FF
2100 EF4D 840F                ANDA    #$0F
2101 EF4F 8109                CMPA    #$09
2102 EF51 2E04                BGT     DADJ4
2103 EF53 8B30                ADDA    #'0'
2104 EF55 2002                BRA     DADJ5
2105 EF57 8B37        DADJ4   ADDA    #'A'-10
2106 EF59 18A701      DADJ5   STAA    1,Y
2107 EF5C 39                  RTS
2108                 *
2109                 * FIXED DELAY ON RETURN
2110                 *
2111 EF5D CE0020      RTID    LDX     #$0020   * DELAY COUNTER
2112 EF60 FF20B5      RTIDE2  STX     TIMZ     * STORE IT AWAY
2113 EF63 7F20B8              CLR     TOUT     * CLEAR FLAG
2114 EF66 BDEDB6              JSR     CLRFLG   * MAKE SURE RTI FLAG CLEAR
```

```
2115 EF69 0E                  CLI                         * TURN INTERRUPTS ON
2116 EF6A 7D20B8     RTID1    TST     TOUT                * CHECK FLAG
2117 EF6D 27FB                BEQ     RTID1               * NO ACTION GO BACK
2118 EF6F 7F20B8              CLR     TOUT                * CLEAR FLAG
2119 EF72 0F                  SEI                         * TURN INTERRUPTS OFF
2120 EF73 39                  RTS                         * GO BACK
2121                  *
2122                  * SHORT BEEP FOR KEYPRESS
2123                  *
2124 EF74 3C          SBEEP    PSHX
2125 EF75 CE1FFF              LDX     #$1FFF
2126 EF78 BDEF95              JSR     BEEP
2127 EF7B 38                  PULX
2128 EF7C 39                  RTS
2129                  *
2130                  * FOUR LONG BEEPS FOR ERROR
2131                  *
2132 EF7D 3C          LBEEP    PSHX
2133 EF7E 37                  PSHB
2134 EF7F C604               LDAB    #$04
2135 EF81 CE7FFF     LBEEP1   LDX     #$7FFF
2136 EF84 BDEF95              JSR     BEEP
2137 EF87 5A                  DECB
2138 EF88 2708               BEQ     LBEEP3
2139 EF8A CE7FFF              LDX     #$7FFF
2140 EF8D 09         LBEEP2   DEX
2141 EF8E 26FD                BNE     LBEEP2
2142 EF90 20EF                BRA     LBEEP1
2143 EF92 33         LBEEP3   PULB
2144 EF93 38                  PULX
2145 EF94 39                  RTS
2146                  *
2147                  * BEEP THE BEEPER
2148                  * X = LENGTH OF BEEP
2149                  *
2150 EF95 183C        BEEP     PSHY
2151 EF97 18CE1004            LDY     #PORTB
2152 EF9B 181C0010            BSET    Y,$10
2153 EF9F 09         BEEP1    DEX
2154 EFA0 26FD                BNE     BEEP1
2155 EFA2 181D0010            BCLR    Y,$10
2156 EFA6 1838                PULY
2157 EFA8 39                  RTS
2158                  *
2159                  * WAIT FOR KEYPRESS TO EXIT
2160                  *
2161 EFA9 CE0004     HOLDNOH  LDX     #$0004
2162 EFAC BDEF60              JSR     RTIDE2
2163 EFAF BDF2D3              JSR     KYBD
2164 EFB2 4D                  TSTA
2165 EFB3 27F4                BEQ     HOLDNOH
2166 EFB5 39                  RTS
2167                  *
2168                  * PIN NUMBER ENTRY EITHER BY SCAN OR KEYBOARD
2169                  * NUMBER RETURNED IN PINCOD
2170                  *
2171 EFB6 BDF39F     PININ    JSR     DISCLR
2172 EFB9 7F2024              CLR     BEEPFLG
2173                  *       LDX     #ACTMSG
2174                  *       JSR     PUTACCT
2175                  *       LDX     #DACCTCD
2176                  *       LDAA    #$80+64+4
2177                  *       JSR     DISSET
2178                  *       JSR     ACCT1
2179 EFBC CEFA48              LDX     #PINN
2180 EFBF BDF3BE              JSR     MESSDA
2181 EFC2 CE0004              LDX     #$0004
2182 EFC5 BDEF60              JSR     RTIDE2
2183 EFC8 CE202E              LDX     #PIN1BUF
2184 EFCB FF2027              STX     OUTPTR
2185 EFCE C604                LDAB    #4
2186 EFD0 BDF23D              JSR     GETDAT
2187 EFD3 CE0006              LDX     #$0006
2188 EFD6 BDEF60              JSR     RTIDE2
2189 EFD9 BDF39F              JSR     DISCLR
2190                  *       LDX     #ACTMSG
```

```
2191                    *       JSR     PUTACCT
2192                    *       LDAA    #$80+64+4
2193                    *       JSR     DISSET
2194                    *       LDX     #DACCTCD
2195                    *       JSR     ACCT1
2196 EFDC CEFA55                LDX     #AGNMSG
2197 EFDF BDF3BE                JSR     MESSDA
2198 EFE2 CE2033                LDX     #PIN2BUF
2199 EFE5 FF2027                STX     OUTPTR
2200 EFE8 C604                  LDAB    #4
2201 EFEA BDF23D                JSR     GETDAT
2202 EFED CE0008                LDX     #$0008
2203 EFF0 BDEF60                JSR     RTIDE2
2204                    *
2205                    * CHECK PIN BY ENTERING TWICE AND COMPRING AND NO 0000 ALL
2206                    * RETURN IF OK AND JUMP TO PININ IF BAD
2207                    *
2208 EFF3 CE202E        CHKPIN  LDX     #PIN1BUF CHECK ENTRY OF PIN NUMBER
2209 EFF6 18CE2033              LDY     #PIN2BUF
2210 EFFA C604                  LDAB    #4
2211 EFFC A600         CKPIN    LDAA    ,X
2212 EFFE 18A100                CMPA    ,Y
2213 F001 2677                  BNE     BADPIN
2214 F003 08                    INX
2215 F004 1808                  INY
2216 F006 5A                    DECB
2217 F007 26F3                  BNE     CKPIN
2218 F009 7D2011                TST     DESFLG
2219 F00C 275C                  BEQ     CKPIN01
2220 F00E CE202E                LDX     #PIN1BUF NO 0000 PIN ACCEPTED
2221 F011 C604                  LDAB    #$04
2222 F013 8630                  LDAA    #'0'
2223 F015 A100         CKPIN00  CMPA    ,X
2224 F017 2606                  BNE     CKPIN21
2225 F019 08                    INX
2226 F01A 5A                    DECB
2227 F01B 26F8                  BNE     CKPIN00
2228 F01D 205B                  BRA     BADPIN
2229 F01F BDEB9A       CKPIN21  JSR     PRACT
2230 F022 CE202E                LDX     #PIN1BUF
2231 F025 18CE2062              LDY     #EACCTCD
2232 F029 8600                  LDAA    #$00
2233 F02B B72022                STAA    ECHO
2234 F02E C604                  LDAB    #4
2235 F030 A600         CKPIN11  LDAA    ,X
2236 F032 8139                  CMPA    #'9'
2237 F034 2E04                  BGT     CKPIN22
2238 F036 8030                  SUBA    #'0'
2239 F038 2002                  BRA     CKPIN23
2240 F03A 8041         CKPIN22  SUBA    #'A'
2241 F03C 36           CKPIN23  PSHA
2242 F03D 18A600                LDAA    ,Y
2243 F040 8030                  SUBA    #'0'
2244 F042 B727E0                STAA    TEMP
2245 F045 32                    PULA
2246 F046 B027E0                SUBA    TEMP
2247 F049 2A02                  BPL     CKPIN13
2248 F04B 8B0A                  ADDA    #10
2249 F04D 8B30         CKPIN13  ADDA    #'0'
2250 F04F BDF619                JSR     TXCHAR
2251 F052 08                    INX
2252 F053 1808                  INY
2253 F055 5A                    DECB
2254 F056 26D8                  BNE     CKPIN11
2255 F058 8600                  LDAA    #$00
2256 F05A B72022                STAA    ECHO
2257 F05D 860D                  LDAA    #$0D
2258 F05F BDF619                JSR     TXCHAR
2259 F062 860A                  LDAA    #$0A
2260 F064 BDF619                JSR     TXCHAR
2261 F067 7F2022                CLR     ECHO
2262 F06A BDF39F       CKPIN01  JSR     DISCLR
2263 F06D CEFB25                LDX     #OKOK
2264 F070 BDF3BE                JSR     MESSDA
2265 F073 BDE2B1                JSR     ACTWAI
2266 F076 BDEF74                JSR     SBEEP
2267 F079 39                    RTS
2268                    *
```

```
2269 F07A BDF39F    BADPIN  JSR     DISCLR
2270 F07D CEFB10            LDX     #PINERR
2271 F080 BDF3BE            JSR     MESSDA
2272 F083 BDEF7D            JSR     LBEEP
2273 F086 CE0010            LDX     #$0010
2274 F089 BDEF60            JSR     RTIDE2
2275 F08C 7EEFB6            JMP     PININ
2276                *
2277               * GENERATE ODD PARITY ON A BYTE IN STORAGE AN ADD PARITY B
2278                *
2279 F08F 847F     PARITY   ANDA    #$7F
2280 F091 B72026            STAA    STORAGE
2281 F094 37                PSHB
2282 F095 C608              LDAB    #$08
2283 F097 7F2025            CLR     TEMPSUM
2284 F09A 0C                CLC
2285 F09B 49       SHIFT    ROLA
2286 F09C 2403              BCC     SHIFT1
2287 F09E 7C2025            INC     TEMPSUM
2288 F0A1 5A       SHIFT1   DECB
2289 F0A2 26F7              BNE     SHIFT
2290 F0A4 B62025            LDAA    TEMPSUM
2291 F0A7 8401              ANDA    #$01
2292 F0A9 2608              BNE     ODD
2293 F0AB B62026            LDAA    STORAGE
2294 F0AE 8A80              ORAA    #$80
2295 F0B0 B72026            STAA    STORAGE
2296 F0B3 B62026   ODD      LDAA    STORAGE
2297 F0B6 33                PULB
2298 F0B7 39                RTS
2299                *
2300               * PUT DECRYPTED ACCOUNT NUMBER ON THE SECOND LINE OF DISPL
2301                *
2302 F0B8 86C0     PUTACCT  LDAA    #$80+64
2303 F0BA BDF396            JSR     DISSET
2304 F0BD A600     ACCT1    LDAA    ,X
2305 F0BF 8104              CMPA    #$04
2306 F0C1 270B              BEQ     ACCT3
2307 F0C3 7D6000   ACCT2    TST     DISCTRL
2308 F0C6 2BFB              BMI     ACCT2
2309 F0C8 B76001            STAA    DISDATA
2310 F0CB 08                INX
2311 F0CC 20EF              BRA     ACCT1
2312 F0CE 8680     ACCT3    LDAA    #$80
2313 F0D0 BDF396            JSR     DISSET
2314 F0D3 39                RTS
2315                *
2316               * SHOW VERSION NUMBER OF SOFTWARE ON THE DISPLAY
2317                *
2318 F0D4 BDF39F   VERSION  JSR     DISCLR
2319 F0D7 CEF8AD            LDX     #VERMSG
2320 F0DA BDF3CE            JSR     MESSD
2321 F0DD CE0010            LDX     #$0010
2322 F0E0 BDEF60            JSR     RTIDE2
2323 F0E3 7EE0A3            JMP     RSTART
2324                *
2325               * GET ACCOUNT NUMBER FORM WAND OR KEYBAORD. SPECIAL FUNCTI
2326               * ACCESSED THROUGH THIS ROUTINE
2327                *
2328 F0E6 7F2020   GACT     CLR     KFLAG
2329 F0E9 7F2024            CLR     BEEPFLG
2330 F0EC 86FF              LDAA    #$FF
2331 F0EE B7201F            STAA    NMESS
2332 F0F1 B7201E            STAA    NCODE
2333 F0F4 CEFAEE            LDX     #ACTENT
2334 F0F7 BDF0B8            JSR     PUTACCT
2335 F0FA 86C0              LDAA    #$80+64
2336 F0FC BDF396            JSR     DISSET
2337 F0FF 860F              LDAA    #$0F
2338 F101 BDF396            JSR     DISSET
2339 F104 8609              LDAA    #$09
2340 F106 BDF396            JSR     DISSET
2341 F109 BDE01C            JSR     TRANSI
2342 F10C 7D201E            TST     NCODE
2343 F10F 2652              BNE     GACT2
2344 F111 7D2020            TST     KFLAG
2345 F114 27D0              BEQ     GACT
```

```
2346 F116 BDF185              JSR     CMD1
2347 F119 CE203A              LDX     #ACCTCOD
2348 F11C FF2027              STX     OUTPTR
2349 F11F BDF469              JSR     PUTBUF
2350 F122 BDF3EC              JSR     DISDAT
2351 F125 8612                LDAA    #18
2352 F127 B72015              STAA    CNTLOC
2353 F12A 7F202.    GACT1     CLR     BEEPFLG
2354 F12D BDF249              JSR     GETKEY
2355 F130 813F                CMPA    #'?'
2356 F132 27F6                BEQ     GACT1
2357 F134 8140                CMPA    #'@'
2358 F136 272C                BEQ     NOACT
2359 F138 8124                CMPA    #'$'
2360 F13A 272B                BEQ     BSACT
2361 F13C 8130                CMPA    #'0'
2362 F13E 2DEA                BLT     GACT1
2363 F140 815A                CMPA    #'Z'
2364 F142 2EE6                BGT     GACT1
2365 F144 8139                CMPA    #'9'
2366 F146 2F04                BLE     GACT3
2367 F148 8141                CMPA    #'A'
2368 F14A 2DDE                BLT     GACT1
2369 F14C BDF469    GACT3     JSR     PUTBUF
2370 F14F BDF3EC              JSR     DISDAT
2371 F152 7A2015              DEC     CNTLOC
2372 F155 26D3                BNE     GACT1
2373 F157 8604                LDAA    #$04
2374 F159 BDF469              JSR     PUTBUF
2375 F15C FE2027              LDX     OUTPTR
2376 F15F 09                  DEX
2377 F160 FF2098              STX     ACCTP
2378 F163 39       GACT2      RTS
2379 F164 7EE0E2   NOACT      JMP     RUNNER
2380                *
2381                * DO DACKSPACE ON ACCOUNT NUMBER ENTRY
2382                *
2383 F167 FE2027   BSACT      LDX     OUTPTR
2384 F16A 8C203A              CPX     #ACCTCOD
2385 F16D 2713                BEQ     BSACT1
2386 F16F 8604                LDAA    #$04
2387 F171 A700                STAA    ,X
2388 F173 09                  DEX
2389 F174 FF2027              STX     OUTPTR
2390 F177 8607                LDAA    #$07
2391 F179 BDF396              JSR     DISSET
2392 F17C 7A27E7              DEC     DISCOL
2393 F17F 7C2015              INC     CNTLOC
2394 F182 7EF12A   BSACT1     JMP     GACT1
2395                *
2396                * COMMAND LOOKUP FROM FIRST CHARACTER IN GACT CALLED BY SA
2397                *
2398 F185 B62020   CMD1       LDAA    KFLAG    * A* CLEAR LINE
2399 F188 8140                CMPA    #'@'
2400 F18A 2603                BNE     CMD01
2401 F18C 7EE0E2              JMP     RUNNER
2402 F18F 813F     CMD01      CMPA    #'?'     * INVALID CHARACTER
2403 F191 2603                BNE     CMD02
2404 F193 7EE0E2              JMP     RUNNER
2405 F196 812B     CMD02      CMPA    #'+'     * D2 CLOSE CICS FILE
2406 F198 2603                BNE     CMD03
2407 F19A 7EEA81              JMP     CLOSEF
2408 F19D 812D     CMD03      CMPA    #'-'     * D1 SEND LOGON TO BOX
2409 F19F 2603                BNE     CMD04
2410 F1A1 7EEAA1              JMP     LOGON
2411 F1A4 8125     CMD04      CMPA    #'%'     * D3 LOAD DATA TABLE
2412 F1A6 260C                BNE     CMD05
2413 F1A8 CEB6F6              LDX     #USPW
2414 F1AB FF2094              STX     PW1PTR
2415 F1AE FF2096              STX     PW2PTR
2416 F1B1 7EE4FF              JMP     LTABLE
2417 F1B4 8126     CMD05      CMPA    #'&'     * D4 SET LOAD PASSWORD
2418 F1B6 260C                BNE     CMD06
2419 F1B8 CEB6F6              LDX     #USPW
2420 F1BB FF2094              STX     PW1PTR
2421 F1BE FF2096              STX     PW2PTR
2422 F1C1 7EE6ED              JMP     SETPW
```

```
2423 F1C4 8124      CMD06   CMPA    #'$'        * A# BACKSPACE
2424 F1C6 2603              BNE     CMD07
2425 F1C8 7EF0E6            JMP     GACT
2426 F1CB 8128      CMD07   CMPA    #'('        * D5 SEND FDSN MESSAGE
2427 F1CD 2620              BNE     CMD08
2428 F1CF BDF39F            JSR     DISCLR
2429 F1D2 CEF9DF            LDX     #LOGMSG
2430 F1D5 BDF3CE            JSR     MESSD
2431 F1D8 86FF              LDAA    #$FF
2432 F1DA B72022            STAA    ECHO
2433 F1DD CEFBE2            LDX     #FDSNMSG
2434 F1E0 BDF60C            JSR     MSG
2     F1E3 7F2022            CLR     ECHO
24.. F1E6 BDE2BB            JSR     COMWAI
2437 F1E9 BDEF74            JSR     SBEEP
2438 F1EC 7EE0E2            JMP     RUNNER
2439 F1EF 817C      CMD08   CMPA    #'|'        * D7 SET USERS PASSWORD
2    F1F1 2603              BNE     CMD09
2.   F1F3 7EE80D            JMP     CHKSPW
2442 F1F6 8129      CMD09   CMPA    #')'        * D6 SEND LOGON PASSWORD
2443 F1F8 2634              BNE     CMD0A
2444 F1FA BDF39F            JSR     DISCLR
2445 F1FD CEF961            LDX     #KATMSG
2446 F200 BDF3CE            JSR     MESSD
2447 F203 BDEA48            JSR     CURSON
2448 F206 C60A              LDAB    #10
2449 F208 7F2024    CMD00   CLR     BEEPFLG
2450 F20B BDF249            JSR     GETKEY
2451 F20E 813F              CMPA    #'?'
2452 F210 27F6              BEQ     CMD00
2453 F212 BDF3EC            JSR     DISDAT
2454 F215 BDF619            JSR     TXCHAR
2455 F218 5A                DECB
2456 F219 26ED              BNE     CMD00
2457 F21B 860D              LDAA    #$0D
2458 F21D BDF619            JSR     TXCHAR
2459 F220 860A              LDAA    #$0A
2460 F222 BDF619            JSR     TXCHAR
2461 F225 BDE2BB            JSR     COMWAI
2462 F228 BDEF74            JSR     SBEEP
2463 F22B 7EE0E2            JMP     RUNNER
2464 F22E 812F      CMD0A   CMPA    #'/'        * D8 DECRPYT ACCOUNTS
2465 F230 2603              BNE     CMD0B
2466 F232 7EE929            JMP     GETSPW
2    F235 813D      CMD0B   CMPA    #'='
24.. F237 2603              BNE     CMD0F
2469 F23. 7EE890            JMP     SETSPW      * D9 SET MASTER PASSWORD
2470 F23C 39        CMD0F   RTS
2471                *
2472                * GET A NUMBER OF BYTES OF DATA OF NUMERIC DATA
2473                * COUNT IN B AND PINTED TO BY X
2474                *
2475 F23D 37        GETDAT  PSHB
2476 F23E BDF254            JSR     GETDEC
2477 F241 33                PULB
2478 F242 BDF469            JSR     PUTBUF
2479 F245 5A                DECB
2480 F246 26F5              BNE     GETDAT
2481 F248 39                RTS
2482                *
2483                * WAIT FOR ONE KEY TO BE PRESSED AND RETURN IN A
2484                *
2485 F249 3C        GETKEY  PSHX
2486 F24A 37                PSHB
2487 F24B BDF2D3            JSR     KYBD
2488 F24E 33                PULB
2489 F24F 38                PULX
2490 F250 4D                TSTA
2491 F251 27F6              BEQ     GETKEY
2492 F253 39                RTS
2                  *
24..               * GET 1 DECIMAL DIGIT FROM WAND OR KEYBOARD
2495               *
2496 F254 7F2020    GETDEC  CLR     KFLAG
2497 F257 7F2024            CLR     BEEPFLG
2    F25A 86FF              LDAA    #$FF
24.. F25C B7201E            STAA    NCODE
2500 F25F B7201F            STAA    NMESS
```

```
2501 F262 860F              LDAA    #$0F
2502 F264 BDF396            JSR     DISSET
2503 F267 8609              LDAA    #$09
2504 F269 BDF396            JSR     DISSET
2505 F26C CE209A            LDX     #PINCOD
2506 F26F FF2098            STX     ACCTP
2507 F272 7F209A            CLR     PINCOD
2508 F275 7F209B            CLR     PINCOD+1
2509 F278 BDE01C            JSR     TRANSI
2510 F27B B62020            LDAA    KFLAG
2511 F27E 2612              BNE     GETD1
2512 F280 7D201E            TST     NCODE
2513 F283 27CF              BEQ     GETDEC
2514 F285 B6209B            LDAA    PINCOD+1
2515 F288 8104              CMPA    #$04
2516 F28A 26C8              BNE     GETDEC
2517 F28C BDEF74            JSR     SBEEP
2518 F28F B6209A            LDAA    PINCOD
2519 F292 8140      GETD1   CMPA    #'@'
2520 F294 2603              BNE     GETD2
2521 F296 7EE0E2            JMP     RUNNER
2522 F299 8130      GETD2   CMPA    #'0'
2523 F29B 2DB7              BLT     GETDEC
2524 F29D 8139              CMPA    #'9'
2525 F29F 2EB3              BGT     GETDEC
2526 F2A1 BDF3EC            JSR     DISDAT
2527 F2A4 36                PSHA
2528 F2A5 860E              LDAA    #$0E
2529 F2A7 BDF396            JSR     DISSET
2530 F2AA 32                PULA
2531 F2AB 39                RTS
2532                *
2533                * DELAY FOR KEY BOUNCE
2534                *
2535 F2AC 37       KDELAY   PSHB
2536 F2AD C63F              LDAB    #$3F
2537 F2AF 5A       KD1      DECB
2538 F2B0 26FD              BNE     KD1
2539 F2B2 33                PULB
2540 F2B3 39                RTS
2541               *
2542               * KEYBOARD SERVICE ROUTINE
2543               *
2544 F2B4 B62020   INKEYR   LDAA    KFLAG    * GET PRESSED KEY BACK
2545 F2B7 8140              CMPA    #'@'     * CHECKING FOR AN 0A
2546 F2B9 2601              BNE     INKEYRA  * NOT AN 0A DISPLAY CONTINUE
2547 F2BB 39                RTS              * RETURN IT IS AN 0A
2548 F2BC BDF3EC   INKEYRA  JSR     DISDAT   * PUT KEY TO DISPLAY
2549 F2BF CEF41F            LDX     #DISLOC
2550 F2C2 BDF2D3   INKEYR1  JSR     KYBD     * GO KEY HUNTING
2551 F2C5 4D                TSTA             * TEST FOR RETURN BITS
2552 F2C6 27FA              BEQ     INKEYR1  * NOT A KEY KEEP GOING
2553 F2C8 810A              CMPA    #$0A     * COMPARE FOR AN 0A
2554 F2CA 2601              BNE     INKEYR2  * NOT AN 0A KEEP GOING
2555 F2CC 39                RTS              * RETURN 0A FOUND
2556 F2CD BDF3F3   INKEYR2  JSR     DISDAT1  * PUT KEY ON DISPLAY
2557 F2D0 7EF2C2            JMP     INKEYR1  * GET NEXT KEY NOT A RETURN
2558               *
2559               *STANDARD KEYBOARD INPUT ROUTINE WITH FUNCTION CODES
2560               *
2561 F2D3 7F27DF   KYBD     CLR     MULT
2562 F2D6 7F27E0            CLR     TEMP
2563 F2D9 C601              LDAB    #$01     * CHECK FOR FUNCTION KEY
2564 F2DB F71004            STAB    PORTB
2565 F2DE BDF2AC            JSR     KDELAY
2566 F2E1 B61003            LDAA    PORTC
2567 F2E4 840F              ANDA    #$0F
2568 F2E6 2734              BEQ     KYBD4
2569 F2E8 C604              LDAB    #$04
2570 F2EA 47       KYBD1    ASRA
2571 F2EB 240E              BCC     KYBD2
2572 F2ED 7C27E0            INC     TEMP
2573 F2F0 B627E0            LDAA    TEMP
2574 F2F3 C610              LDAB    #$10
2575 F2F5 3D                MUL
2576 F2F6 F727DF            STAB    MULT
2577 F2F9 2006              BRA     KYBD3
```

```
2578 F2FB 7C27E0    KYBD2    INC    TEMP
2579 F2FE 5A                 DECB
2580 F2FF 26E9               BNE    KYBD1
2581 F301 C601     KYBD3     LDAB   #$01
2582 F303 F71004             STAB   PORTB
2583 F306 BDF2AC             JSR    KDELAY
2584 F309 B61003             LDAA   PORTC
2585 F30C 840F               ANDA   #$0F
2586 F30E 270C               BEQ    KYBD4
2587 F310 C60E               LDAB   #$0E
2588 F312 F71004             STAB   PORTB
2589 F315 B61003             LDAA   PORTC
2590 F318 840F               ANDA   #$0F
2591 F31A 27E5               BEQ    KYBD3
2592 F31C CEF85D   KYBD4     LDX    #KYSCAN
2593 F31F F627DF             LDAB   MULT
2594 F322 3A                 ABX
2595 F323 8CF8AD             CPX    #KYSCAN+(16*5)
2596 F326 2CAB               BGE    KYBD
2597 F328 C602               LDAB   #$02           * SET UP FOR FIRST SCAN
2598 F32A F71004   SCAN      STAB   PORTB
2599 F32D B61003             LDAA   PORTC          * GET PORT
2600 F330 840F               ANDA   #$0F           * MASK OFF UNUSED BITS
2601 F332 260A               BNE    KEY            * DO WE HAVE A KEY
2602 F334 58                 LSLB                  * NO SHIFT B
2603 F335 C510               BITB   #$10           * TEST B FOR OUT OF BOUNDS
2604 F337 27F1               BEQ    SCAN           * NO ONE MORE SCAN
2605 F339 4F                 CLRA                  * CLEAR A NO KEY
2606 F33A 7F1004             CLR    PORTB          * CLEAR PORT B
2607 F33D 39                 RTS                   * RETURN VALUE OF KEY IS IN A
2608 F33E 7F27DF   KEY       CLR    MULT
2609 F341 54       ROW1      LSRB
2610 F342 2505               BCS    ROW
2611 F344 7C27DF             INC    MULT
2612 F347 20F8               BRA    ROW1
2613 F349 B727E0   ROW       STAA   TEMP
2614 F34C B627DF             LDAA   MULT
2615 F34F C604               LDAB   #$04
2616 F351 3D                 MUL
2617 F352 3A                 ABX
2618 F353 B627E0             LDAA   TEMP
2619 F356 7F27DF             CLR    MULT
2620 F359 44       COL1      LSRA
2621 F35A 2505               BCS    COL
2622 F35C 7C27DF             INC    MULT
2623 F35F 20F8               BRA    COL1
2624 F361 F627DF   COL       LDAB   MULT
2625 F364 3A                 ABX
2626 F365 A600               LDAA   0,X
2627 F367 C60E               LDAB   #$0E
2628 F369 F71004             STAB   PORTB
2629 F36C F61003   NOREL     LDAB   PORTC
2630 F36F C40F               ANDB   #$0F
2631 F371 2716               BEQ    RELES
2632 F373 7D2024             TST    BEEPFLG
2633 F376 260C               BNE    NOREL1
2634 F378 36                 PSHA
2635 F379 86FF               LDAA   #$FF
2636 F37B B72024             STAA   BEEPFLG
2637 F37E BDEF74             JSR    SBEEP
2638 F381 32                 PULA
2639 F382 20E8               BRA    NOREL
2640 F384 BDF38D   NOREL1    JSR    DELAYER
2641 F387 20E3               BRA    NOREL
2642 F389 7F1004   RELES     CLR    PORTB
2643 F38C 39                 RTS
2644                *
2645                * STANDARD KEYBOARD DELAY
2646                *
2647 F38D 3C       DELAYER   PSHX
2648 F38E CE2FFF             LDX    #$2FFF
2649 F391 09       DELAYZ    DEX
2650 F392 26FD               BNE    DELAYZ
2651 F394 38                 PULX
2652 F395 39                 RTS
2653               *
2654               *
2655               * SEND CONTROL CODES TO LCD DISPLAY
```

```
2656                        *
2657 F396 7D6001    DISSET   TST     DISDATA
2658 F399 2BFB              BMI     DISSET
2659 F39B B76000            STAA    DISCTRL
2660 F39E 39                RTS
2661                        *
2662                        * CLEAR LCD DISPLAY AND TURN ON CURSOR AT HOME
2663                        *
2664 F39F 8601     DISCLR   LDAA    #$01
2665 F3A1 BDF396            JSR     DISSET
2666 F3A4 8602              LDAA    #$02
2667 F3A6 BDF396            JSR     DISSET
2668 F3A9 860E              LDAA    #$0E
2669 F3AB BDF396            JSR     DISSET
2670 F3AE 8609              LDAA    #$09
2671 F3B0 BDF396            JSR     DISSET
2672 F3B3 860D              LDAA    #$0D
2673 F3B5 BDF396            JSR     DISSET
2674 F3B8 8601              LDAA    #$01
2675 F3BA B727E6            STAA    DISROW
2676 F3BD 39                RTS
2677                        *
2678                        * LCD MESSAGE ROUTINE. POINT TO BY X AND END WITH 04
2679                        *
2680 F3BE 3C       MESSDA   PSHX
2681 F3BF A600              LDAA    X
2682 F3C1 8104              CMPA    #$04
2683 F3C3 2707              BEQ     MESSDD
2684 F3C5 BDF3F3            JSR     DISDAT1
2685 F3C8 38                PULX
2686 F3C9 08                INX
2687 F3CA 20F2              BRA     MESSDA
2688 F3CC 38       MESSDD   PULX
2689 F3CD 39                RTS
2690                        *
2691 F3CE 3C       MESSD    PSHX
2692 F3CF A600              LDAA    X
2693 F3D1 BDF3EC            JSR     DISDAT
2694 F3D4 38                PULX
2695 F3D5 08                INX
2696 F3D6 A600              LDAA    X
2697 F3D8 8104              CMPA    #$04
2698 F3DA 26F2              BNE     MESSD
2699 F3DC BDF3EC            JSR     DISDAT
2700 F3DF 39                RTS
2701                        *
2702 F3E0 8602     DELM     LDAA    #$02
2703 F3E2 CEFFFF   DELM1    LDX     #$FFFF
2704 F3E5 09       DELM2    DEX
2705 F3E6 26FD              BNE     DELM2
2706 F3E8 4A                DECA
2707 F3E9 26F7              BNE     DELM1
2708 F3EB 39                RTS
2709                        *
2710                        * PRINT CHAR ON LCD AND UPDATE LOCATION POINTERS
2711                        *
2712 F3EC BDF419   DISDAT   JSR     DISRED
2713 F3EF BDF3FC            JSR     CHARTST
2714 F3F2 39                RTS
2715                        *
2716 F3F3 7D6001   DISDAT1  TST     DISDATA
2717 F3F6 2BFB              BMI     DISDAT1
2718 F3F8 B76001            STAA    DISDATA
2719 F3FB 39                RTS
2720                        *
2721 F3FC 36       CHARTST  PSHA
2722 F3FD 8104              CMPA    #$04
2723 F3FF 2708              BEQ     LIN2
2724 F401 B76001            STAA    DISDATA
2725 F404 BDF41F            JSR     DISLOC
2726 F407 32                PULA
2727 F408 39                RTS
2728                        *
2729 F409 C10F     LIN2     CMPB    #$0F
2730 F40B 270A              BEQ     NLIN2
2731 F40D 86C0              LDAA    #$C0
2732 F40F BDF396            JSR     DISSET
2733 F412 8615              LDAA    #$15
```

```
2734 F414 B727E6            STAA    DISROW
2735 F417 32        NLIN2   PULA
2736 F418 39                RTS
2737                *
2738                * THIS ROUTINE WAITS FOR THE DISPLAY WAIT FLAG TO CLEAR
2739                *
2740 F419 7D6001    DISRED  TST     DISDATA
2741 F41C 2BFB              BMI     DISRED
2742 F41E 39                RTS
2743                *
2744                * THIS PROCEDURE TESTS FOR THE END OF DISPLAYABLE LINE AND
2745                * ADVANCE TO THE NEXT LINE. DISROW WILL CONTAIN THE POSTIO
2746                * CURSOR AS THOUGH THE DISPLAY WHERE CONTIGIOUS 20 CHARACT
2747                * AT THE END OF THE COLUMN 2 CHARACTER 20 THE DISPLAY IS C
2748                * POSITON POINTERS ARE RESET.
2749                *
2750 F41F 36        DISLOC  PSHA
2751 F420 B627E6            LDAA    DISROW
2752 F423 8114              CMPA    #$14
2753 F425 260A              BNE     DISLOC1
2754 F427 86C0              LDAA    #$C0
2755 F429 BDF396            JSR     DISSET
2756 F42C 86F0              LDAA    #$F0
2757 F42E B727E7            STAA    DISCOL
2758 F431 7C27E6    DISLOC1 INC     DISROW
2759 F434 B627E6            LDAA    DISROW
2760 F437 812A              CMPA    #$2A
2761 F439 261C              BNE     DISLOC2
2762 F43B 8601              LDAA    #$01
2763 F43D B727E6            STAA    DISROW
2764 F440 8602              LDAA    #$02
2765 F442 BDF396            JSR     DISSET
2766 F445 8601              LDAA    #$01
2767 F447 BDF396            JSR     DISSET
2768 F44A 860F              LDAA    #$0F
2769 F44C B727E7            STAA    DISCOL
2770 F44F BDF419            JSR     DISRED
2771 F452 32                PULA
2772 F453 36                PSHA
2773 F454 BDF3EC            JSR     DISDAT
2774 F457 32        DISLOC2 PULA
2775 F458 39                RTS
2776                *
2777                * START MESSAGE DISPLAY
2778                *
2779 F459 BDF39F    STRTMES JSR     DISCLR   * CLEAR THE DISPLAY
2780 F45C CEF98B            LDX     #COMM    * GET START ADDRESS OF MESSAG
2781 F45F BDF3CE            JSR     MESSD    * DISPLAY MESSAGE
2782 F462 CEF9A0            LDX     #PINM    * GET START ADDRESS OF MESSAG
2783 F465 BDF3CE            JSR     MESSD    * DISPLAY MESSAGE
2784 F468 39                RTS              * RETURN
2785                *
2786                * PUT A CHARACTER IN THE BUFFER POINTED TO BY OUTPTR
2787                *
2788 F469 3C        PUTBUF  PSHX
2789 F46A FE2027            LDX     OUTPTR
2790 F46D A700              STAA    ,X
2791 F46F 08                INX
2792 F470 FF2027            STX     OUTPTR
2793 F473 38                PULX
2794 F474 39                RTS
2795                *
2796                * CLEAR THE OUTPUT BUFFER DACCTCD AND SET OUTPTR
2797                *
2798 F475 3C        CLRBUF  PSHX
2799 F476 CE204E            LDX     #DACCTCD
2800 F479 FF2027            STX     OUTPTR
2801 F47C 8604              LDAA    #$04
2802 F47E A700              STAA    ,X
2803 F480 38                PULX
2804 F481 39                RTS
2805                *
2806                * DO RMC DECRPYTION OF A NUMBER IN ACCTCOD WITH DATA TABLE
2807                *
2808 F482 F6203C    DECPRT  LDAB    ACCTCOD+2 * 1s DIGIT OF OFFSET
2809 F485 C030              SUBB    #'0'
2810 F487 F7201D            STAB    STRTLOC
2811 F48A F6203B            LDAB    ACCTCOD+1 * 10s DIGIT OF OFFSET
```

```
2812 F48D C030                    SUBB    #'0'
2813 F48F 860A                    LDAA    #10
2814 F491 3D                      MUL
2815 F492 FB201D                  ADDB    STRTLOC
2816 F495 5A                      DECB
2817 F496 F7201D                  STAB    STRTLOC
2818 F499 CE203D                  LDX     #ACCTCOD+3    * POINT TO DATA BUFFER
2819 F49C 18CEB700                LDY     #EEPROM+256
2820 F4A0 BDF475                  JSR     CLRBUF
2821                      *
2822                      * DECODE THE MESSAGE IN DACCTCD UNTIL $04 IS FOUND
2823                      *
2824 F4A3 18CEB700    DECLOOP     LDY     #EEPROM+256
2825 F4A7 7C201D                  INC     STRTLOC
2826 F4AA F6201D                  LDAB    STRTLOC
2827 F4AD 183A                    ABY
2828 F4AF A600                    LDAA    ,X
2829 F4B1 8104                    CMPA    #$04
2830 F4B3 2709                    BEQ     DECDUN
2831 F4B5 7F202A                  CLR     OFFSET
2832 F4B8 BDF4C4                  JSR     FINDONE
2833 F4BB 08                      INX
2834 F4BC 20E5                    BRA     DECLOOP
2835 F4BE 8604        DECDUN      LDAA    #$04
2836 F4C0 BDF469                  JSR     PUTBUF
2837 F4C3 39                      RTS
2838                      *
2839                      * LOOK THROUGH THE DECRYPTION TABLE FOR A MATCH
2840                      * START AT CURRENT POINTER
2841                      * UPDATE POINTER ON MATCH
2842                      * CHARACTER IS MOD TEN OF OFFSET FROM LAST TABLE POSITION
2843                      *
2844 F4C4 3C          FINDONE     PSHX              * GET CURRENT POINTER
2845 F4C5 7F2029                  CLR     WRAP
2846 F4C8 7F202A                  CLR     OFFSET
2847 F4CB 18A100      FINDNUN     CMPA    ,Y        * LOOK THROUGH TABLE FOR SAME
2848 F4CE 2710                    BEQ     MATCH
2849 F4D0 7C202A                  INC     OFFSET
2850 F4D3 7C201D                  INC     STRTLOC
2851 F4D6 1808                    INY
2852 F4D8 188CB800                CPY     #EEPROM+256+256 * WRAP AROUND IF AT TAB
2853 F4DC 2DED                    BLT     FINDNUN
2854 F4DE 2010                    BRA     NOMATCH
2855                      *
2856 F4E0 F6202A      MATCH       LDAB    OFFSET    * GET DECRYPTED 1s DIGIT
2857 F4E3 4F                      CLRA
2858 F4E4 CE000A                  LDX     #10       * MOD TEN
2859 F4E7 02                      IDIV
2860 F4E8 CB30                    ADDB    #'0'      * MAKE PRINTABLE CHARACTER
2861 F4EA 17                      TBA
2862 F4EB BDF469                  JSR     PUTBUF
2863 F4EE 38                      PULX
2864 F4EF 39                      RTS
2865                      *
2866                      * NO MATCH WAS FOUND IN DATA TABLE THUS INVALID DATA TABLE
2867                      *
2868 F4F0 BDF39F      NOMATCH     JSR     DISCLR
2869 F4F3 CEF923                  LDX     #BUFMSG
2870 F4F6 BDF3CE                  JSR     MESSD
2871 F4F9 BDEF7D                  JSR     LBEEP
2872 F4FC CE0010                  LDX     #$0010
2873 F4FF BDEF60                  JSR     RTIDE2
2874 F502 7D2038                  TST     ARFLG
2875 F505 2703                    BEQ     NOMATCH1
2876 F507 7EE95F                  JMP     GETSPW1
2877 F50A 7EE0E2      NOMATCH1    JMP     RUNNER
2878                      *
2879                      * DO MOD 10 ON DECPRYTED ACCOUNT NUMBER TO INSURE VALIDITY
2880                      * PROCESS ERROR AND JUMP TO RUNNER OR RETURN IF OK
2881                      *
2882 F50D CE205C      CRCSUM      LDX     #DACCTCD+14
2883 F510 CC0000                  LDD     #$0000
2884 F513 FD2019                  STD     CSUM
2885 F516 C608                    LDAB    #8
2886 F518 F72016                  STAB    CNTLOC1
2887 F51B 2008                    BRA     CRCSUM2
2888 F51D E601        CRCSUM1     LDAB    1,X
2889 F51F C030                    SUBB    #'0'
```

```
2890 F521 4F                       CLRA
2891 F522 BDF576                   JSR     FIXD
2892 F525 E600      CRCSUM2        LDAB    0,X
2893 F527 C030                     SUBB    #'0'
2894 F529 8602                     LDAA    #2
2895 F52B 3D                       MUL
2896 F52C BDF576                   JSR     FIXD
2897 F52F 09                       DEX
2898 F530 09                       DEX
2899 F531 7A2016                   DEC     CNTLOC1
2900 F534 26E7                     BNE     CRCSUM1
2901                   *           LDX     CSUM
2902                   *           JSR     OUTX
2903                   *           LDAA    #$0D
2904                   *           JSR     TXCHAR
2905                   *           LDAA    #$0A
2906                   *           JSR     TXCHAR
2907 F536 FC2019                   LDD     CSUM
2908 F539 CE000A                   LDX     #$000A
2909 F53C 02                       IDIV
2910 F53D 8F                       XGDX
2911 F53E 860A                     LDAA    #10
2912 F540 3D                       MUL
2913 F541 FD201B                   STD     CSUM1
2914 F544 FC2019                   LDD     CSUM
2915 F547 B3201B                   SUBD    CSUM1
2916 F54A FD201B                   STD     CSUM1
2917 F54D C60A                     LDAB    #10
2918 F54F F0201C                   SUBB    CSUM1+1
2919 F552 C10A                     CMPB    #10
2920 F554 2601                     BNE     CRCSUM3
2921 F556 5F                       CLRB
2922 F557 CB30      CRCSUM3        ADDB    #'0'
2923               *TBA
2924                   *           JSR     OUTA
2925 F559 F1205D                   CMPB    DACCTCD+15
2926 F55C 2717                     BEQ     CRCSUM4
2927 F55E BDF39F    CRCERR         JSR     DISCLR
2928 F561 CEF9CA                   LDX     #TKTERR
2929 F564 BDF3CE                   JSR     MESSD
2930 F567 BDEF7D                   JSR     LBEEP
2931 F56A 7D2038                   TST     ARFLG
2932 F56D 2703                     BEQ     CRCERR1
2933 F56F 7EE95F                   JMP     GETSPW1
2934 F572 7EE0E2    CRCERR1        JMP     RUNNER
2935 F575 39        CRCSUM4        RTS
2936               *
2937               * GET EACH MOD 10 DIGIT. QUOTIENT + REMAINDER = DIGIT
2938               *
2939 F576 3C        FIXD           PSHX
2940 F577 CE000A                   LDX     #$000A
2941 F57A 02                       IDIV
2942 F57B 36                       PSHA
2943 F57C 37                       PSHB
2944 F57D 8F                       XGDX
2945 F57E F32019                   ADDD    CSUM
2946 F581 FD2019                   STD     CSUM
2947 F584 33                       PULB
2948 F585 32                       PULA
2949 F586 38        FIXD1          PULX
2950 F587 F32019                   ADDD    CSUM
2951 F58A FD2019                   STD     CSUM
2952 F58D 39                       RTS
2953               *
2954               * ROUTINE TO SEND X OUT RS232
2955               *
2956 F58E 36        OUTX           PSHA
2957 F58F 37                       PSHB
2958 F590 3C                       PSHX
2959 F591 8F                       XGDX
2960 F592 BDF636                   JSR     OUTA
2961 F595 17                       TBA
2962 F596 BDF636                   JSR     OUTA
2963 F599 8620                     LDAA    #' '
2964 F59B BDF619                   JSR     TXCHAR
2965 F59E 38                       PULX
2966 F59F 33                       PULB
2967 F5A0 32                       PULA
2968 F5A1 39                       RTS
```

```
2969                  *
2970                  * BOOT JUMP ROUTINES TO SET UP PROCESSOR
2971                  *
2972 F5A2 8E3FFF  INITROM  LDS    #STACK    * SET UP STACK POINTER
2973 F5A5 0F               SEI              * SHUT OFF INTERRUPTS
2974 F5A6 8630              LDAA   #$30     * 9600 BAUD
2975 F5A8 B7102B             STAA   SCBR
2976 F5AB 8600               LDAA   #$00
2977 F5AD B7102C             STAA   SCCR1
2978 F5B0 860C                LDAA   #$0C
2979 F5B2 B7102D             STAA   SCCR2
2980 F5B5 8600               LDAA   #$00
2981 F5B7 B71008             STAA   DDRC     * DATA DIRECTION FOR C IS INP
2982 F5BA 8683               LDAA   #$83     * SET A DIRECTION AND RTI RAT
2983 F5BC B71026             STAA   PACTL    * DO IT TO PACTL
2984 F5BF 8640               LDAA   #$40     * GET READY TO SETUP RTI
2985 F5C1 B71024             STAA   TIMR2    * SET REAL TIME INTERRUPTS
2986 F5C4 867E               LDAA   #$7E
2987 F5C6 97EE               STAA   $00EE
2988 F5C8 CEED99             LDX    #TIMR    * ADDRESS OF TIM HANDLER
2989 F5CB DFEF                STX    $00EF    * BUFFALO INTERRUPT VECTOR
2990 F5CD 7F201F             CLR    NMESS    * SET FOR START MESSAGE DISPL
2991 F5D0 7EE0A3             JMP    RSTART   * GO BARCODE / KEYBOARD HUNTI
2992                  *
2993                  * INPUT A CHAR FROM SERIAL PORT, WAIT FOR A CHARACTER AND
2994                  * ECHO FLAG IS SET COMPARE RECIEVED CHARACTER AGAINST SENT
2995                  * OR WAIT TO TIME OUT
2996                  *
2997 F5D3 37       RXCHAR   PSHB
2998 F5D4 3C                PSHX
2999 F5D5 B72023             STAA   TEMP9
3000 F5D8 7F2021             CLR    TMOFLG   * TIME OUT FLAG
3001 F5DB 8602               LDAA   #$02
3002 F5DD B72012             STAA   COMTIM   * TIME OUT DELAY
3003 F5E0 CE3FFF  RXCHAR0  LDX    #$3FFF
3004 F5E3 F6102E  RXCHAR1  LDAB   SCSR     * WAIT FOR CHAR
3005 F5E6 C420              ANDB   #$20
3006 F5E8 2612              BNE    RXCHAR2
3007 F5EA 09                DEX
3008 F5EB 26F6              BNE    RXCHAR1
3009 F5ED 7A2012            DEC    COMTIM   * 1 TIME PERIOD
3010 F5F0 26EE              BNE    RXCHAR0
3011 F5F2 86FF              LDAA   #$FF     * TIMED OUT
3012 F5F4 B72021            STAA   TMOFLG
3013 F5F7 B62023            LDAA   TEMP9
3014 F5FA 200D              BRA    RXCHAR3
3015 F5FC B6102F  RXCHAR2  LDAA   SCDR     * CHARACTER FOUND
3016 F5FF 7D2022            TST    ECHO
3017 F602 2705              BEQ    RXCHAR3
3018 F604 B12013            CMPA   CHOUT
3019 F607 26DA              BNE    RXCHAR1
3020 F609 38      RXCHAR3  PULX
3021 F60A 33                PULB
3022 F60B 39                RTS
3023                  *
3024                  * OUTPUT A MESSAGE THROUGH SERIAL, POINT TO BY X AND END W
3025                  *
3026 F60C A600    MSG      LDAA   ,X
3027 F60E 8104              CMPA   #$04
3028 F610 2706              BEQ    MSG2
3029 F612 BDF619            JSR    TXCHAR
3030 F615 08                INX
3031 F616 20F4              BRA    MSG
3032 F618 39      MSG2     RTS
3033                  *
3034                  * SEND CHARACTER OUT SERIAL. CALL RXCHAR IF ECHO ON
3035                  *
3036 F619 847F    TXCHAR   ANDA   #$7F     * SPACE FOR PARITY INSURE
3037 F61B 37                PSHB             * PUT B ON STACK
3038 F61C 7F2013            CLR    CHOUT
3039 F61F F6102E  TXCHAR1  LDAB   SCSR     * LOAD B WITH SCI STATUS
3040 F622 C480              ANDB   #$80     * CHECK FOR BUSY
3041 F624 27F9              BEQ    TXCHAR1  * BUSY CHECK UNTIL NOT BUSY
3042 F626 B7102F            STAA   SCDR     * PUT CHARACTER OUT SCI
3043 F629 33                PULB             * GET B BACK
3044 F62A 7D2022            TST    ECHO
3045 F62D 2706              BEQ    TXCHAR3
3046 F62F B72013            STAA   CHOUT
```

```
3047 F632 BDF5D3    TXCHAR4   JSR       RXCHAR
3048 F635 39        TXCHAR3   RTS                        * GO BACK
3049                *
3050                * SEND A OUT SERIAL AS 2 BYTE ASCII
3051                *
3052 F636 3C        OUTA      PSHX
3053 F637 37                  PSHB
3054 F638 36                  PSHA
3055 F639 47                  ASRA
3056 F63A 47                  ASRA
3057 F63B 47                  ASRA
3058 F63C 47                  ASRA
3059 F63D 840F                ANDA      #$0F
3060 F63F BDF64D              JSR       OUTA1
3061 F642 32                  PULA
3062 F643 36                  PSHA
3063 F644 840F                ANDA      #$0F
3064 F646 BDF64D              JSR       OUTA1
3065 F649 32                  PULA
3066 F64A 33                  PULB
3067 F64B 38                  PULX
3068 F64C 39                  RTS
3069                *
3070 F64D 8109      OUTA1     CMPA      #9
3071 F64F 2E06                BGT       OUTA2
3072 F651 8B30                ADDA      #'0'
3073 F653 BDF619              JSR       TXCHAR
3074 F656 39                  RTS
3075 F657 8B37      OUTA2     ADDA      #'A'-10
3076 F659 BDF619              JSR       TXCHAR
3077 F65C 39                  RTS
3078                *
3079                * ***************** CODE 39 DATA TABLES ***************
3080                *
3081                * TABLE A  CARRY BIT IS OFF TO ACCESS THIS TABLE
3082                *
3083 F65D 0000000000 TABLEA   FCC       $00,$00,$00,$00,$00,$00,$00,'Q',$00,$00
          0000510000
          0000004700
          00
3084 F66D 0000004E00          FCC       $00,$00,$00,'N',$00,$00,'T',$00,$00,'D'
          0054000044
          00004A0000
          00
3085 F67D 0000000000          FCC       $00,$00,$00,$00,$00,'7',$00,$00,$00,$00
          3700000000
          2500000000
          00
3086 F68D 0034000030          FCC       $00,'4',$00,$00,'0',$00,$00,$00,$00,$00
          0000000000
          0000000000
          00
3087 F69D 0000004C00          FCC       $00,$00,$00,'L',$00,$00,'S',$00,$00,'B'
          0053000042
          0000490000
          00
3088 F6AD 0000500000          FCC       $00,$00,'P',$00,$00,$00,$00,$00,'F',$00
          0000004600
          0000000000
          00
3089 F6BD 0032000039          FCC       $00,'2',$00,$00,'9',$00,$00,$00,$00,$00
          0000000000
          0000000000
          00
3090 F6CD 3600000000          FCC       '6',$00,$00,$00,$00,$00,$00,$00,$00,$00
          0000000000
          0000000000
          00
3091 F6DD 0000000000          FCC       $00,$00,$00,$00,$00,'-',$00,$00,$00,$00
          2D00000000
          2B00000000
          00
3092 F6ED 005800002A          FCC       $00,'X',$00,$00,'*',$00,$00,$00,$00,$00
          0000000000
          0000000000
          00
```

```
 3093 F6FD 00002F0000          FCC     $00,$00,'/',$00,$00,$00,$00,$00,'$',$00
           0000002400
           0000000000
           00
 3094 F70D 0000000000          FCC     $00,$00,$00,$00,$00,$00,$00,$00,$00,$00
           0000000000
           0000000000
           00
 3095 F71D 0056000020          FCC     $00,'V',$00,$00,' ',$00,$00,$00,$00,$00
           0000000000
           0000000000
           00
 3096 F72D 5A00000000          FCC     'Z',$00,$00,$00,$00,$00,$00,$00,$00,$00
           0000000000
           0000000000
           00
 3097 F73D 0000000000          FCC     $00,$00,$00,$00,$00,$00,$00,$00,$00,$00
           0000000000
           0000000000
           00
 3098 F74D 0000000000          FCC     $00,$00,$00,$00,$00,$00,$00,$00,$00,$00
           0000000000
           0000000000
           00
 3099                     *
 3100                     *TABLE B  CARRY BIT IS SET TO ACCESS THIS TABLE
 3101                     *
 3102 F75D 0000004B00 TABLEB  FCC     $00,$00,$00,'K',$00,$00,'R',$00,$00,'A'
           0052000041
           0000480000
           00
 3103 F76D 00004F0000          FCC     $00,$00,'O',$00,$00,$00,$00,$00,'E',$00
           0000004500
           0000000000
           00
 3104 F77D 0031000038          FCC     $00,'1',$00,$00,'8',$00,$00,$00,$00,$00
           0000000000
           0000000000
           00
 3105 F78D 3500000000          FCC     '5',$00,$00,$00,$00,$00,$00,$00,$00,$00
           0000000000
           0000000000
           00
 3106 F79D 00004D0000          FCC     $00,$00,'M',$00,$00,$00,$00,$00,'C',$00
           0000004300
           0000000000
           00
 3107 F7AD 0000000000          FCC     $00,$00,$00,$00,$00,$00,$00,$00,$00,$00
           0000000000
           0000000000
           00
 3108 F7BD 3300000000          FCC     '3',$00,$00,$00,$00,$00,$00,$00,$00,$00
           0000000000
           0000000000
           00
 3109 F7CD 0000000000          FCC     $00,$00,$00,$00,$00,$00,$00,$00,$00,$00
           0000000000
           0000000000
           00
 3110 F7DD 005500002E          FCC     $00,'U',$00,$00,'.',$00,$00,$00,$00,$00
           0000000000
           0000000000
           00
 3111 F7ED 5900000000          FCC     'Y',$00,$00,$00,$00,$00,$00,$00,$00,$00
           0000000000
           0000000000
           00
 3112 F7FD 0000000000          FCC     $00,$00,$00,$00,$00,$00,$00,$00,$00,$00
           0000000000
           0000000000
           00
 3113 F80D 0000000000          FCC     $00,$00,$00,$00,$00,$00,$00,$00,$00,$00
           0000000000
           0000000000
           00
 3114 F81D 5700000000          FCC     'W',$00,$00,$00,$00,$00,$00,$00,$00,$00
           0000000000
           0000000000
           00
```

```
3115 F82D 0000000000              FCC      $00,$00,$00,$00,$00,$00,$00,$00,$00,$00
          0000000000
          0000000000
          00
3116 F83D 0000000000              FCC      $00,$00,$00,$00,$00,$00,$00,$00,$00,$00
          0000000000
          0000000000
          00
3117 F84D 0000000000              FCC      $00,$00,$00,$00,$00,$00,$00,$00,$00,$00
          0000000000
          0000000000
          00
3118                      *
3119                      * KEYSCAN TABLE FOR SINGLE KEYSTROKE
3120                      *
3121 F85D 3F3F3F3F KYSCAN  FCB      '????'
3122 F861 3336393F         FCB      '369?'
3123 F865 32353830         FCB      '2580'
3124 F869 3134373F         FCB      '147?'
3125                      *
3126                      * KEYSCAN TABLE FOR A FUNCTION KEY
3127                      *
3128 F86D 3F3F3F3F         FCB      '????'
3129 F871 444D5724         FCB      'DMW$'
3130 F875 414A543F         FCB      'AJT?'
3131 F879 51475040         FCB      'QGP@'
3132                      *
3133                      * KEYSCAN TABLE FOR B FUNCTION KEY
3134                      *
3135 F87D 3F3F3F3F         FCB      '????'
3136 F881 454E5820         FCB      'ENX '
3137 F885 424B553F         FCB      'BKU?'
3138 F889 5A48523F         FCB      'ZHR?'
3139                      *
3140                      * KEYSCAN TABLE FOR C FUNCTION KEY
3141                      *
3142 F88D 3F3F3F3F         FCB      '????'
3143 F891 464F593F         FCB      'FOY?'
3144 F895 434C563F         FCB      'CLV?'
3145 F899 3F49533F         FCB      '?IS?'
3146                      *
3147                      * KEYSCAN TABLE FOR D FUNCTION KEY
3148                      *
3149 F89D 3F3F3F3F         FCB      '????'
3150 F8A1 25293D3F         FCB      '%)=?'
3151 F8A5 2B282F3F         FCB      '+(/?'
3152 F8A9 2D267C3F         FCB      '-&|?'
3153                      *
3154                      *END OF DATA TABLES
3155                      *
3156                      * SYSTEM DISPLAY MESSAGES
3157                      *
3158 F8AD 50494E2053 VERMSG FCC     'PIN System Ver. 2.93'
          797374656D
          205665722E
          20322E3933
3159 F8C1 2863293139        FCC     '(c)1987 Rand McNally',$04
          3837205261
          6E64204D63
          4E616C6C79
          04
3160 F8D6 4261642052 ERRMSG FCC     'Bad Read !!!!',$04
          6561642021
          21212104
3161 F8E4 456E746572 PW1MSG FCC     'Enter Password #1   ',$04
          2050617373
          776F726420
          2331202020
          04
3162 F8F9 456E746572 PW2MSG FCC     'Enter Password #2   ',$04
          2050617373
          776F726420
          2332202020
          04
3163 F90E 456E746572 PWMMSG FCC     'Enter Master Pass   ',$04
          204D617374
          6572205061
          7373202020
          04
```

| | | | | | | |
|---|---|---|---|---|---|---|
| 3164 | F923 | 496E76616C<br>6964204461<br>7461205461<br>626C652021<br>04 | BUFMSG | FCC | 'Invalid Data Table !',$04 | |
| 3165 | F938 | 4445532054<br>657374204D<br>6F6465202E<br>2E2E2E2E04 | SLFMSG | FCC | 'DES Test Mode .....',$04 | |
| 3166 | F94C | 5465726D69<br>6E616C204D<br>6F6465202E<br>2E2E2E2E2E<br>04 | TRMMSG | FCC | 'Terminal Mode .......',$04 | |
| 3167 | F961 | 456E746572<br>2043494353<br>204C6F676F<br>6E202020<br>04 | KATMSG | FCC | 'Enter CICS Logon   ',$04 | |
| 3168 | F976 | 4E6F742044<br>4553204571<br>7569707065<br>642E2E2E2E<br>04 | NOIDES | FCC | 'Not DES Equipped....',$04 | |
| 3˙ | F98B | 52616E6420<br>4D634E616C<br>6C7920436F<br>6D70616E79<br>04 | COMM | FCC | 'Rand McNally Company',$04 | |
| 3 ˙ | F9A0 | 50494E2053<br>797374656D<br>205465726D<br>696E616C20<br>04 | PINM | FCC | 'PIN System Terminal ',$04 | |
| 3171 | F9B5 | 456E746572<br>204163636F<br>756E74204E<br>756D626572<br>04 | PERN | FCC | 'Enter Account Number',$04 | |
| 3172 | F9CA | 496E76616C<br>6964204E75<br>6D62657220<br>2E2E2E2E2E<br>04 | TKTERR | FCC | 'Invalid Number .....',$04 | |
| 3173 | F9DF | 506C656173<br>6520576169<br>74202E2E2E<br>2E2E2E2E2E<br>04 | LOGMSG | FCC | 'Please Wait ........',$04 | |
| 3174 | F9F4 | 456E746572<br>2050617373<br>776F726420<br>2020202020<br>04 | PWMSG | FCC | 'Enter Password     ',$04 | |
| 3175 | FA09 | 496E76616C<br>6964205061<br>7373776F72<br>6420212121<br>04 | PWERMSG | FCC | 'Invalid Password !!!',$04 | |
| 3176 | FA1E | 4C6F616469<br>6E67204465<br>6661756C74<br>2044617461<br>04 | TABMSG | FCC | 'Loading Default Data',$04 | |
| 3177 | FA33 | 5072657373<br>20616E7920<br>4B65792074<br>6F20456E64<br>04 | LDMSG | FCC | 'Press any Key to End',$04 | |
| 3178 | FA48 | 456E746572<br>2050494E20<br>3A2004 | PINN | FCC | 'Enter PIN : ',$04 | |
| 3179 | FA55 | 416761696E<br>2020202020<br>3A2004 | AGNMSG | FCC | 'Again      : ',$04 | |
| 3180 | FA62 | 5573652044<br>656661756C | IPWMSG | FCC | 'Use Default Password',$04 | |

```
                7420506173
                73776F7264
                04
3181  FA77  456E746572   DMESS    FCC     'Enter Your DES-KEY  ',$04
            20596F7572
            204445532D
            4B45592020
            04
3182  FA8C  416761696E   DAGMSG   FCC     'Again Your DES-KEY ',$04
            20596F7572
            204445532D
            4B45592004
3183  FAA0  494E56414C   DTOMAN   FCC     'INVALID DES-KEY     ',$04
            4944204445
            532D4B4559
            2020202020
            04
3184  FAB5  4445532D4B   DTOSHRT  FCC     'DES-KEY Erased     ',$04
            4559204572
            6173656420
            2020202020
            04
3185  FACA  4445532D4B   OKMSG    FCC     'DES-KEY OK .. ',$04
            4559204F4B
            202E2E2004
3186  FAD9  2E2E2E2E2E   PINENT   FCC     '................ ',$04
            2E2E2E2E2E
            2E2E2E2E2E
            2E20202020
            04
3187  FAEE  2E2E2E2E2E   ACTENT   FCC     '................... ',$04
            2E2E2E2E2E
            2E2E2E2E2E
            2E2E2E2E20
            04
3188  FB03  4445532043   DOKMSG   FCC     'DES Check   ',$04
            6865636B20
            202004
3189  FB10  50494E204E   PINERR   FCC     'PIN Not Correct !!!!',$04
            6F7420436F
            7272656374
            2021212121
            04
3190  FB25  5472616E73   OKOK     FCC     'Transaction OK .....',$04
            616374696F
            6E204F4B20
            2E2E2E2E2E
            04
3191  FB3A  4163742004   ACTMSG   FCC     'Act ',$04
3192  FB3F  3031303130   DESDAT   FCC     '0101010101010101'
            3130313031
            3031303130
            31
3193  FB4F  3133323133   ENTDAT   FCC     '13213AB764588787'
            4142373634
            3538383738
            37
3194  FB5F  4F6C642050   OPWMSG   FCC     'Old Password       ',$04
            617373776F
            7264202020
            2020202020
            04
3195  FB74  4E65772050   NPWMSG   FCC     'New Password       ',$04
            617373776F
            7264202020
            2020202020
            04
3196  FB89  5665726966   VPWMSG   FCC     'Verify Password    ',$04
            7920506173
            73776F7264
            2020202020
            04
3197  FB9E  2E2E2E2E2E   ZPWMSG   FCC     '.........',$04
            2E2E2E2E04
3198  FBA8  3335383304   CICSPW   FCC     '3583',$04
3199  FBAD  0D0A04       CICSCR   FCC     $0D,$0A,$04
3200  FBB0  121B5B411B   CICSDAT  FCC     18,27,'[A',27,'HNM*38*',$04
            484E4D2A33
            382A04
```

```
3201 FBBD 121B5B411B  CLOSEMSG  FCC       18,27,'[A',27,'H9999999999999999999999
          4839393939
          3939393939
          3939393939
          3939393939
          3939393939
          393939390D
          0A04
3202 FBE2 4644534E0D  FDSNMSG   FCC       'FDSN',$0D,$0A,$04
          0A04
3203 FBE9 466174616C  SERMSG    FCC       'Fatal System Error ',$04
          2053797374
          656D204572
          726F722020
          04
3204               *
3205               *  TABLE OF VALID ANSI CHARACTERS
3206               *
3207 FBFE 4841424344  ANSITAB   FCC       'HABCDJfnsuJKkmhlp',$00
          4A666E7375
          4A4B6B6D68
          6C7000
3208               *
3209               *  THIS TABLE IS THE RMC DEFAULT ENCRYTION TABLE
3210               *  DO NOT FOLD, SPINDLE, OR MUTILATE UNDER PENALTY OF LAW
3211               *  THANK YOU FOR USING AT&T CALL AGAIN
3212               *
3213 FC10 4554573437  CODEMSG   FCB       'ETW473OK51'
          334F4B3531
3214 FC1A 4739594355            FCB       'G9YCUBENOS'
          42454E4F53
3215 FC24 4756313748            FCB       'GV17HRXD43'
          5258443433
3216 FC2E 4A43454649            FCB       'JCEFI1LX6R'
          314C583652
3217 FC38 4733354345            FCB       'G35CEHYBMU'
          4859424D55
3218 FC42 4756324E58            FCB       'GV2NX946P1'
          3934365031
3219 FC4C 4955463537            FCB       'IUF57M0GWJ'
          4D3047574A
3220 FC56 48364F3259            FCB       'H6O2Y3FVD0'
          3346564430
3221 FC60 4C42384F47            FCB       'LB8OG29R3W'
          3239523357
3222 FC6A 454E313454            FCB       'EN14T8XGL7'
          3858474C37
3223 FC74 394249444B            FCB       '9BIDKU2SR5'
          5532535235
3224 FC7E 4A50463931            FCB       'JPF91CGOK8'
          43474F4B38
3225 FC88 36494A4E53            FCB       '6IJNS4YDRO'
          345944524F
3226 FC92 4C45584E4D            FCB       'LEXNMFJ93W'
          464A393357
3227 FC9C 5245484C47            FCB       'REHLGCTO57'
          43544F3537
3228 FCA6 333246424B            FCB       '32FBKV0CM5'
          5630434D35
3229 FCB0 5537574F52            FCB       'U7WORYI2PN'
          594932504E
3230 FCBA 5836354338            FCB       'X65C8VBGW3'
          5642475733
3231 FCC4 555832444B            FCB       'UX2DKC1HF8'
          4331484638
3232 FCCE 56504A3645            FCB       'VPJ6EGS7HT'
          4753374854
3233 FCD8 564D493645            FCB       'VMI6EORPXJ'
          4F5250584A
3234 FCE2 3039544844            FCB       '09THDLKYB2'
          4C4B594232
3235 FCEC 4556385439            FCB       'EV8T9PDKUN'
          50444B554E
3236 FCF6 334C484535            FCB       '3LHE5MDGYV'
          4D44475956
3237 FD00 554E434B            FCB       'UN0CK65ROD'
          363525F44
3238 FD0A 4A54564231            FCB       'JTVB1MBX21'
          4D42583231
```

```
3239                    *
3240                    *VECTOR TABLE FOR INTERRUPTS
3241                    *
3242 FFD6                       ORG      $FFD6
3243 FFD6 E000                  FDB      COLD     *SCI SERIAL SYSTEM
3244 FFD8 E000                  FDB      COLD     *SPI SERIAL TRANSFER COMPLETE
3245 FFDA E000                  FDB      COLD     *PULSE ACCUMULATOR INPUT EDGE
3246 FFDC E000                  FDB      COLD     *PULSE ACCUMULATOR OVERFLOW
3247 FFDE E000                  FDB      COLD     *TIMER OVERFLOW
3248 FFE0 E000                  FDB      COLD     *TIMER OUTPUT COMPARE 5
3249 FFE2 E000                  FDB      COLD     *TIMER OUTPUT COMPARE 4
3250 FFE4 E000                  FDB      COLD     *TIMER OUTPUT COMPARE 3
3251 FFE6 E000                  FDB      COLD     *TIMER OUTPUT COMPARE 2
3252 FFE8 E000                  FDB      COLD     *TIMER OUTPUT COMPARE 1
3253 FFEA E000                  FDB      COLD     *TIMER INPUT COMPARE 3
3254 FFEC E000                  FDB      COLD     *TIMER INPUT COMPARE 2
3255 FFEE E000                  FDB      COLD     *TIMER INPUT COMPARE 1
3256 FFF0 ED99                  FDB      TIMR     *REAL TIME INTERRUPT
3257 FFF2 E000                  FDB      COLD     *IRQ
3258 FFF4 E000                  FDB      COLD     *XIRQ
3259 FFF6 E000                  FDB      COLD     *SWI
3'   FFF8 E000                  FDB      COLD     *ILLEGAL OPCODE TRAP
3... FFFA E000                  FDB      COLD     *COP FAILURE
3262 FFFC E000                  FDB      COLD     *COP CLOCK MONITOR FAIL
3263 FFFE E000                  FDB      COLD     *RESET
3264 0000                       END
```

What is claimed:

1. An apparatus for receiving a previously unspecified, unencrypted first identifier along with an encrypted second identifier and for securely transferring a representation thereof to a data base, the apparatus comprising:
a housing;
manually operable means for entering a representation of the encrypted second identifier into said housing;
means, carried within said housing, for decrypting the second identifier;
means for testing the authenticity of said decrypted second identifier;
manually operable means for entering a representation of the unencrypted first identifier into said housing, in response to an authentic second identifier;
means, carried within said housing, for encrypting said first identifier; and
means for transmitting said encrypted first identifier from said housing to the data base.

2. An apparatus as in claim 1 with said manually operable means for entering comprising a keyboard.

3. An apparatus as in claim 1 with said manually operable means for entering said unencrypted first identifier including a keyboard.

4. An apparatus as in claim 3 with said manually operable means for entering said encrypted second identifier including means for sensing a selected machine readable code.

5. An apparatus as in claim 4 wherein said sensing means includes a bar code reader.

6. An apparatus as in claim 1 wherein said testing means includes means for decrypting said encrypted second identifier prior to testing the authenticity thereof.

7. An apparatus as in claim 1 wherein said decrypting means includes a predetermined look-up table.

8. An apparatus as in claim 1 including means for entering a predetermined data base identifier.

9. An apparatus as in claim 8 wherein said encrypting means further includes means for sensing said predetermined data base identifier and wherein said encrypted output is generated in response, at least in part, to said sensed, predetermined data base identifier.

10. An apparatus as in claim 1 wherein said transmitting means includes means for transmitting said decrypted second identifier.

11. An apparatus as in claim 9 wherein said encrypting means includes means for implementing a DES encryption algorithm.

12. An apparatus as in claim 9 wherein said encrypting means includes an MC6859L type integrated circuit.

13. An apparatus as in claim 9 including visual display means completed to said entering means for visual verification of an entered first identifier.

14. An apparatus as in claim 13 wherein said transmission means includes a serial interface.

15. An apparatus as in claim 9 wherein said first identifier has been recorded in unencrypted form on a documentary medium that was already carrying a representation of said encrypted second identifier.

16. An apparatus as in claim 10 with said transmitting means including a serial bidirectional interface.

17. A terminal, couplable to a data base, for entering a previously unspecified, non-encrypted, first entity identifier along with a previously specified, encrypted, second entity identifier and for securely transmitting representations of both identifiers to the data base comprising:
manually operable means for entering the unencrypted first identifier;
manually operable means for entering the encrypted second identifier;
means for decrypting and for testing the authenticity of said encrypted second identifier;
means for encrypting said first identifier; and
means for transmitting said encrypted first identifier and said second decrypted, identifier to the data base.

18. A terminal as in claim 17 wherein said first identifier entering means includes a keyboard and said second identifier entering means includes bar code sensing means.

19. A method of securely transmitting a previously unspecified first identifier, along with an associated, previously specified second identifier, to a data base, the method comprising:
providing a documentary medium which carries a encrypted representation of the previously specified second identifier and upon which a visibly perceptible, unencrypted representation of the first identifier can be recorded;

providing a terminal having manually operable means for entry of the encrypted and unencrypted identifiers;

entering the representation of the second, encrypted, identifier carried on the medium into the terminal;

entering the representation of the first, unencrypted, identifier recorded on the medium into the terminal;

decrypting, within the terminal, the second identifier;

testing the entered representation of the second identifier for authenticity;

encrypting the entered representation of the first identifier; and transmitting, if the representation of the second identifier is authentic, the encrypted representation of the first identifier and the decrypted representation of the second identifier to the data base.

20. A method as in claim 19 wherein the decrypted step includes using at least part of the representation to specify an entry point into a predetermined decrypted table.

21. A method as in claim 19 wherein the recorded first identifier has a plurality of elements and the encrypting step includes converting each of said elements to an encrypted representation in accordance with a predetermined encrypted algorithm.

22. A method as in claim 19 wherein the recorded first identifier has a plurality of elements and the encrypting step includes converting said elements into an encrypted representation in accordance with a DES encrypting encoding algorithm.

23. A method as in claim 19 including:
providing a visual display on the terminal;
displaying the entered representation of the first identifier; and
visually verifying the accuracy of the entered representation of the first identifier.

24. A method as in claim 23 including:
displaying the entered representation of the second identifier; and
visually verifying the accuracy of the entered representation of the first identifier.

25. A method as in claim 22 wherein the encrypting step includes computing a multi-element off-set and the transmitting step includes transmitting the off-set as the encrypted representation of the first identifier.

26. A method of securely transmitting an arbitrarily selected multi-element identifier, associated with a previously determined second identifier, to a spatially displaced data base, the method comprising:
providing a medium which carries a encrypted representation of the previously specified second identifier and upon which a visibly perceptible representation of the multi-element first identifier can be recorded;
providing a terminal having manually operable means for entry of the two identifiers;
entering the encrypted representation of the second identifier carried on the medium into the terminal;
entering the representation of the first identifier recorded on the medium into the terminal;
decrypting and then testing the entered representation of the second identifier for authenticity;
encrypting the entered representation of the first identifier if the second identifier is authentic; and
transmitting the encrypted representation of the first identifier and the decrypted representation of the second identifier to the data base provided the second identifier is authentic.

27. A system for securely transferring an essentially arbitrary, multi-element, non-encrypted, identifier from an originator thereof along with a predetermined second identifier to a spatially displaced data base comprising:
a sheet member which carries a preprinted encrypted representation of the predetermined second identifier and has a region for recording a representation of the multi-element non-encrypted identifier;
manually operable means for entering the unencrypted first identifier;
manually operable means for entering the encrypted second identifier;
means for decrypting the second identifier;
means for testing the authenticity of said decrypted second identifier;
means for encrypting said first identifier; and
means for transmitting at least said encrypted first identifier to the data base.

28. A method of securely transferring from an individual at a first location to an entity, which maintains a financial account with the individual, at a displaced storage location a personal identifier newly selected by the individual comprising:
originating a documentary member with an encrypted identifier of the individual's financial account thereon;
delivering that documentary member to the individual;
applying an unencrypted representation of the newly selected personal identifier to the documentary member;
delivering that documentary member to the entity;
reading the encrypted account identifier from the documentary member;
decrypting the account identifier;
checking the decrypting account identifier and indicating if it is authentic or not;
sensing the unencrypted, newly selected personal identifier if the account identifier is authentic;
encrypting the personal identifier; and
transferring the encrypted personal identifier and the decrypted account identifier to storage.

29. An apparatus for securely encoding a personal identifier newly selected by an individual and recorded, in unencrypted form, on a document which document also carries a previously printed, encrypted, machine readable, representation of an account number assigned to the individual and no other representation of that account number, the apparatus comprising:
a closed housing defining a region therein;
means, carried by said housing for sensing the encrypted representation of the account number from the document;
means, enclosed by said housing, decrypting the sensed account number;
means for verifying the authenticity of the decrypted account number;
means, carried by said housing, for indicating that the decrypted account number is authentic;
means for entering a representation of the unencrypted personal identifier on the document into said housing if the unencrypted account number is authentic;
means, enclosed by said housing, for encrypting the personal identifier; and
means for transmitting a representation of the encrypted personal identifier along with the encrypted account number from said housing.

* * * * *